(12) United States Patent
Tao

(10) Patent No.: US 12,421,130 B2
(45) Date of Patent: Sep. 23, 2025

(54) IONIC CONDUCTORS

(71) Applicant: THE UNIVERSITY OF WARWICK, Coventry (GB)

(72) Inventor: Shanwen Tao, Coventry (GB)

(73) Assignee: THE UNIVERSITY OF WARWICK, Coventry (GB)

( * ) Notice: Subject to any disclaimer, the term of this patent is extended or adjusted under 35 U.S.C. 154(b) by 510 days.

(21) Appl. No.: 17/923,556

(22) PCT Filed: Apr. 14, 2021

(86) PCT No.: PCT/GB2021/050893
§ 371 (c)(1),
(2) Date: Nov. 4, 2022

(87) PCT Pub. No.: WO2021/224588
PCT Pub. Date: Nov. 11, 2021

(65) Prior Publication Data
US 2023/0183090 A1 Jun. 15, 2023

(30) Foreign Application Priority Data

May 5, 2020 (GB) .................................. 2006604

(51) Int. Cl.
*C01G 25/00* (2006.01)
*C01G 51/66* (2025.01)
(Continued)

(52) U.S. Cl.
CPC .......... *C01G 25/006* (2013.01); *C01G 51/66* (2013.01); *C25B 11/0773* (2021.01);
(Continued)

(58) Field of Classification Search
CPC ............ H01M 8/1016; H01M 10/0562; C01G 25/006; C01G 51/66; C25B 11/0773
(Continued)

(56) References Cited

U.S. PATENT DOCUMENTS 7,887,970 B1 * 2/2011 Gerald, II ........... H01M 50/497
429/251
2010/0196767 A1 8/2010 Sala et al.
(Continued)

FOREIGN PATENT DOCUMENTS

| CN | 102 442 818 A | 5/2012 |
|---|---|---|
| CN | 107645000 A | 1/2018 |

(Continued)

OTHER PUBLICATIONS

Choi, Sihyuk et al., "Exceptional power density and stability at intermediate temperatures in protonic ceramic fuel cells", Nature Energy, 3(3):202-210 (Feb. 12, 2018).
(Continued)

*Primary Examiner* — James M Erwin
(74) *Attorney, Agent, or Firm* — Rodney J. Fuller; Fuller IP Law LLC

(57) ABSTRACT

A solid ionic conducting material for use in an electrochemical device comprises an oxyhydroxide or hydrated oxide derived from of an oxide with a perovskite, Brownmillerite, layered oxide, and/or $K_4CdCl_6$ structure, the elemental composition of the initial oxide being selected to provide suitable conduction properties for the derived anhydrous or hydrated oxyhydroxide or hydrated oxide. A method of making such a solid ionic conducting material, including treatment with water, and an electrochemical device incorporating such a solid ionic conducting material (optionally as an electrolyte) are also disclosed.

20 Claims, 16 Drawing Sheets

(51) Int. Cl.
*C25B 11/077* (2021.01)
*H01M 8/1016* (2016.01)
*H01M 10/0562* (2010.01)

(52) U.S. Cl.
CPC ..... *H01M 8/1016* (2013.01); *H01M 10/0562* (2013.01); *C01P 2002/34* (2013.01); *C01P 2002/50* (2013.01); *C01P 2002/72* (2013.01); *C01P 2002/77* (2013.01); *C01P 2002/86* (2013.01); *C01P 2006/40* (2013.01); *H01M 2300/0071* (2013.01); *H01M 2300/0091* (2013.01)

(58) Field of Classification Search
USPC .......................................................... 429/409
See application file for complete search history.

(56) References Cited

U.S. PATENT DOCUMENTS

2017/0331092 A1* 11/2017 Chen ..................... H01M 4/382
2019/0305278 A1* 10/2019 Saeki ................ H01M 10/0587
2020/0083506 A1* 3/2020 Herle .................. H01M 50/446

FOREIGN PATENT DOCUMENTS

JP      2010-529291 A    8/2010
KR    2016 0007831 A    1/2016

OTHER PUBLICATIONS

Bielecki, Johan et al., "Short-range structure of the brownmillerite-type oxide $Ba_2In_2O_5$ and its hydrated proton-conducting form $BaInO_3H$", Journal of Materials Chemistry A, 2(40):16915-16924 (Sep. 15, 2014).

Lee, Hyeon-Ji et al., "Highly Flexible, Proton-Conductive Silicate Glass Electrolytes for Medium-Temperature/Low-Humidity Proton Exchange Membrane Fuel Cells", ACS Applied Materials & Interfaces, 5:5034-5043 (2013).

Lu, Nianpeng et al., "A protonated brownmillerite electrolyte for superior low-temperature proton conductivity", arxiv.org, Cornell University Library, pp. 1-37 (2018).

Search Report Under Section 17 for Application No. GB2006604.9 dated Feb. 1, 2021 (2 pages).

* cited by examiner

IONIC CONDUCTORS

CROSS-REFERENCE TO RELATED APPLICATIONS

This application is the U.S. National Stage of International Patent Application No. PCT/GB2021/050893, filed on Apr. 14, 2021, which claims the benefit of and priority to Great Britain Patent Application No. 2006604.9, filed on May 5, 2020, the contents of each of which are hereby incorporated by reference in their entireties.

The invention relates to new solid ionic conducting materials for use in electrochemical devices such as fuel cells and electrolysers, to methods of making such materials, and to electrochemical devices using layers of such materials. In particular, the invention relates to the use of oxyhydroxides and/or hydrated oxides of various ceramic oxides with suitable structures and reactivities as solid ionic conducting materials, which may therefore be described as ceramic ionic conducting materials. In some embodiments, the materials may be pure, or primarily, ionic conductors, and may be useful as electrolytes—such materials may be described as electrolyte materials. In other embodiments, the materials may provide mixed ionic and electronic conduction, and may be suitable as electrode materials.

Ionic conducting materials are used, e.g. as electrolytes, in electrochemical devices such as fuel cells, electrolysers, batteries, flow batteries, electrochemical synthesis cells, gas separation cells and sensors. Challenges for electrochemical devices generally include poor durability and high cost; both challenges relating to materials used. Development of robust and low-cost solid ionic conducting materials would allow the durability to be improved and the cost reduced, so making large-scale application more economically feasible. Electrolytes are a particular focus of research, but it will be appreciated that use as an electrolyte is just one example of a wide range of uses for ionic conducting materials in electrochemical devices.

For example, in the field of fuel cells for electric vehicles, proton exchange membrane fuel cells (PEMFCs) are widely used (e.g. as developed by Toyota Mirai and Hyundai IX35). However, the Nafion® membrane electrolyte, which is generally regarded as the best membrane currently available, is not stable due to the oxidation by $H_2O_2$ generated at the cathode side and diffusion of the Pt electrode into the polymer membrane causing short-circuits. The lifetime of hydrogen fuel cells using Nafion® membranes is typically less than 2000 hours, which is not ideal for a vehicle with a typical lifetime of around 10 years. The cost of Nafion® is also very high (often around USD800 per square meter). Therefore it is desirable to identify lower cost membranes. In addition, as Nafion® is a polymeric membrane, it is not very dense. Therefore $H_2$ at the anode of the hydrogen fuel cells can diffuse across the Nafion® membrane, to the cathode. This will lead to the loss of hydrogen at the cathode. As hydrogen is flammable, this may result in potential safety issue as well as reducing efficiency. Therefore it is desirable to develop denser membranes to replace the polymeric Nafion® membrane, ideally whilst retaining the flexibility of the Nafion® membrane. Similarly, in flow batteries cross-diffusion of vanadium ions across the Nafion® membrane can lead to self-discharge, so reducing efficiency.

Moving to different fuel cell types, alkaline membranes based on polymeric electrolytes conducting $OH^-$ ions have been investigated as electrolytes for alkaline membrane fuel cells (AMFCs). The low stability of reported alkaline membranes limits the application of AMFCs. Therefore it is desired to discover robust $OH^-$ ion conducting membranes to be used as electrolytes for new alkaline fuel cells. Replacing the liquid KOH solution electrolyte in conventional alkaline fuel cells with a solid electrolyte could also facilitate the use of air (without removal of $CO_2$) as the oxidant at the cathode, so reducing operating cost. The same applies to some metal-air batteries, e.g. Zn-air batteries in which KOH solution is currently used as the electrolyte.

The skilled person would appreciate that many other examples in the fields of electrochemical synthesis, wastewater treatment, gas separation, and the likes could also be listed, emphasising a desire for improved $H^+$ and $OH^-$ ionic conducting materials. There is therefore a desire for new ionic conducting materials for use as electrolytes.

According to a first aspect of the invention, there is provided a solid electrolyte for use in an electrochemical device, the electrolyte comprising an oxyhydroxide derived from of an oxide with a perovskite or Brownmillerite structure. The oxyhydroxide has the general formula:

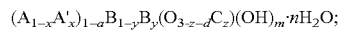

$$(A_{1-x}A'_x)_{1-a}B_{1-y}B'_y(O_{3-z-d}C_z)(OH)_m \cdot nH_2O;$$

wherein:
A and A' are selected from Ca, Sr, Ba, Ln, Y, Na, K, Rb, Cs, Pb, and Bi;
B and B' are selected from Co, Fe, Mn, In, Ni, Cu, Zn, Sc, Ti, V, Cr, Ga, Ge, Al, Si, Sn, Sb, Zr, Hf, Nb, Mo, W, and Ta, and comprise at least one of Ti, V, Cr, Mn, Fe, Co, Ni, and Cu;
C is selected from N, Cl, F, Br, S, and Se;
$0 \leq x \leq 1$; $0 \leq y \leq 1$; $a \leq 0.15$; $z \leq 0.2$; $d \leq 2$; $m \geq 0.01$; and $n \geq 0$.

B and B' may be selected from Co, Fe, Mn, Ni, Cu, Zn, Sc, Ti, V, Cr, Ga, Ge, Al, Si, Sn, Sb, Zr, Hf, Nb, Mo, W, and Ta. In particular, Indium may be excluded as its properties as compared to the other compositions may not justify the relatively high cost. B and B' may both be selected from the following elements: Sc, Ti, V, Cr, Mn, Fe, Co, Ni, Cu, and Zn. B and B' may comprise at least one of Mn, Fe, Co, Ni, and Cu, and optionally at least one of B and B' is Cobalt (Co) or Iron (Fe).

Optionally, at least one of A and A' may be Strontium (Sr).
Example materials include $Sr_2Fe_2O_5$ and $SrCo_{0.5}Ti_{0.5}O_{3-\delta}$.

When n=0, the oxyhydroxide may be described as anhydrous. When n>0, the oxyhydroxide may be described as hydrated.

The oxide with the perovskite or Brownmillerite structure from which the electrolyte material is made may be referred to as the starting material. Optionally, the starting material may have a Brownmillerite structure, and may be $Sr_2Co_2O_5$, more precisely $Sr_2Co_2O_{5\pm\delta}$, or $Sr_2Fe_2O_5$, more precisely $Sr_2Fe_2O_{5\pm\delta}$. The electrolyte may therefore comprise an oxyhydroxide derived from the Brownmillerite-structured $Sr_2Co_2O_{5\pm\delta}$ or $Sr_2Fe_2O_{5\pm\delta}$, respectively. Oxygen-deficient Brownmillerite-structured oxide may be selected (i.e. $O_{5-\delta}$). Optionally, the starting material may have a perovskite structure, and may be $SrCoO_3$, more precisely $SrCoO_{3-\delta}$, or $SrFeO_3$, more precisely $SrFeO_{3-\delta}$. The electrolyte may therefore comprise an oxyhydroxide derived from the perovskite-structured $SrCoO_{3-\delta}$ or $SrFeO_{3-\delta}$, respectively. When a perovskite-structured oxide is used, an oxygen-deficient perovskite-structured oxide may be selected (i.e. $\delta > 0$, $O_{3-\delta}$, unlike for the Brownmillerite structured oxides in which $\pm\delta$ is accepted in various embodiments).

The value of m may be in the range from 0.01 to 2, optionally in the range from 0.2 to 1.5, and further optionally in the range from 0.5 to 1. The value of n may be in the range from 0 to 12, optionally in the range from 0.1 to 2, and further optionally in the range from 0.2 to 1.5.

The oxide with a perovskite or Brownmillerite structure may be one or more of: (i) $Sr_2Co_2O_{5\pm\delta}$; (ii) $Sr_2Co_2O_{5-x}N_x$; (iii) $Ca_2Co_2O_{5\pm\delta}$; (iv) $SrCoO_{3-\delta}$; (v) $CaCoO_{3-\delta}$; (vi) $SrCaFeCoO_{5\pm\delta}$; (vii) $SrCaCo_2O_{5\pm\delta}$; or (viii) $SrCo_{0.5}Ti_{0.5}O_{3-\delta}$; (ix) $Sr_2Fe_2O_{5\pm\delta}$; (x) $Sr_2Fe_2O_{5-x}N_x$; (xi) $Ca_2Fe_2O_{5\pm\delta}$; or (xii) $SrCaFe_2O_{5\pm\delta}$.

The A-site and/or the B-site may therefore be occupied by mixed elements, and the oxide may be a pure oxide (with no C-site element other than oxygen) or a doped oxide (e.g. an oxynitride as listed as example (ii) above).

The starting material may comprise a single oxide composition (not counting impurities), or multiple different oxides selected according to the above criteria.

The oxyhydroxide (be it anhydrous or hydrated) forms a major component of the electrolyte, and optionally may form the only ionic conducting material of the electrolyte. In some cases, the electrolyte may consist of the oxyhydroxide material (not counting any impurities or remaining binder material).

According to a second aspect, there is provided a solid electrolyte for use in an electrochemical device, the electrolyte comprising a hydrated oxide derived from of an oxide with a Brownmillerite structure. The hydrated oxide has the general formula:

$$(A_{2-x}A'_x)_{1-a}B_{2-y}B'_y(O_{1-z}C_z)_{5\pm\delta} \cdot n'H_2O$$

wherein:
A and A' are selected from Ca, Sr, Ba, Ln, Y, Na, K, Rb, Cs, Pb, and Bi;
B and B' are selected from Co, Fe, Mn, Ni, Cu, Zn, Ti, V, Cr, Ga, Ge, Al, Si, Sn, Sb, Zr, Hf, Nb, Mo, W, and Ta;
C is selected from N, Cl, F, Br, S, and Se;
$a \leq 0.15$; $0 \leq x \leq 1$; $0 \leq y \leq 1$; $z \leq 0.04$; and $n' \geq 0.01$.

The value of a may be less than or equal to 0.10. Narrower selections of compositions may be made, as listed for the first aspect.

The oxide with a Brownmillerite structure may be one or more of:
(i) $Sr_2Fe_2O_5$; $Si_2O_2O_5$; or (iii) $Sr_2Co_2O_{5-x}N_x$; (iv) $Sr_2FeCoO_5$; or (v) $Sr_2Fe_2O_{5-x}N_x$.

The starting material may comprise a single oxide composition (not counting impurities), or multiple different oxides selected according to the above criteria. The hydrated oxide forms a major component of the electrolyte, and optionally the only ionic conducting material of the electrolyte. In some cases, the electrolyte may consist of the hydrated oxide material (not counting any impurities).

According to a third aspect, there is provided a solid electrolyte for use in an electrochemical device, the electrolyte comprising a hydrated oxide derived from of an oxide with a perovskite structure, the hydrated oxide having the general formula:

$$(A_{1-x}A'_x)_{1-a}B_{1-y}B'_yO_{3-z-d}C_z \cdot n''H_2O$$

wherein:
A and A' are selected from Ca, Sr, Ba, Ln, Y, Na, K, Rb, Cs, Pb, and Bi;
B and B' are selected from Co, Fe, Mn, In, Ni, Cu, Zn, Sc, Ti, V, Cr, Ga, Ge, Al, Si, Sn, Sb, Zr, Hf, Nb, Mo, W, and Ta, and comprise at least one of Ti, V, Cr, Mn, Fe, Co, Ni, and Cu;
C is selected from N, Cl, F, Br, S, and Se; $0 \leq x \leq 1$; $0 \leq y \leq 1$; $a \leq 0.15$; $z \leq 0.2$; $d \leq 2$; and $n'' \geq 0.01$.

The value of a may be less than or equal to 0.1. Narrower selections of compositions may be made, as listed for the first aspect. For example, the oxide with a perovskite structure may be one or more of: $SrCoO_{3-\delta}$; or $SrCo_{0.5}Ti_{0.5}O_{3-\delta}$. An oxygen-deficient perovskite-structured oxide may be selected.

The starting material may comprise a single oxide composition (not counting impurities), or multiple different oxides selected according to the above criteria. The hydrated oxide forms a major component of the electrolyte, and optionally the only ionic conducting material of the electrolyte. In some cases, the electrolyte may consist of the hydrated oxide material (not counting any impurities).

According to a fourth aspect, there is provided a solid electrolyte for use in an electrochemical device, the electrolyte comprising a hydrated oxide or a hydrated or non-hydrated oxyhydroxide derived from of an oxide with a $K_4CdCl_6$ structure. The oxide with the $K_4CdCl_6$ structure has the general formula:

$$(A_{1-x}A'_x)_3B_{2-y}B'_yO_{6-z}C_z$$

wherein:
A and A' are selected from Ca, Sr, Ba, Na, K, Rb, Cs, Ln, Y, Pb, and Bi;
B and B' are selected from Co, Fe, Mn, Ni, Cu, Ti, V, Cr, alkaline earth, lanthanide, Y, Zn, Cd, Na, B, Ga, Ge, Al, Si, Sn, Sb, Zr, Hf, Nb, Mo, W, Ta, Pt, Ir and Ru, and comprise at least one of the elements Ti, V, Cr, Mn, Fe, Co, Ni, and Cu;
C is selected from N, Cl, F, Br, S, and Se;
y is in the range from 0 to 2; z is in the range from 0 to 0.5; and x is in the range from 0 to 1.

B and B' may be selected from Co, Fe, Mn, Ni, Cu, Ti, V, Cr, alkaline earth, lanthanide, Y, Zn, Cd, Na, B, Ga, Ge, Al, Si, Sn, Sb, Zr, Hf, Nb, Mo, W, and Ta. In particular, Pt, Ir and Ru may be excluded as their cost may be too high. At least one of B and B' may be selected from Co, Fe, Mn, Ni, and Cu.

The oxide may be $Ca_3Co_2O_6$. The solid electrolyte may comprise a hydrated oxide with the general formula: $(A_{1-x}A'_x)_3B_{2-y}B'_yO_{6-z}C_z \cdot nH_2O$, where n is greater than or equal to 0.01, x is in the range from 0 to 1, y is in the range from 0 to 2, and z is in the range from 0 to 0.5.

The solid electrolyte may comprise an oxyhydroxide with the general formula: $(A_{1-x}A'_x)_3B_{2-y}B'_yO_{6-z}C_z(OH)_m \cdot nH_2O$, where x is in the range from 0 to 1, y is in the range from 0 to 2, z is in the range from 0 to 0.5, and m is in the range from 0.01 to 6. For hydrated oxyhydroxides, the value of n may be greater than or equal to 0.01.

The starting material may comprise a single oxide composition (not counting impurities), or multiple different oxides selected according to the above criteria. The oxyhydroxide or hydrated oxide generally forms a major component of the electrolyte, and optionally the only ionic conducting material of the electrolyte. In some cases, the electrolyte may consist of the oxyhydroxide or hydrated oxide material (not counting any impurities).

The solid electrolyte as described in any of the preceding aspects may be a pure ceramic electrolyte.

The solid electrolyte as described in any of the preceding aspects may instead be a composite electrolyte comprising at least one hydrated oxide or hydrated or non-hydrated (anhydrous) oxyhydroxide as described above, mixed with one or more polymers. The composite electrolyte may comprise several different polymers. The composite electrolyte may be in the form of a flexible membrane. The composite electrolyte may comprise between 1% and 99% by volume of the at least one hydrated oxide or hydrated or non-hydrated oxyhydroxide, optionally 10% to 80% by volume, and further optionally 30% to 50% by volume. The vol. % of the ceramic may be at least 30-33%. The vol. % of the ceramic may be at most 85%. The density of the composite may be significantly higher than that of the polymer component thereof. The polymer may be or comprise a hydrophilic polymer. The main composition of the polymer may be hydrophilic (e.g. over 50% by volume, and optionally over 70% or 90% by volume). A small amount of a hydrophobic polymer, such as PTFE, may be included. The polymer(s) may be selected such that the ceramic-polymer composite is hydrophilic overall, to facilitate diffusion of water into the composite to wet the ceramic component.

According to a fifth aspect, there is provided a method of manufacturing a solid electrolyte for use in an electrochemical device, the method comprising:

acquiring a ceramic oxide material, wherein the ceramic oxide material is an oxide with a perovskite, Brownmillerite or $K_4CdCl_6$ structure and comprises A-site ions of one or more elements selected from Ca, Sr, Ba, Ln, Y, Na, K, Rb, Cs, Pb, and Bi and B-site ions of one or more elements selected from Co, Fe, Mn, In, Ni, Cu, Zn, Sc, Ti, V, Cr, Ga, Ge, Al, Si, Sn, Sb, Zr, Hf, Nb, Mo, W, Ta, Pt, Ir and Ru;
  introducing additional oxygen vacancies into the acquired ceramic oxide material by:
    (i) firing the ceramic oxide material in an atmosphere with a lower partial pressure of oxygen than air;
    (iii) soaking the ceramic oxide material in a reducing liquid, or
    (iv) electrochemically reducing the fired ceramic oxide material; and
  treating the ceramic oxide material with water, the treatment comprising soaking the fired ceramic oxide material in water, or exposing it to an atmosphere with at least 1 vol. % water, to form a hydrated oxide or a hydrated or non-hydrated oxyhydroxide.

The electrolyte formed may be as described with respect to any of the preceding aspects—the A and B site ions of the acquired ceramic oxide material may therefore be selected accordingly, using the criteria described above.

The atmosphere with a lower partial pressure of oxygen than air may have an oxygen partial pressure ($pO_2$) of less than or equal to 0.01 atm.

The atmosphere with a lower partial pressure of oxygen than air may have substantially no oxygen, in some embodiments. The atmosphere with a lower partial pressure of oxygen than air may be: (i) an inert atmosphere (e.g. nitrogen or argon); or (ii) a reducing atmosphere (e.g. hydrogen, or a mixture of an inert gas and a reducing gas such as 5 vol. % $H_2$/Ar). Alternatively, the atmosphere may comprise a mixture of oxygen or air and an inert gas. It will be appreciated that the typical $pO_2$ for commercial Ar or $N_2$ is non-zero, and often around 0.00001 atm ($10^{-5}$ atm). An "inert" atmosphere may therefore include trace oxygen. Any trace oxygen in a reducing atmosphere is likely to burn off during firing. In embodiments in which the ceramic oxide material is fired in an atmosphere with a lower partial pressure of oxygen than air, a firing temperature of between 200 and 1200° C. may be selected, optionally in the range from 300 to 1000° C., and further optionally in the range from 400 to 800° C. The acquired ceramic oxide material may be at least one of:
  (i) an oxide with a perovskite structure, which optionally may be as described with respect to the first and/or third aspect, such as $SrCoO_{3-\delta}$ or $SrCo_{0.5}Ti_{0.5}O_{3-\delta}$;
  (ii) an oxide with a Brownmillerite structure, which optionally may be as described with respect to the first and/or second aspect, such as $Sr_2Co_2O_{5\pm\delta}$, or $Sr_2Fe_2O_{5\pm\delta}$; or
  (iii) an oxide with a $K_4CdCl_6$ structure, which optionally may be as described with respect to the fourth aspect, such as $Ca_3Co_2O_6$.

The treatment with water may be performed for a period of at least 2 hours, optionally of at least 48 hours, and further optionally of at least 96 hours.

The acquired ceramic oxide material may be an oxide with a perovskite, Brownmillerite or $K_4CdCl_6$ structure and may comprise A-site ions of one or more elements selected from Ca, Sr, Ba, Ln, Y, Na, K, Rb, Cs, Pb, and Bi, and B-site ions of one or more elements selected from Co, Fe, Mn, In, Ni, Cu, Zn, Sc, Ti, V, Cr, Ga, Ge, Al, Si, Sn, Sb, Zr, Hf, Nb, Mo, W, and Ta.

The solid electrolyte produced by the method may be a pure ceramic electrolyte. In such embodiments, a single firing step may be arranged to sinter the ceramic material, so as to form a sintered material arranged to hold the desired shape for the electrolyte, and to introduce the additional oxygen vacancies. Alternatively, the material may be sintered in air in a first firing step, prior to firing the sintered material in an atmosphere with a lower partial pressure of oxygen than air to introduce the additional oxygen vacancies. Alternatively, the material may be sintered in air and then treated to introduce oxygen vacancies without further firing (e.g. treatment with a reducing liquid).

In particular in embodiments in which a single-step firing procedure sinters the material as well as introducing the additional oxygen vacancies, the temperature selected for the firing may be in the range of 300° C. or 500° C. to 1700° C., optionally of 500° C. to 1500° C., or 700° C.-1400° C., and further optionally of 800° C. or 900° C. to 1200° C.

The method may comprise firing the ceramic oxide material at a temperature of between 50° C. and 700° C. below the melting point of the ceramic oxide material, and optionally between 50° C. and 300° C. below the melting point, so forming the fired ceramic oxide material. The firing may sinter the ceramic oxide material. The temperature selected for the firing may be between 50° C. and 200° C. below the melting point of the ceramic oxide material.

Therefore the solid electrolyte may be a pure ceramic electrolyte, and the firing step may be arranged to sinter the ceramic material so as to form a sintered material arranged to hold the desired shape for the electrolyte. The firing, where present, may be a single-step process or a multi-step process (e.g. using two or more different firing temperatures, and/or two or more different firing atmospheres). The dwell time for the firing process may be selected so as to make a sintered ceramic material with sufficient mechanical strength to keep the desired shape after firing.

In some embodiments, sintered oxide materials (e.g. in the form of one or more pellets or films) may be obtained, and a (second) firing step may then be performed in order to generate oxygen vacancies. For example, the sintered oxide may be fired in a reducing atmosphere, such as pure $H_2$. The firing temperature for this step may be lower than that for the sintering step. The firing temperature for this step may be 200° C. to 1000° C. or 1200° C., optionally 300° C. to 700° C. or 1000° C., and further optionally 400° C. to 500° C. or 700° C. A diluted $H_2$ atmosphere, e.g. 5 vol. % $H_2$ in Ar or $N_2$, may be used in other embodiments, potentially provide better control of the firing conditions by reducing the decomposition of oxides as compared to that in pure $H_2$.

Alternatively, the method may comprise mixing the ceramic material with one or more polymers to form a composite ceramic-polymer electrolyte.

The solid electrolyte produced by the method may instead be a ceramic-polymer composite electrolyte. The method may further comprise, before the treatment with water, mixing the ceramic material with one or more polymers to form a composite ceramic-polymer electrolyte. The mixing the ceramic material with one or more polymers is performed after the step of introducing additional oxygen vacancies in most embodiments—it will be appreciated that the use of firing after mixing with polymers would generally be limited by a melting or decomposing temperature of a polymer. Similarly, some reducing liquids or reducing treatments may damage the polymer membrane—however, some treatments with reducing liquids, for example, may be suitable for application after the ceramic has been mixed with the polymer(s).

For the embodiments described herein, it is generally desirable to sinter materials for use as pure ceramic electrolytes. However, it is generally not desirable to sinter the ceramic to being fully dense, in order to leave space to accommodate volume expansion and to allow water to diffuse through the pellet, membrane, or the like formed. The sintering temperature can therefore be selected to be significantly lower than the melting point of the oxide material.

For the embodiments described herein, it is generally desirable not to sinter materials for use as composite polymer-ceramic electrolytes, as a finer powder may be preferable for incorporation into a polymer composite material, especially when a thin membrane is to be made. If the ceramic material is to be used to form such a composite electrolyte, the firing conditions may therefore be selected to avoid sintering—for example using a lower firing temperature (e.g. more than 300° C. below the melting point of the ceramic oxide material, or even more than 700° C. below the melting point) and/or a shorter firing time, or spreading the powder to be fired such that the particles are separated and do not conjoin on heating. For oxide powders to be used for making ceramic-polymer composite electrolytes, the firing temperature should generally be high enough to generate more oxygen vacancies while avoiding decomposition and/or and sintering of the oxide powders. Instead of avoiding sintering, a sintered material may be ground to a powder for use in a composite electrolyte in some embodiments.

In summary, when sintering pure ceramic electrolytes, e.g. in the form of one or more pellets or films, the firing temperature for sintering is generally selected to be high enough to give the ceramic electrolyte formed sufficient mechanical strength—that temperature is generally also high enough to introduce oxygen vacancies provided that a suitable atmosphere is selected. When the oxides are prepared for use in ceramic-polymer composite electrolytes, the firing temperature is generally selected to be high enough for the addition of oxygen vacancies to the Brownmillerite, perovskite or $K_4CdCl_6$ structure while avoid the sintering of these powders.

Once treated to introduce more oxygen vacancies, the ceramic oxide material may be soaked in water, or exposed to an atmosphere with at least 1 vol. % water. This treatment with water may be performed for a period of at least 2 hours, optionally of at least 48 hours, and further optionally of at least 96 hours. The skilled person would appreciate that the time period may be selected based on oxide structure and composition, and/or on electrolyte size, porosity, and tortuosity, amongst other features. The water may be provided as liquid water, water vapour (e.g. using a humidified gas stream) and/or steam.

In some embodiments, the oxide material may still have insufficient oxygen vacancies even after firing in an atmosphere with a low partial pressure of oxygen. In such cases, the method may further comprise soaking the fired ceramic oxide material in a reducing liquid, or electrochemically reducing the fired ceramic oxide material. This treatment may be performed prior to the soaking the material in water or exposing it to an atmosphere with at least 1 vol. % water, or simultaneously therewith. In other embodiments, the treatment with a reducing liquid and/or electrochemical reduction is performed instead of the firing in an atmosphere with a low partial pressure of oxygen.

The method may be used to prepare solid electrolytes as described in any preceding aspect.

The method may comprise mixing the ceramic material with one or more polymers to form a composite electrolyte. According to a sixth aspect, there is provided a solid electrolyte for use in an electrochemical device, the electrolyte being made by the method of the fifth aspect. The electrolyte may be a ceramic electrolyte, or a composite electrolyte including a ceramic component.

According to a seventh aspect, there is provided an electrochemical device comprising a solid electrolyte as described in any of the first to fourth or sixth aspects, and/or made by the method of the fifth aspect. The electrochemical device may be arranged to keep the electrolyte hydrated in use, in particular where a hydrated oxide or hydrated oxyhydroxide is used.

The electrochemical device may be a fuel cell, electrolyser, or battery. For example, the electrochemical device may be a redox flow battery, aqueous battery, or Zn-air battery. The electrochemical device may be an electrochemical synthesis cell or gas separation cell.

The starting material oxides may not be pure/a single phase. As the conductivity of the identified materials, such as $Sr_2Fe_2O_5$, after reacting with water, is relatively high, even contamination with as much as 30 vol. % of an insulating ceramic impurity (such as $Al_2O_3$, or $TiO_2$) may still provide a final material with an ionic conductivity high enough for use as electrolyte for electrochemical devices. Similarly, a second phase may be made when preparing the oxide materials—for example, a smaller amount of $Sr_3Ti_2O_7$ may be formed alongside the desired $SrCo_{0.5}Ti_{0.5}O_{3-\delta}$. However, the smaller amount (e.g. up to 30 vol. %) of $Sr_3Ti_2O_7$ may not prevent the material from being used as an electrolyte.

It is envisaged that the lifetime of hydrogen fuel cells may be extended from 2000 hours to 20000 hours when the current electrolyte membranes are replaced by an electrolyte as described herein. The electrolyte cost may also be reduced, as the pure ceramic electrolytes or composite membranes comprise relatively cheap inorganic materials. Hydrogen, or liquid fuel feed, fuel cells may therefore be made more competitive with battery technologies in various fields, such as electric vehicles. In particular, electrolytes as described herein may provide one or more of improved stability, reduced cost, and equivalent or higher ionic conductivity (tests have demonstrated equivalent conductivities to Nafion® membranes, as described in more detail below). Electrolytes and electrochemical devices as disclosed herein may have many and varied applications. The solid state electrolytes may be used to solve problems for existing electrochemical devices such as fuel cells (e.g. PEMFCs, alkaline fuel cells, alkaline membrane fuel cells) electrolysers, super-capacitors, batteries (e.g. flow batteries, metal-air batteries and aqueous batteries), gas separation/purification, gas sensors, electrochemical synthesis, etc. In typical hydrogen fuel cells based on polymer electrolyte membrane fuel cells (PEMFs), typically with a Nafion® membrane as the electrolyte, it is required to humidify the both the $H_2$ at the anode and air/$O_2$ at the cathode in order to keep the Nafion membrane hydrated in order to retain high proton conduction of the electrolyte membrane. Some of the materials described herein (in both the preceding and the subsequent aspects) are mixed $H^+$/$OH^-$ ion conductors. When they are used as electrolytes for hydrogen fuel cells, protons are generated at the anode to move to the cathode to further react with $O_2$ and form $H_2O$ at the cathode which can hydrate the electrolyte, while the formed $H_2O$ at the cathode may react in situ with $O_2$, e.g. $O_2$ from air, to form $OH^-$ ions, to further transport to the anode to react with $H_2$ to form $H_2O$ again which may hydrate the electrolyte. As water is generated at both anode and cathode, this may reduce requirements on humidifying the $H_2$ at the anode and $O_2$/air at the cathode. Various embodiments may therefore provide an advantage over the conventional PEMFCs using either $H^+$ or $OH^-$ ion conductor as the electrolyte.

When the ceramic ionic conducting material, either as a pure ceramic layer of the ionic conducting material or combined with another ceramic material, or other material such as a polymer, to form a composite dense membrane, is used as an electrolyte for electrochemical devices such as fuel cells, electrolysers, or redox flow cells, the cross-diffusion of chemicals, ions and gases may be efficiently avoided—it will be appreciated that cross-over is a big issue for conventional fuel cells, electrolysers and redox flow cells (e.g. vanadium redox flow batteries) when traditional polymer-based membranes are used as the electrolyte. A polymer-ceramic composite containing a polymer such as HDPE combined with a conducting oxide material such as $SrZr_{0.8}Y_{0.2}O_{3-\delta}$, can have excellent mechanical strength and also be sufficiently dense to reduce the cross-diffusion of chemicals and gases. A membrane made from such a material may be much denser than Nafion®.

Electrolysers as discussed herein may be arranged to perform electrolysis of water to produce $H_2$ and $O_2$, or electrolysis of ammonia or urea aqueous solutions to generate $H_2$ and $N_2$. In the chlor-alkali industry, ion exchange membranes, such as Nafion®, are used as the electrolyte for electrolysis of NaCl aqueous solutions for the production of NaOH, $H_2$ and $Cl_2$. However, the long-term stability of the ion exchange membrane is an issue. The membrane made of the ionic conductors as described herein, either in the pure form or mixed with another ceramic or polymer to form a composite material with improved mechanical strength, exhibits sufficient ionic conductivity to be an ideal electrolyte for electrolysis of aqueous NaCl or KCl solutions for the chlor-alkali industry. These membranes may also be used for other industrial chemical production processes through electrolysis or electrodialysis as long the process involves the transport of $H^+$ or/and $OH^-$ ions.

Low-temperature electrolysers often have an alkaline electrolyte, typically using a KOH aqueous solution as the electrolyte while $CO_2$ from water must be removed. The materials described herein may replace the aqueous KOH solution and reduce the requirements on $CO_2$ removal. Developing electrolysers based on polymeric membranes is desirable in order to have quick start-up and to shorten the responding time, compared to the conventional alkaline electrolyser based on an aqueous KOH solution electrolyte. A short response time is very important for use of renewable electricity for electrolysis of water for renewable energy storage because of the intermittent nature of wind, solar and other renewable energy sources. The electrolysers based on acidic membranes such as Nafion® require to use noble metal catalysts such as Pt, Ir in the electrode, thus cost is too high for large scale applications. When the acidic membrane is replaced by an alkaline membrane, a cheaper electrode can be used, but durability of current alkaline membranes is not good enough. Therefore it is desirable to develop robust membranes which can conduct either $H^+$ or $OH^-$ or both to be used as electrolytes for electrolysers. The materials described herein provide a solution to enable these new technologies. As for alkaline electrolysers or alkaline membrane electrolysers, cheap non-noble metal catalysts can be used as electrodes in the electrolysers based on the ionic conducting electrolytes described herein, thus the cost of the electrolyser may be significantly reduced, pushing forward towards large scale applications. For other electrochemical process such as electrochemical reduction of $N_2$ or $CO_2$ to produce ammonia or hydrocarbons, desalination, wastewater treatment, as long the process involves the transport of $H^+$ or/and $OH^-$ ions, these ionic conductors again have the potential to be used as the electrolytes.

In the chemical industry, there are a lot processes which require separating $H_2$ from a mixture or purifying less pure $H_2$ to highly pure $H_2$. The ionic conductors described herein with $H^+$/$OH^-$ ion conduction can be used for separation or purification $H_2$. When wet $H_2$ or a mixture containing $H_2$, is supplied at the positive side of an electrochemical device, after applying a DC voltage, the $H_2$ at the positive electrode can be ionised to $H^+$ ions and then transported to the other side of the electrolyte, i.e., the negative electrode, where it gains electrons to form pure $H_2$ again. The $H_2$ generated at the negative side will be very pure as all other gases/chemicals are blocked by the dense pure ceramic or a composite (e.g. a ceramic-ceramic or ceramic-polymer composite) electrolyte with $H^+$ conduction. As there are electrodes and applied DC voltage through wires, this process may be called a 'wired' process.

Some of these oxides are mixed $H^+$/electron conductor when they are hydrated. In this case, when they are used as dense membranes for gas separation, applying a DC voltage to it would cause a short-circuit due to the electronic conduction in the dense separation membrane. However, if one side is exposed to a mixture containing $H_2$ (pure or otherwise), and the other side is exposed to a lower pressure of pure steam or wet $H_2$, then $H_2$ from the mixture will diffuse to the other side at lower pressure (can be achieved by a vacuum pump) thus $H_2$ separation/purification is also achieved through a mixed $H^+$/e' conducting dense membrane (a mixed $H^+$/$OH^-$/e' conductor may also be used). Again, $H_2$ generated at the low pressure side may be very pure as all other gases/chemicals are blocked by the dense pure ceramic, polymer-ceramic composite, or ceramic-ceramic composite layer with $H^+$ conduction. As there is no applied DC potential, thus no wires, this process may be called a 'wireless' process.

Similarly to the 'wired' and 'wireless' process for $H_2$ separation/purification, the ionic conductors described herein with $O^{2-}$ ionic conduction can also be used to separate $O_2$ from a mixture containing $O_2$, such as wet air, or to purify low grade $O_2$ to very pure $O_2$, using a similar mechanism while $O^{2-}$ ions, instead of $H^+$ ions are transported in the dense ceramic or ceramic-ceramic or ceramic-polymer composite membrane with sufficient mechanical strength. Similarly, when using a mixed $OH^-$/e' conductor (optionally a mixed $O^{2-}$/$H^+$/e' conductor), $O_2$ separation/ purification can be achieved through the 'wireless' process when there is a difference in partial pressure of $O_2$ between different sides of the dense ceramic or composite membrane. For example, if wet air is exposed to one side of an electrochemical separator using a mixed $O^{2-}/e'$ (or $O^{2-}/H^+/e'$) conductor, and the other side is exposed to low pressure steam or wet $O_2$, $O_2$ will diffuse from wet air to the other side while highly pure wet $O_2$ is generated at the low pressure side, thus separation of $O_2$ from air has been achieved. $O_2$ generators are widely used in hospitals to treat patients with breathing difficulties, such as those with Covid-19.

In gas/coal fired power stations, in order to capture the generated $CO_2$, researchers propose to use pure $O_2$ instead of air to burn coal/nature gas to generate relatively pure $CO_2$ without $N_2$/inert gases from air, thus simplifying/by-passing the separation process. This process is called an oxyfuel combustion process. The main challenge is lack of technology for efficiently separating $O_2$ from air. The described $O^{2-}$ ionic conductor (optionally a mixed $O^{2-}/H^+$ conductor) and mixed $O^{2-}/e'$ ionic conductor (optionally a mixed $O^{2-}/H^+/e'$ conductor) can be used for $O_2$ separation or purification through the 'wired' and 'wireless' process respectively, similarly to the $H_2$ separation/purification process. Such a material can also separate $O_2$ from wet air for the oxyfuel combustion process for the coal/gas fired power stations or other similar processes.

Oxide-polymer composites with ionic ($H^+/OH^-$) or mixed ionic/e' ($H^+/OH^-/e'$) conduction can also be used for the $H_2/O_2$ separation/purification processes as described above, although the purity level of the obtained $H_2/O_2$ may be lower due to potential cross-diffusion of gases/chemicals though the polymer parts of the composites. However, this may not be an issue if the requirement on gas purity is not very high, such as $O_2$ for oxyfuel combustion, or if a sufficiently dense polymer is used.

Some of the oxides, such as $Sr_2Co_2O_5$, form a mixed ionic/e' conductor when treated in water after fired in air or further fired in Ar for a short period of time. These materials can be used for $H_2$ or $O_2$ separation/purification through the 'wireless' process as described. As for a pure ionic conductor, it can be mixed with an electronic conductor such as a metal (steel, titanium etc.) or a non-metal (carbon, graphene etc.) or an electronic conducting polymer (polypyrrole (PPY), polyaniline (PAN) etc.) to form a mixed ionic/electronic composite to be used for $H_2/O_2$ separation. The mixed $H^+/OH^-/e'$ conductor, either in a pure phase, such as $Sr_2Co_2O_5$, or mixed with other materials to form composites, can also be used as electrodes in electrochemical devices such as fuel cells, electrolysers, batteries or supercapacitors. For example, when $SrZr_{0.8}Y_{0.2}O_{3-\delta}$ is used as the electrolyte for fuel cells, electrolysers, batteries or supercapacitors, $SrZr_{0.8}Y_{0.2}O_{3-\delta}$ may be added to both negative and positive electrodes of these devices in order to improve the ionic conduction of the electrode, facilitating the transportation of $H^+/OH^-$ ions in the electrodes, reducing the over-potential on both electrodes, and making the electrochemical devices work more efficiently. Of course, other $H^+/OH^-$ conductors (such as $SrCe_{0.8}Y_{0.2}O_{3-\delta}$ or mixed $H^+/OH^-/e'$ conductors (such as $Sr_2Co_2O_5$ when fired in air) can be added into the electrodes too, playing the same role as $SrZr_{0.8}Y_{0.2}O_{3-\delta}$. Therefore, the mixed $H^+/OH^-/e'$ conductors can be used as a components in electrodes in various electrochemical devices too.

Reducing cross-diffusion of chemicals or gases between the anode and cathode chambers in electrochemical devices is big challenge in current electrochemical devices. For example, in all vanadium redox flow batteries, the cross-diffusion of different vanadium ions between the two chambers leads to self-discharge when polymer membranes such as Nafion® are used as the electrolyte. This is a big challenge for the large-scale application of all vanadium redox flow batteries. For direct methanol fuel cell, the cross-diffusion of methanol from the anode to the cathode is also a big problem. For conventional hydrogen fuel cells with a polymer electrolyte, the same problem may arise—the cross-diffusion of hydrogen from the anode to the cathode in a fuel cells. This cross-diffusion may be solved when a pure dense ceramic membrane, or a ceramic-ceramic composite (without, or with only a small proportion of, polymer), or a ceramic-polymer composite (if the polymer is carefully selected, such as various plastics) is used as the electrolyte. The ceramic, ceramic-ceramic composite, or ceramic-polymer composite electrolytes described herein may offer the advantage of reducing or eliminating cross-diffusion. In some specific applications, for example, 'wireless' gas separation, a dense ceramic-metal composite membrane may be used to avoid the cross-diffusion of chemicals or gases.

According to a further aspect, there is provided an electrochemical device comprising a solid ionic conducting layer, the ionic conducting layer comprising an oxyhydroxide derived from of an oxide with a perovskite or Brownmillerite structure, the oxyhydroxide having the general formula:

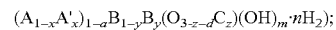

wherein:
A and A' are selected from Ca, Sr, Ba, Ln, Y, Na, K, Rb, Cs, Pb, and Bi;
B and B' are selected from Ln, Y, Sc, Mg, Ca, Sr, Li, Na, Co, Fe, Mn, In, Ni, Cu, Zn, Sc, Ti, V, Cr, Ga, Ge, Al, Si, Sn, As, Sb, Zr, Hf, Nb, Mo, W, Cd, and Ta;
C is selected from N, Cl, F, Br, S, Te, and Se;
$0 \leq x \leq 1$; $a \leq 0.15$; $z \leq 0.2$; $y \leq 1$; $d \leq 2$; $m \geq 0.01$; $n \geq 0$,
and wherein the electrochemical device is arranged such that, in use, the ionic conducting layer is exposed to liquid water or to gas with at least 5 vol. % water.

The water may be provided as liquid water, as water in a humidified gas, or in the form of steam. The water may be provided at above room temperature, for example being at a temperature of 80° C. or above, or 90° C. or above.

As used herein and elsewhere in the scientific literature, Ln is the informal chemical symbol for the lanthanides; the 15 metallic chemical elements with atomic numbers 57 to 71, from lanthanum to lutetium. Of these, cerium (Ce) has been found to have particularly suitable properties in some embodiments. B or B' may therefore be Ce in some embodiments. Of the lanthanide materials useable at the B-site, Ce, and Y may be of particular interest. Other important lanthanide elements at the B-sites include Yb, Sm, and Gd.

In various embodiments, m is in the range from 0.01 to 2, optionally in the range from 0.2 to 1.5, and further optionally in the range from 0.5 to 1. In various embodiments, n is in the range from 0 to 12, optionally in the range from 0.1 to 2, and further optionally in the range from 0.2 to 1.5.

The solid ionic conducting layer may be one or more of the following: (i) a pure ionic conductor, and optionally may be an electrolyte; (ii) a conductor of $OH^-$ and/or $H+$ ions; and (iii) primarily an $OH^-$ ion conductor. The oxide with a perovskite or Brownmillerite structure may be one or more of: (i) $Sr_2Co_2O_{5\pm\delta}$; (ii) $Sr_2Co_2O_{5-x}N_x$; (iii) $Ca_2Co_2O_{5\pm\delta}$; (iv) $SrCoO_{3-\delta}$; (v) $CaCoO_{3-\delta}$; (vi) $SrCaFeCoO_{5\pm\delta}$; (vii) $SrCaCo_2O_{5\pm\delta}$; or (viii) $SrCo_{0.5}Ti_{0.5}O_{3-\delta}$ (mixed ionic/electronic conductor in water) or $SrTi_{0.7}Co_{0.3}O_{3-\delta}$ (ionic conductor in water); (ix) $Sr_2Fe_2O_{5\pm\delta}$; (x) $Sr_2Fe_2O_{5-x}N_x$; (xi) $Ca_2Fe_2O_{5\pm\delta}$; (xii) $SrZr_{0.8}Y_{0.2}O_{3-\delta}$; (xiii) $SrCe_{0.8}Y_{0.2}O_{3-\delta}$ or $SrCe_{0.85}Y_{0.15}O_{3-\delta}$; (xiv) $SrCeO_{3-\delta}$; or (xv) $SrCaFe_2O_{5\pm\delta}$. The value of δ may be greater than or equal to zero. Optionally, 0≤δ≤1. According to a further aspect, there is provided a solid ionic conducting layer for use in an electrochemical device, the solid ionic conducting layer comprising a hydrated oxide derived from of an oxide with a Brownmillerite structure, the hydrated oxide having the general formula:

$$(A_{2-x}A'_x)_{1-a}B_{2-y}B'_y(O_{1-z}C_z)_{5\pm\delta}\cdot n'H_2O$$

wherein:
A and A' are selected from Ca, Sr, Ba, Ln, Y, Na, K, Rb, Cs, Pb, and Bi;
B and B' are selected from Ln, Co, Fe, Mn, Ni, Cu, Zn, Ti, V, Cr, Ga, Ge, Al, Si, Sn, Sb, Zr, Hf, Nb, Mo, W, As, Y, In, Sc, Sr, Ca, Mg, Li, Na, Cd, and Ta;
C is selected from N, Cl, F, Br, S, Te, and Se;
a≤0.15; 0≤x≤1; 0≤y≤1; z≤0.04; and n'≥0.01.

The oxide with a Brownmillerite structure is one or more of: (i) $Sr_2Fe_2O_5$; $Sr_2FeCoO_5$; (iii) $Sr_2Fe_2O_{5-x}N_x$; and (iv) $Ba_2InCe_{0.5}La_{0.5}O_5$. The solid ionic conducting layer may be or more of the following: (i) a pure ionic conductor, and wherein optionally the solid ionic conducting layer is an electrolyte; (ii) a conductor of $OH^-$ and/or $H^+$ ions; and (iii) primarily an $OH^-$ ion conductor.

According to a further aspect, there is provided a solid ionic conducting layer for use in an electrochemical device, the solid ionic conducting layer comprising a hydrated oxide derived from an oxide with a perovskite structure, the hydrated oxide having the general formula:

$$(A_{1-x}A'_x)_{1-a}B_{1-y}B'_yO_{3-z-d}C_z\cdot n''H_2O,$$

wherein:
A and A' are selected from Ca, Sr, Ba, Ln, Y, Na, K, Rb, Cs, Pb, and Bi;
B and B' are selected from Ln, Y, In, Sc, Sr, Ca, Mg, Li, Na, Co, Fe, Mn, Ni, Cu, Zn, Ti, V, Cr, Ga, Ge, Al, Si, Sn, Sb, Zr, Hf, Nb, Mo, W, Cd, As and Ta; C is selected from N, Cl, F, Br, S, Te, and Se;
0≤x≤1; a≤0.15; z≤0.2; d≤2; n''≥0.01.

The oxide with a perovskite structure may be one or more of: (i) $SrCoO_{3-\delta}$; or (ii) $SrCo_{0.5}Ti_{0.5}O_{3-\delta}$; (iii) $SrZr_{0.8}Y_{0.2}O_{3-\delta}$; (iv) $SrCe_{0.8}Y_{0.2}O_{3-\delta}$; (v) $SrTi_{0.7}Co_{0.3}O_{3-\delta}$; or (vi) $SrCeO_{3-\delta}$.

The solid ionic conducting layer may be or more of the following: (i) a pure ionic conductor, and wherein optionally the solid ionic conducting layer is an electrolyte; (ii) a conductor of $OH^-$ and/or $H^+$ ions; and (iii) primarily an $OH^-$ ion conductor.

According to a further aspect, there is provided a solid ionic conducting layer for use in an electrochemical device, the solid ionic conducting layer comprising a hydrated oxide or a hydrated or non-hydrated oxyhydroxide derived from of an oxide with a $K_4CdCl_6$ structure, the oxide with the $K_4CdCl_6$ structure having the general formula:

$$(A_{1-x}A'_x)_3B_{2-y}B'_yO_{6-z}C_z$$

wherein:
A and A' are selected from Ca, Sr, Ba, Na, K, Rb, Cs, Ln, Y, Pb, In, Tl, and Bi;
B and B' are selected from Co, Fe, Mn, Ni, Cu, Ti, V, Cr, alkaline earth, Mg, Ca, Sr, B, lanthanide (Ln), Y, Zn, Cd, Li, Sc, Na, B, Ga, Ge, Al, Si, Sn, Sb, Zr, Hf, Nb, Mo, W, Ta, Pt, Rh, Ir and Ru (optionally, B and B' may comprise at least one of the elements Ti, V, Cr, Mn, Fe, Co, Ni, Ce, Zr, Y, Sc, and Cu);
C is selected from N, Cl, F, Br, I, S, Te, and Se;
y is in the range from 0 to 2; z is in the range from 0 to 0.5; and x is in the range from 0 to 1.

At least one of B and B' may be selected from Ti, Ce, Zr, Y, Sc, Co, Fe, Mn, Ni, and Cu. Optionally, the oxide may be $Ca_3Co_2O_6$. Of the lanthanide materials useable at the B-site, Ce, and Y may be of particular interest. Other important lanthanide elements at the B-sites include Yb, Sm, and Gd. The solid ionic conducting layer may comprise (i) a hydrated oxide with the general formula $(A_{1-x}A'_x)_3B_{2-y}B'_yO_{6-z}C_z\cdot nH_2O$, where n is greater than or equal to 0.01, x is in the range from 0 to 1, y is in the range from 0 to 2, and z is in the range from 0 to 0.5; or (ii) an oxyhydroxide with the general formula $(A_{1-x}A'_x)_3B_{2-y}B'_yO_{6-z}C_z(OH)_m\cdot nH_2O$, where x is in the range from 0 to 1, y is in the range from 0 to 2, z is in the range from 0 to 0.5, and m is in the range from 0.01 to 6.

The solid ionic conducting layer of any of the preceding aspects may be a composite solid ionic conducting layer comprising at least one hydrated oxide or hydrated or non-hydrated oxyhydroxide as described for this aspect, mixed with a polymer. The solid ionic conducting layer may comprise between 1% and 99% by volume of the at least one hydrated oxide or hydrated or non-hydrated oxyhydroxide, optionally 10% to 80% by volume, and further optionally 30% to 50% by volume. The polymer may be or comprise a hydrophilic polymer or a hydrophobic polymer. In various embodiments, the plastic used in the ceramic-polymer composite may be a polymer such as HDPE, PEEK, or PTFE, which are hydrophobic. This kind of composite film may have excellent mechanical strength whilst also allowing the ceramic component of this composite to remain hydrated to retain its high ionic conductivity. Use of a hydrophilic polymer such as PVA or PAA may increase water uptake at the cost of mechanical strength. When using a hydrophobic polymer, it may be necessary to ensure that the ceramic is the main component to provide sufficient water uptake for hydration of the ionic conducting material.

Alternatively or additionally, a metal or a non-metal material may be mixed with the at least one hydrated oxide or hydrated or non-hydrated oxyhydroxide as described for any of the various aspects, in addition to or instead of the polymer. The non-metal materials can be classified as ceramics, polymers, glasses, pure (non-metal) elements, salts etc, so covering a wide range of materials. A ceramic-graphite composite is an example of one such composite with a non-metal material. The solid ionic conducting layer may be a flexible membrane, e.g. when the mixed material is a polymer or graphite. Salts such as $CaCO_3$, $BaSO_4$ are also non-metal materials which may be used in such a composite. The added materials can improve the mechanical strength when mixed with the ceramic ionic conductor to form a composite. A similar volume ratio to those listed above may be applied to composites formed from the ceramic conducting material and the metal or non-metal material(s) mixed with it. Whether the ionic conducting material is a pure ionic conductor or a mixed ionic/electronic conductor depends on chemical composition and the pretreatment history. The nature of the composite will also depend on the amount and nature of the material mixed with the initial ionic conducting material.

The composite material formed by the mixture may have an increased mechanical strength as compared to the unmixed ionic conducting material. Typically, a polymer, an oxide or ceramic adhesive or a glass which is chemically compatible with the ionic conducting material may be used to form the composite. The composite material may form a dense ionic conductor with excellent mechanical strength. This dense ionic conducting material may beneficially avoid the cross-diffusion of chemicals between the negative and positive chambers of an electrochemical device in use, for example. This is particularly useful in redox flow cells/batteries, electrolysers and fuel cells.

The solid ionic conducting layer may be or more of the following: (i) a pure ionic conductor, and wherein optionally the solid ionic conducting layer is an electrolyte; (ii) a conductor of $OH^-$ and/or $H^+$ ions; (iii) primarily an $OH^-$ ion conductor; and (iv) a mixed $H^+/OH^-/e'$ conductor, and wherein optionally the solid ionic conducting layer is used as a membrane for 'wireless' gas separation or as an electrode for electrochemical devices.

According to a further aspect, there is provided a method of manufacturing a solid ionic conducting layer for use in an electrochemical device, the method comprising:

acquiring a ceramic oxide material, wherein the ceramic oxide material is an oxide with a perovskite, Brownmillerite or $K_4CdCl_6$ structure and comprises A-site ions of one or more elements selected from Ca, Sr, Ba, Ln, Y, Na, K, Rb, Cs, Pb, and Bi and B-site ions of one or more elements selected from Ln, Y, Sc, Mg, Ca, Sr, Li, Na, Cd, Co, Fe, Mn, In, Ni, Cu, Zn, Ti, V, Cr, Ga, Ge, Al, Si, Sn, Sb, Zr, Hf, Nb, Mo, W, Ta, Pt, Ir and Ru;

introducing additional oxygen vacancies into the acquired ceramic oxide material by:
(i) firing the ceramic oxide material in air;
(ii) firing the ceramic oxide material in an atmosphere with a lower partial pressure of oxygen than air;
(iii) soaking the ceramic oxide material in a reducing liquid, or
(iv) electrochemically reducing the fired ceramic oxide material; and treating the ceramic oxide material with water, the treatment comprising soaking the fired ceramic oxide material in liquid water, or exposing it to an atmosphere with at least 5 vol. % water, to form a hydrated oxide or a hydrated or non-hydrated oxyhydroxide.

Whilst method options (ii) to (iv) are expected to produce more oxygen vacancies in the unwetted material, for a large number of the oxides described herein, the treatment with water was found to produce a high enough level of ionic conduction even when the material had been fired in air (option (i)). In particular, materials such as $SrZr_{0.8}Y_{0.2}O_3$, $SrCe_{0.8}Y_{0.2}O_3$, $SrCeO_3$, $SrTi_{0.7}Fe_{0.3}O_3$, each fired in air without any further treatments in a reducing atmosphere, were found to perform well as ionic conductors following the water treatment. Indeed, most materials described herein can be fired in air then simply treated in water to achieve a high ionic or mixed ionic/electronic conductivity. For some materials, particularly those with multi-valent elements in the chemical composition, treating in a reducing atmosphere (lower oxygen partial pressure than in air) or reducing liquid, or applying an electrochemical reduction process, to increase the concentration of anion vacancies (typically oxygen vacancies) was found to be beneficial in order to achieve high ion transfer number when exposed to liquid water or a humidified atmosphere. The water may be provided as liquid water, as water in a humidified gas, or in the form of steam. The water may be provided at above room temperature, for example being at a temperature of 80° C. or above, or 90° C. or above.

The atmosphere with a lower partial pressure of oxygen than air may be (i) an inert atmosphere (e.g. Ar); or (ii) a reducing atmosphere (e.g. 5% Hz/95% Ar).

The acquired ceramic oxide material may be as described in the earlier aspects, and/or may be at least one of: (i) an oxide with a perovskite structure, such as $SrCe_{0.8}Y_{0.2}O_{3-\delta}$, $SrZr_{0.8}Y_{0.2}O_{3-\delta}$ or $SrCo_{0.5}Ti_{0.5}O_{3-\delta}$; (ii) an oxide with a Brownmillerite structure, such as $Sr_2Fe_2O_{5\pm\delta}$; or (iii) an oxide with a $K_4CdCl_6$ structure, such as $Ca_3Co_2O_6$.

The treatment with water may be performed for a period of at least 1 or 2 hours, optionally of at least 48 hours, and further optionally of at least 96 hours, before use of the solid ionic conducting layer. The time period of treatment with water may depend on the composition and thickness of the materials, and the temperature. Typically, at room temperature, a pellet with a thickness of around 2 mm may be performed for a period of at least 1 hour, before use of the solid ionic conducting layer. In embodiments in which the solid ionic conducting layer is in the form of a thin film or membrane, the time may be reduced. Indeed, for a sufficiently thin and/or porous sample, a treatment time of only a few minutes may suffice. The solid ionic conducting layer is kept hydrated between the water treatment and the use, whether or not the water treatment is performed in situ. Ideally, the water treatment may be performed in situ immediately before the device is turned on.

The solid ionic conducting layer may be a pure ceramic solid ionic conducting layer. A single firing step may be arranged to sinter the ceramic material so as to form a sintered material arranged to hold the desired shape for the solid ionic conducting layer and to introduce the additional oxygen vacancies. Alternatively, the material may be sintered in air in a first firing step, prior to firing the sintered material in an atmosphere with a lower partial pressure of oxygen than air to introduce the additional oxygen vacancies.

The method may further comprise, before the treatment with water, mixing the ceramic material with one or more polymers to form a composite ceramic-polymer solid ionic conducting layer. In alternative or additional embodiments, the ceramic material may be mixed with another material to form a composite ceramic-polymer or ceramic-ceramic solid ionic conducting layer, for example for use as an electrolyte. In other embodiments, aceramic-polymer, ceramic-carbon (e.g. graphite), ceramic-ceramic, or even ceramic-metal composite may be formed for use as a mixed ionic/electronic conducting layer (e.g. for use as an electrode or separation membrane for 'wireless' gas separation, typically $H_2$ and $O_2$). The formation of a composite material may increase mechanical strength, increase the ionic/electronic mixed conduction for particular applications (e.g. by providing some/more electronic conduction), such as electrodes for electrochemical devices or as separation membrane for 'wireless' gas separation as described above.

According to a further aspect, there is provided a solid ionic conducting layer for use in an electrochemical device, the solid ionic conducting layer being made by the method of the preceding aspect. These materials may be suitable for use as electrolytes if they are pure ionic conductors, or may also be used as electrodes or for gas separation membranes if the pure materials, or the formed composite materials after being mixed with a metal or non-metal material (e.g. a polymer, a ceramic, a pure element such as carbon), is a mixed ionic/electronic conductor.

According to a further aspect, there is provided an electrochemical device comprising a solid ionic conducting layer as described in any preceding aspect, wherein, in use, the solid ionic conducting layer is exposed to liquid water or to gas with at least 5 vol. % water. As mentioned above, as used herein "water" refers to $H_2O$, whether present as liquid water, water vapour, or steam.

The electrochemical device of any preceding aspect may be arranged to operate at an operating temperature less than or equal to 250° C., optionally less than 235° C., and further optionally less than or equal to 120° C. Optionally, when the operating temperature is above 100° C., pressurised steam or pressurised water may be provided to maintain the exposure to liquid water or to gas with at least 5 vol. % water. The electrochemical device of any preceding aspect is arranged to operate with the presence of liquid water or, at least 5 vol. % steam or water vapour in the surrounding gases. The temperature and pressure may therefore be selected accordingly. At high pressure, the operating temperature could be much higher than 100° C. (the boiling point of liquid water at ambient pressure) whilst still retaining liquid water.

The electrochemical device may be a fuel cell, electrolyser, or battery. The solid ionic conducting layer may be an electrolyte. The electrochemical device may be arranged to keep the solid ionic conducting layer (which may be a pure ionic conductor or a mixed ionic/electronic conductor) hydrated in use. The solid ionic conducting layer may be a mixed H+/OH−/e' conductor; such a material may be used as a membrane for 'wireless' gas separation or as an electrode for electrochemical devices.

The solid ionic conducting layer of any preceding aspect may consist of or comprise a ceramic oxide material. The oxide materials described above may be doped with a small amount of one or more other anions, typically N, Cl, F, Br, S, Te, and Se, in some embodiments.

According to a further aspect, there is provided a method of operating an electrochemical device as described in any preceding aspect, the method comprising continuously exposing the ionic conducting layer to liquid water or to gas with at least 5 vol. % water (as water vapour or steam) whilst the electrochemical device, and more specifically the ionic conducting layer, is in use.

The skilled person would understand that features described with respect to one aspect of the invention may be applied, mutatis mutandis, to any other aspect of the invention. There now follows by way of example only a detailed description of embodiments of the present invention with reference to the accompanying drawings in which.

Figure 8A:
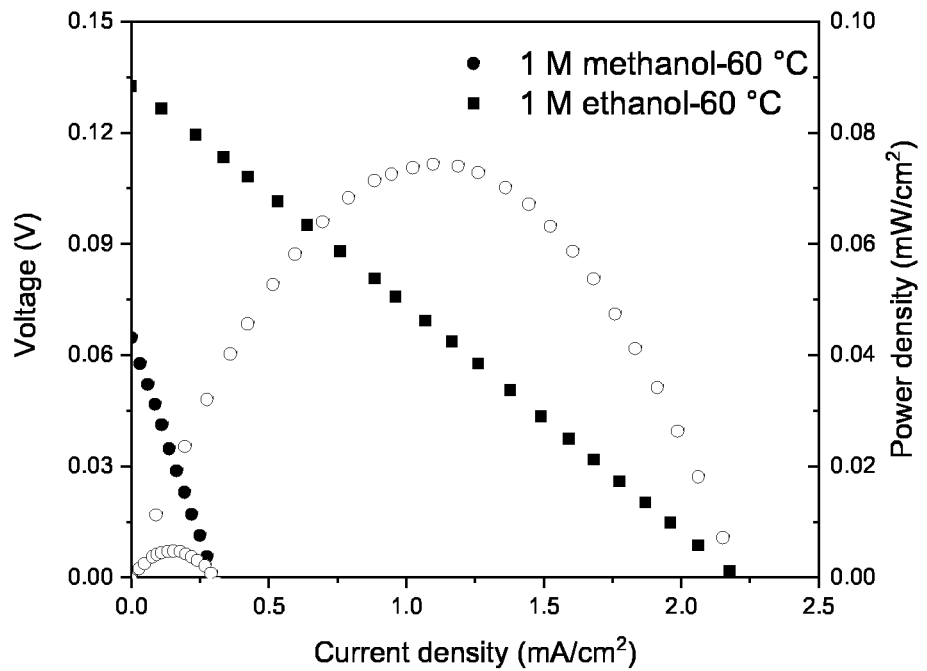
Figure 8B:
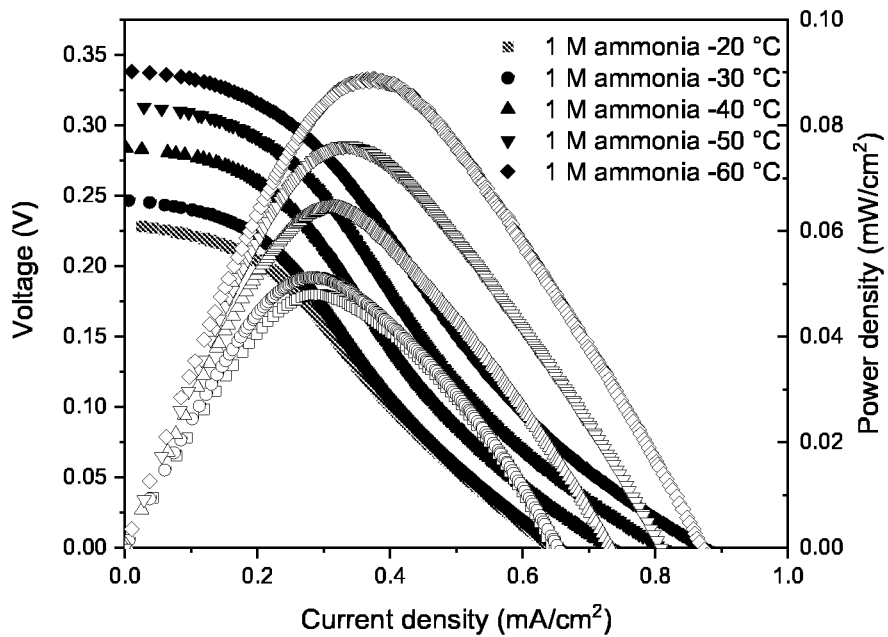
Figure 9:
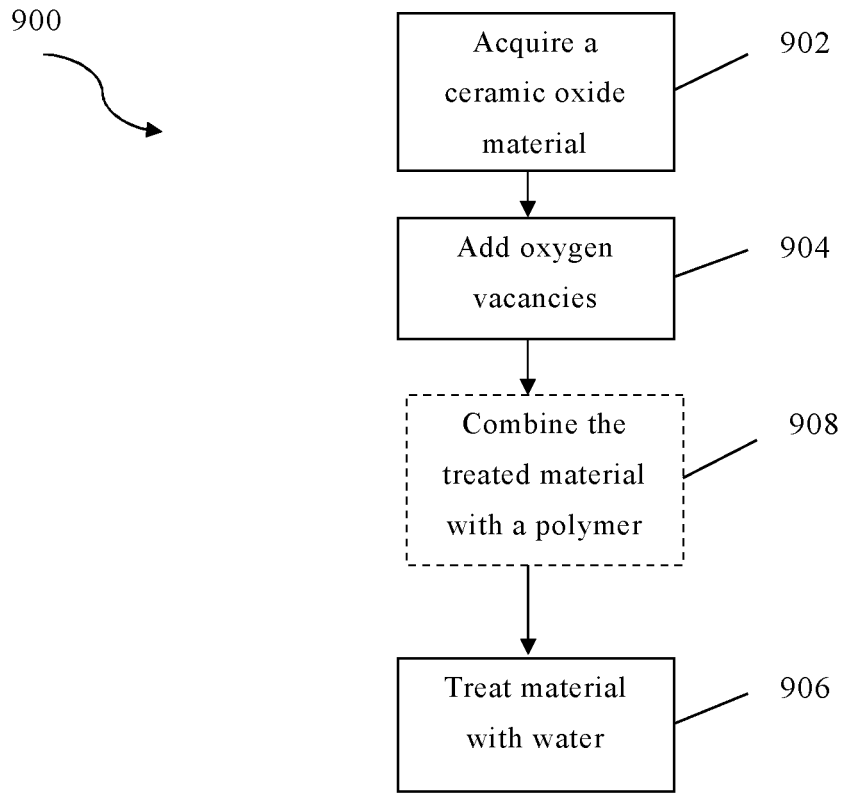
Figure 10:
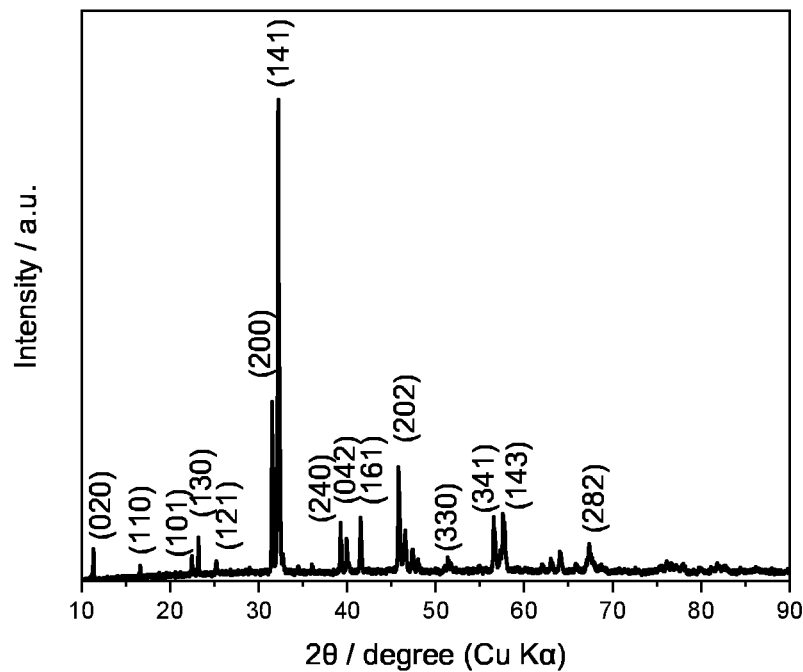
Figure 11:
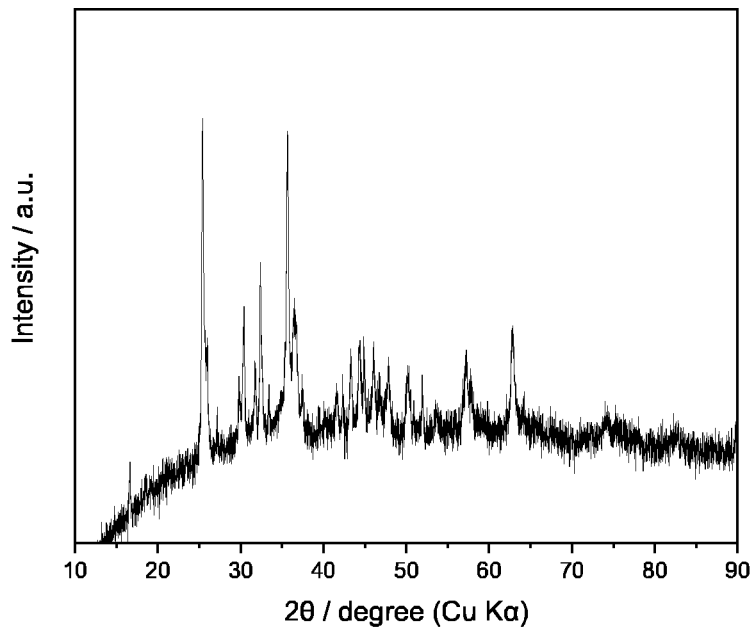
Figure 12:
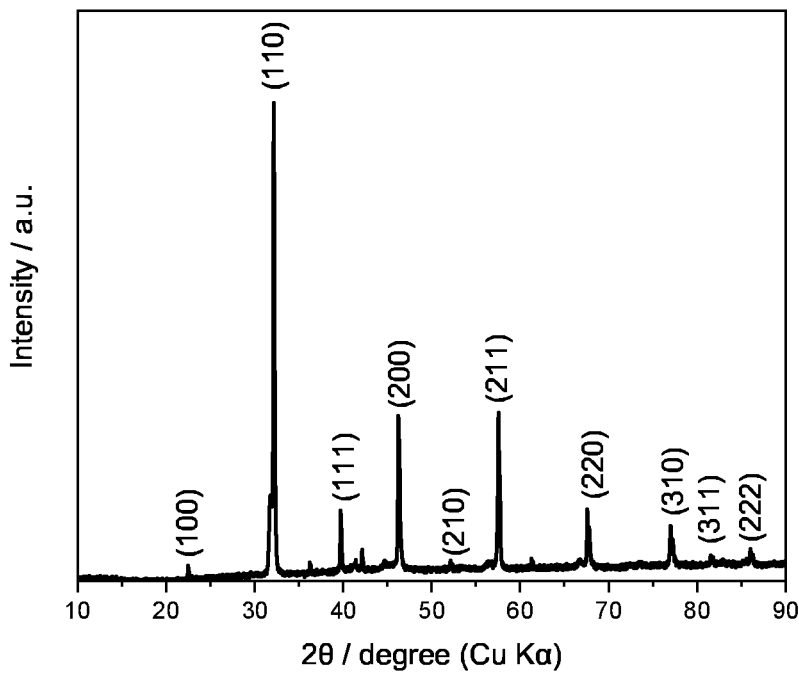
Figure 13:
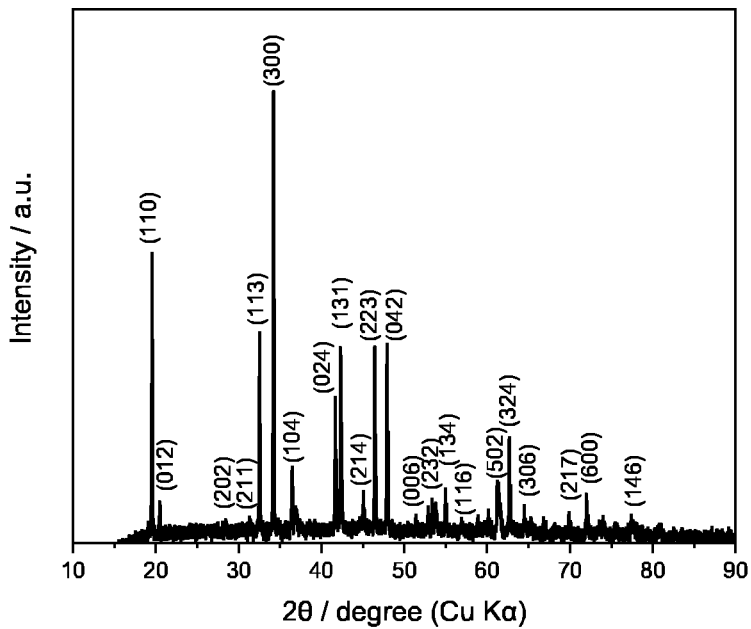

FIGS. 8A and 8B provide graphs of fuel cell performance of a $Sr_2Fe_2O_5$-based electrolyte material with three different fuels;

FIG. 9 illustrates a method of an embodiment;

FIG. 10 provides X-Ray Diffraction (XRD) data for a sample of $Sr_2Fe_2O_5$ fired in Ar at 1200° C.;

FIG. 11 provides XRD data for the sample of FIG. 10 after treatment, and conductivity measurement, in water;

FIG. 12 provides XRD data for a sample of $SrCo_{0.5}Ti_{0.5}O_{3-\delta}$ fired in Ar at 1100° C.; and FIG. 13 provides XRD data for a sample of $Ca_3Co_2O_{6-\delta}$ fired at 1000° C. in air.

Figure 14:
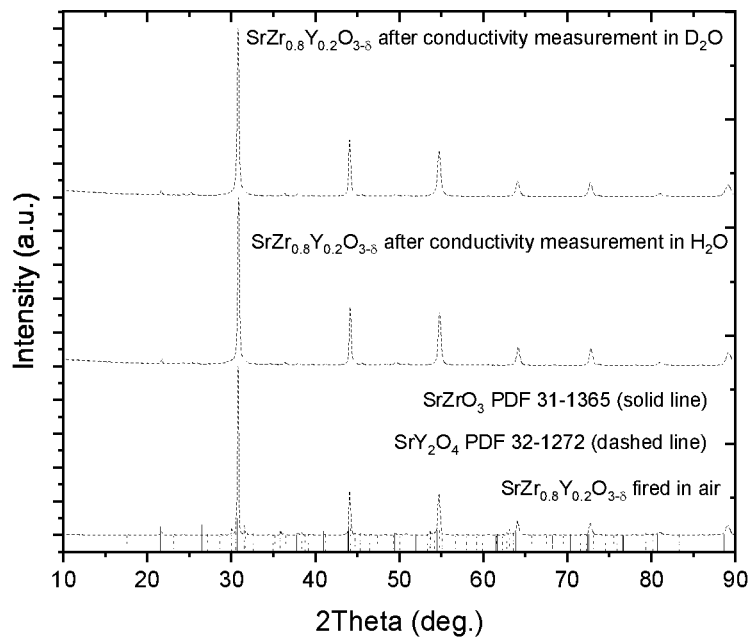
Figure 15:
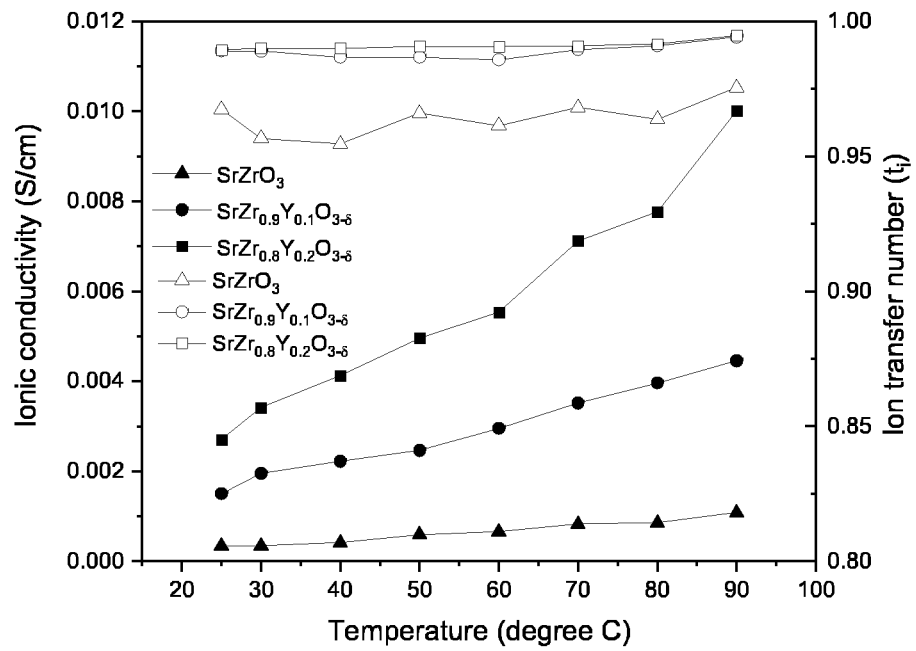
Figure 16:
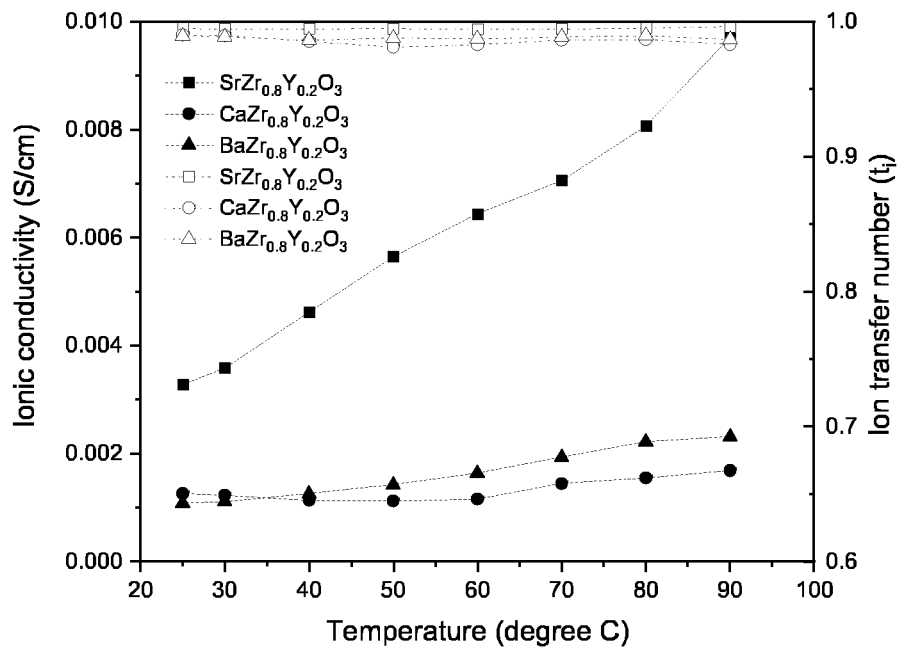
Figure 17:
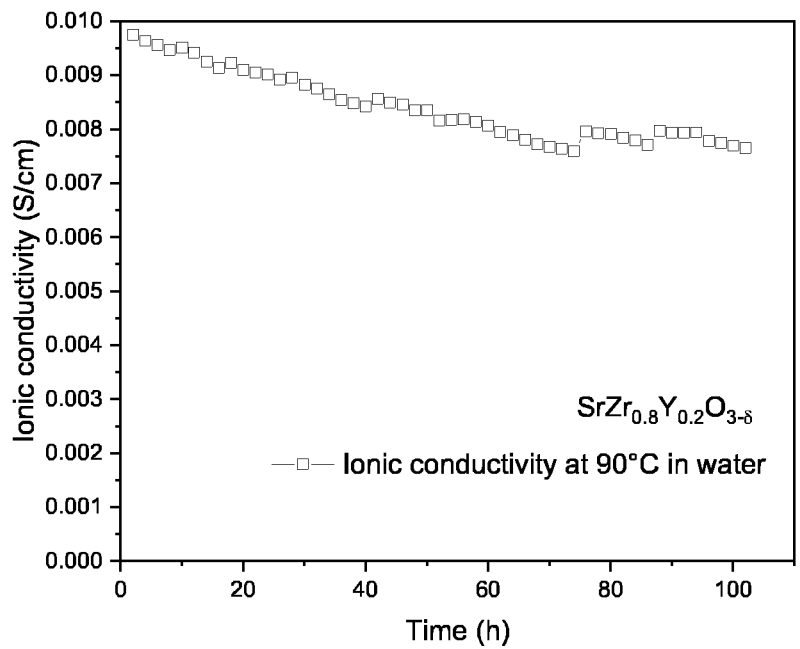
Figure 18:
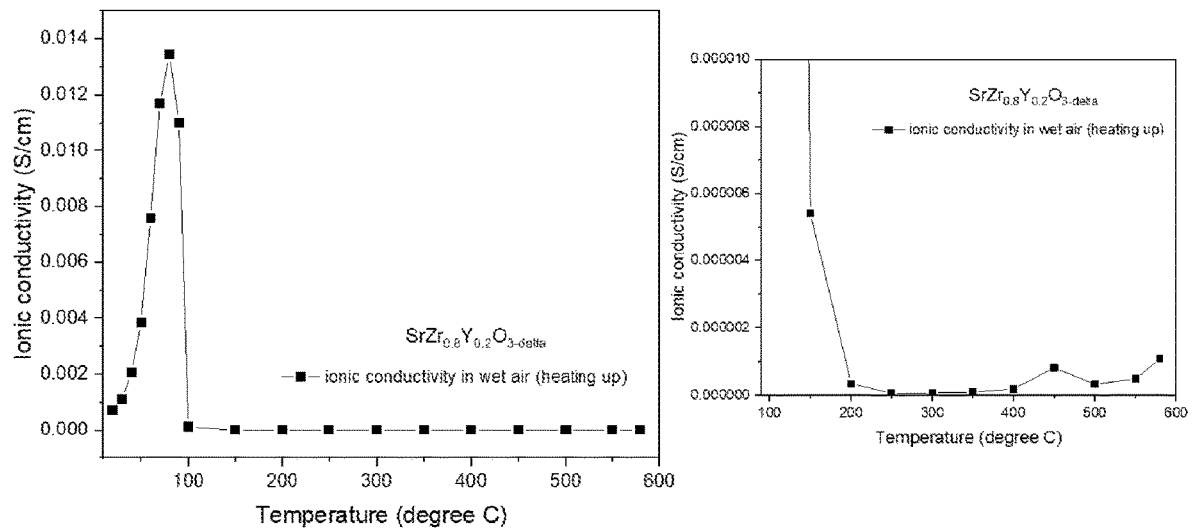
Figure 19:
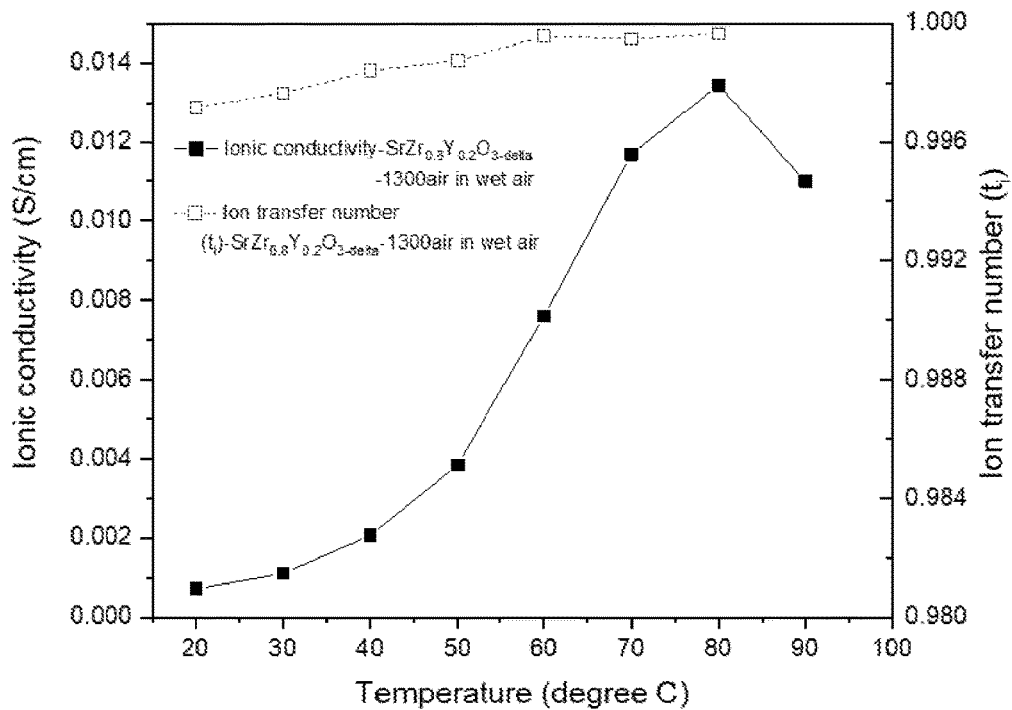
Figure 20:
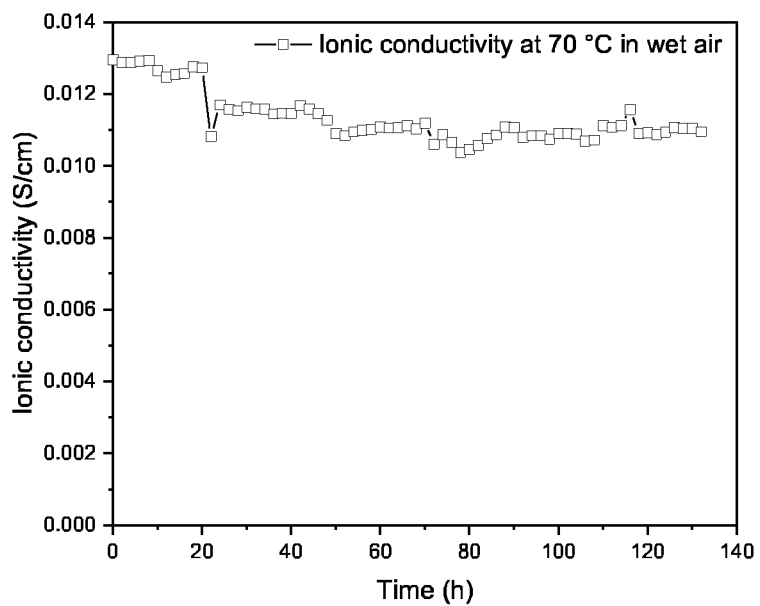
Figure 21:
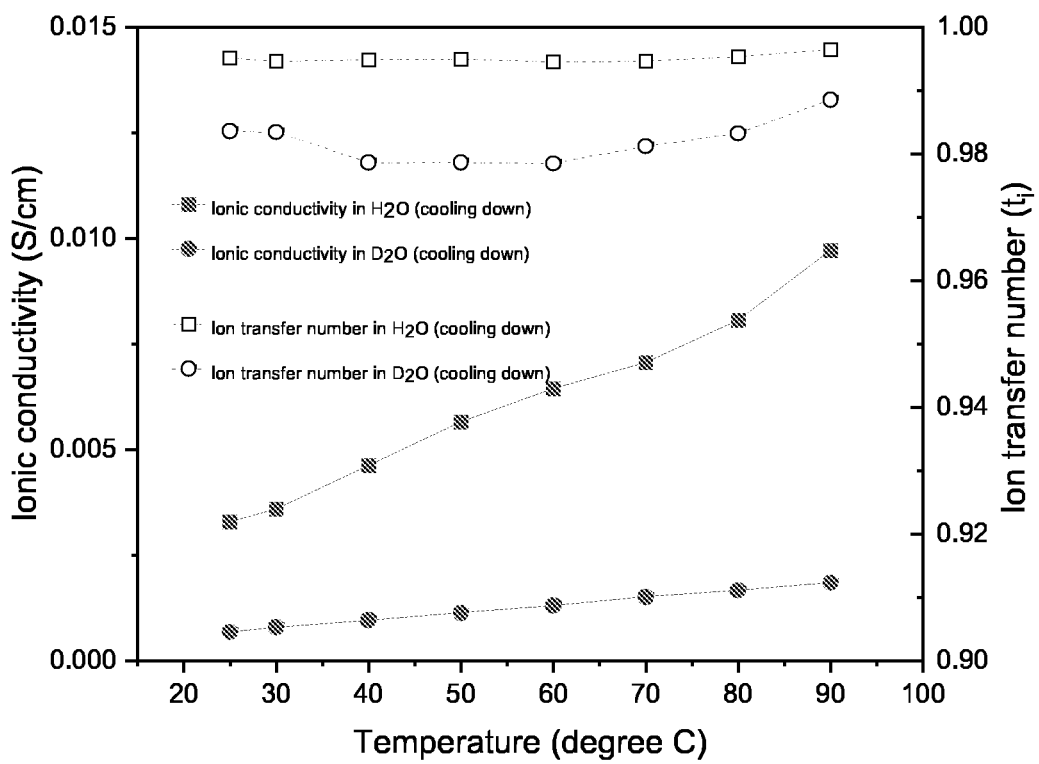
Figure 22:
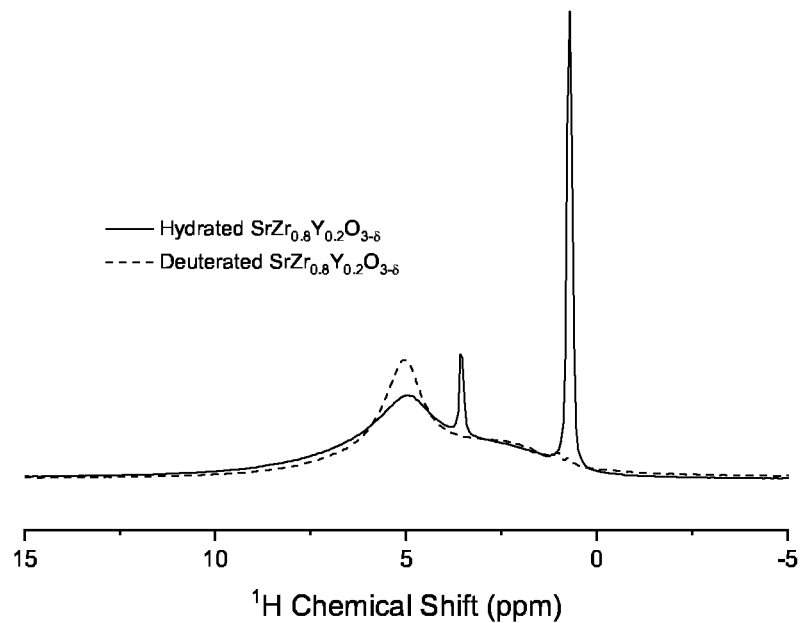
Figure 23:
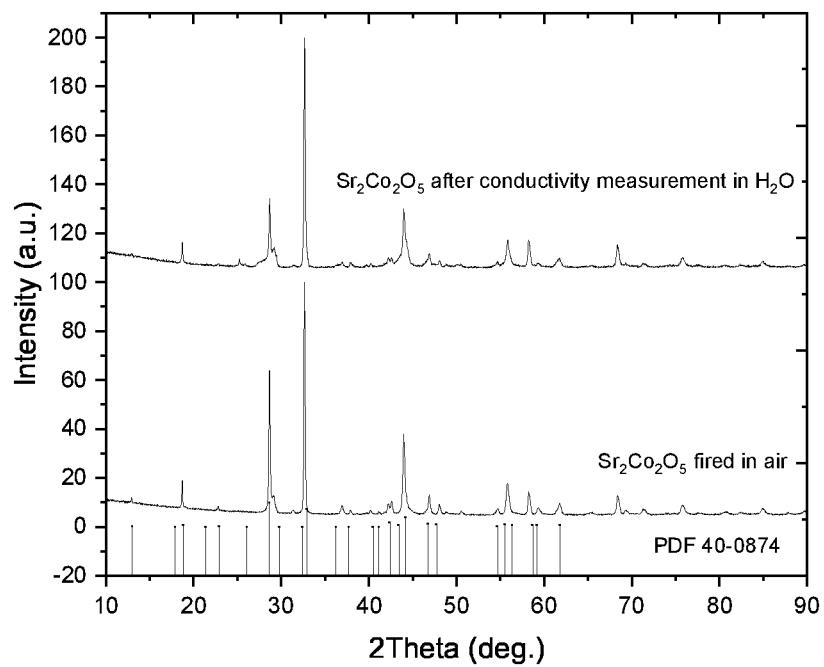
Figure 24:
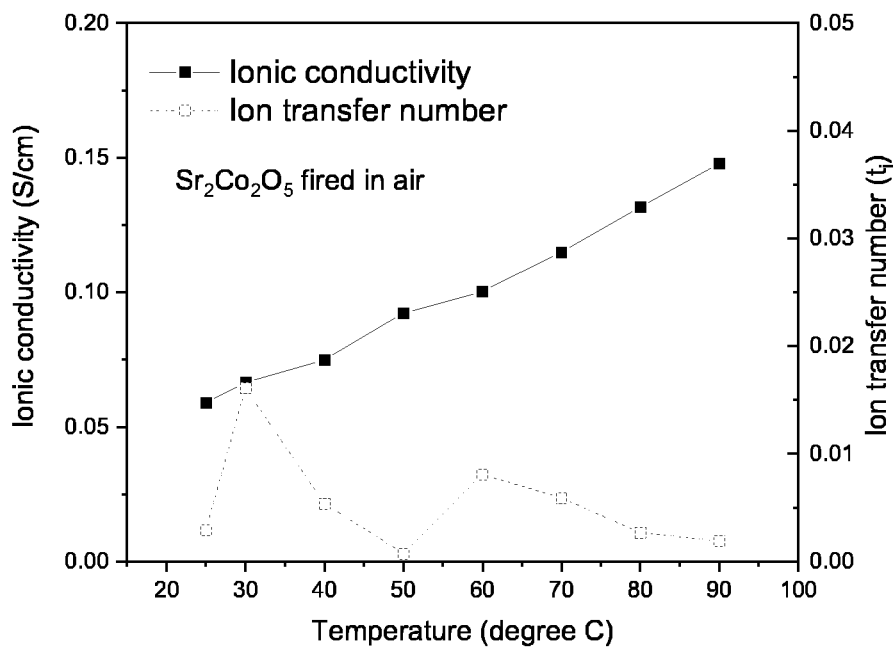
Figure 25:
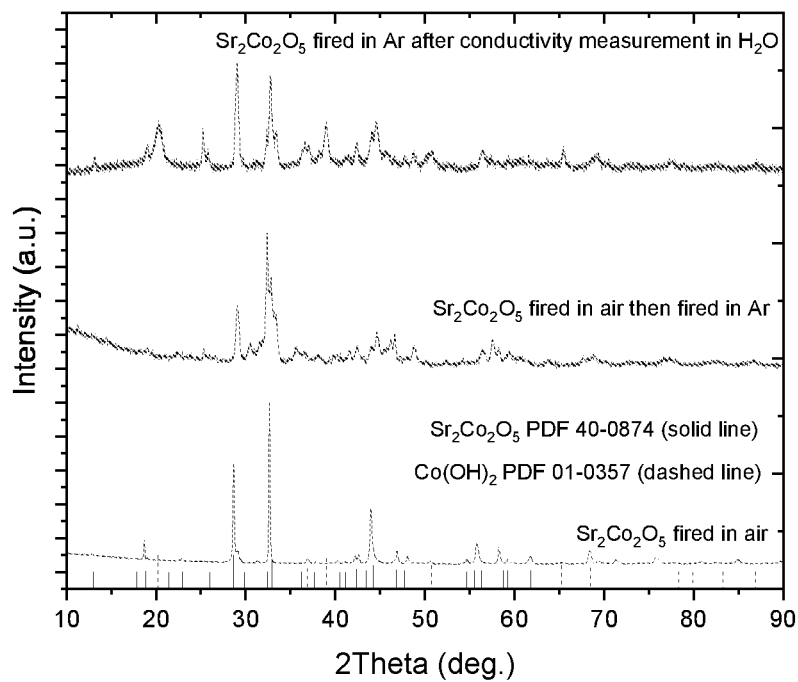
Figure 26:
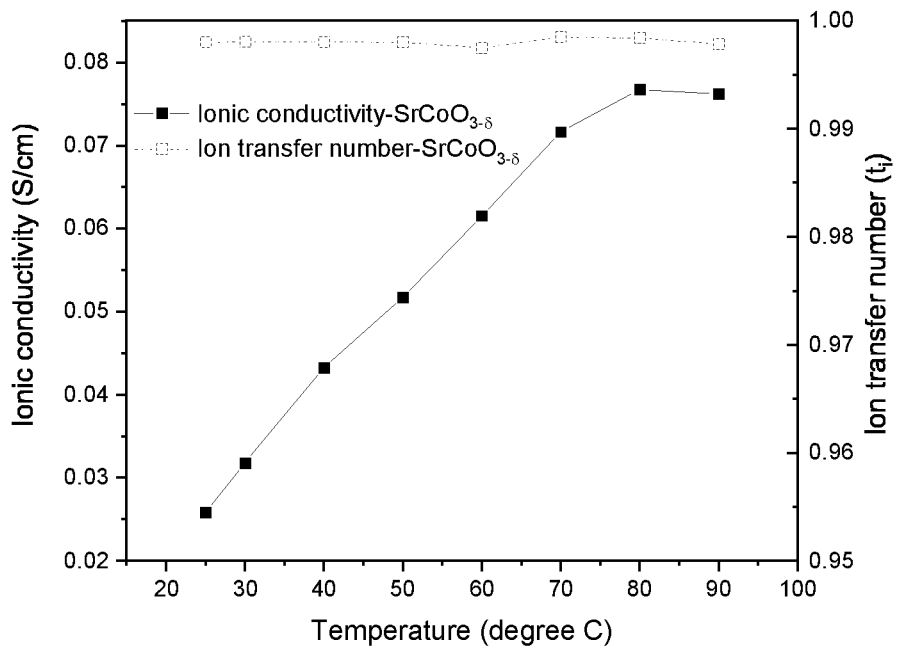
Figure 27:
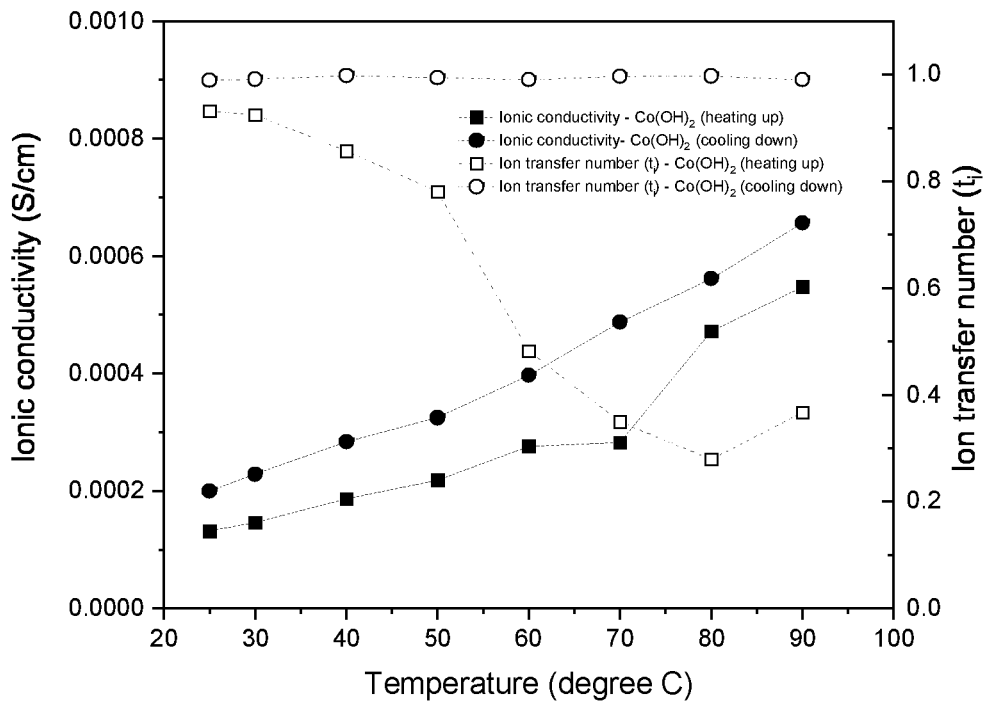
Figure 28:
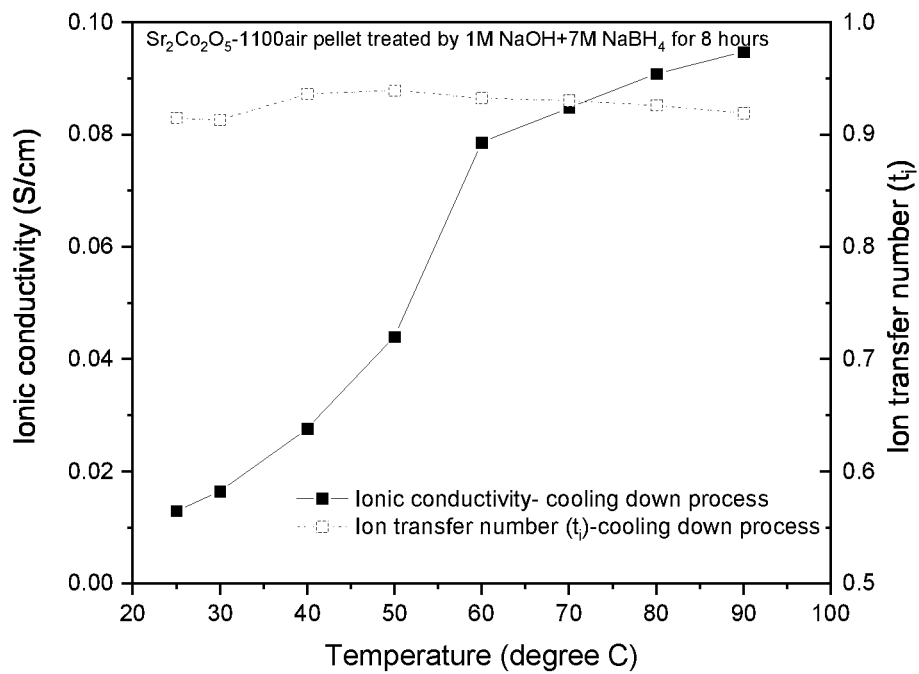
Figure 29:
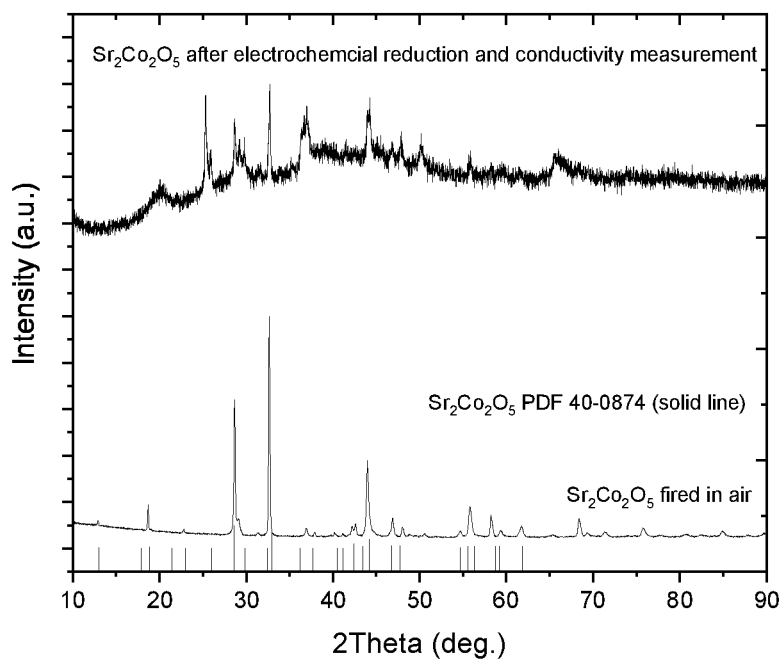
Figure 30:
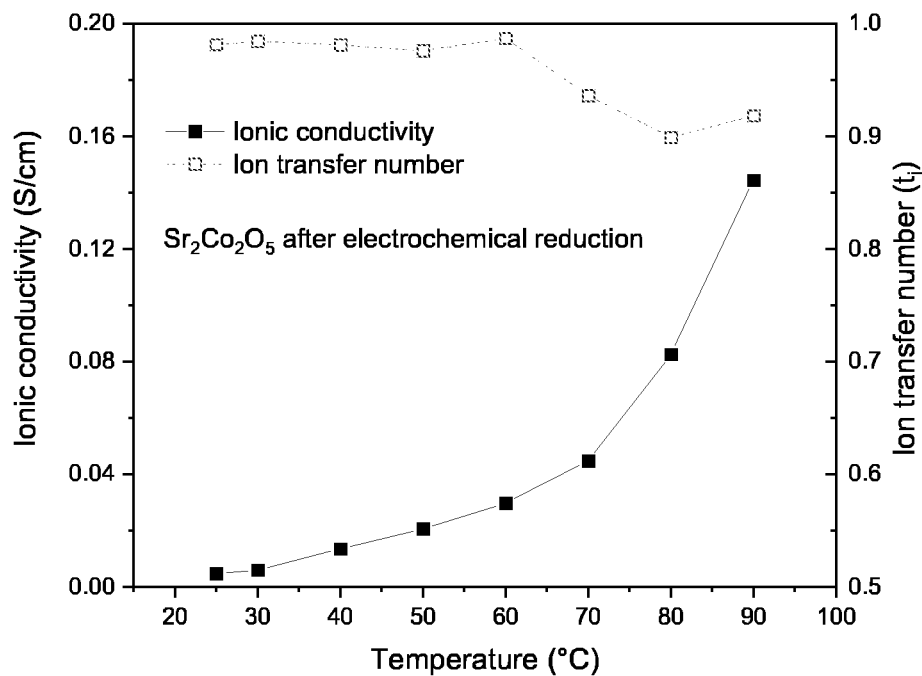
Figure 31:
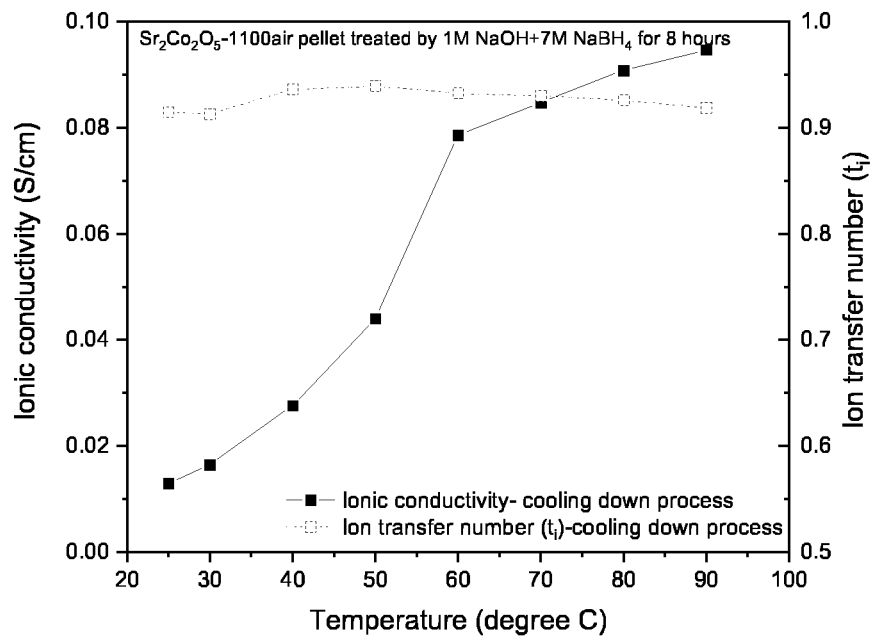

FIG. 14 shows XRD patterns of an as-prepared $SrZr_{0.8}Y_{0.2}O_{3-\delta}$ pellet, the pellet after conductivity measurement in $H_2O$ at temperatures up to 90° C. and after conductivity measurement in $D_2O$;

FIG. 15 shows the conductivity (filled symbols) and ionic transfer number (hollow symbols) of $SrZrO_3$, $SrZr_{0.9}Y_{0.1}O_{3-\delta}$ and $SrZr_{0.8}Y_{0.2}O_{3-\delta}$ in water, measured on cooling;

FIG. 16 shows the conductivity (filled symbols) and ion transfer number (hollow symbols) for $MZr_{0.8}Y_{0.2}O_{3-\delta}$ where M=Ca, Sr, Ba;

FIG. 17 shows the stability of conductivity of $SrZr_{0.8}Y_{0.2}O_{3-\delta}$ in water at 90° C., after treatment in water at 90° C., including replacing the water three times before the measurements;

FIG. 18 shows the ionic conductivity of $SrZr_{0.8}Y_{0.2}O_{3-\delta}$ in wet air at different temperatures, including the conductivity above 100° C. as an inset plot (air passed through 100° C. water);

FIG. 19 shows the ionic conductivity and ion transfer number of $SrZr_{0.8}Y_{0.2}O_{3-\delta}$ in wet air at 20 to 100° C. (the air was passed through 100° C. boiling water to humidify it);

FIG. 20 shows stability conductivity plots for a $SrZr_{0.8}Y_{0.2}O_{3-\delta}$ sample in wet air at 70° C. (the air was passed through 100° C. water to humidify it);

FIG. 21 shows the conductivity and ion transfer number of a $SrZr_{0.8}Y_{0.2}O_{3-\delta}$ pellet in $H_2O$ and $D_2O$, measured on cooling;

FIG. 22 shows the $^1$H-magic-angle spinning (MAS) solid state NMR of hydrated (solid line) and deuterated $SrZr_{0.8}Y_{0.2}O_{3-\delta}$ (dashed line) measured at room temperature;

FIG. 23 shows the XRD pattern of $Sr_2Co_2O_5$ fired in air and after conductivity measurement in water at temperatures up to 90° C.; the sample is a single phase after being fired in air and this phase remains after the conductivity measurement, which means it is stable (it cannot be ruled out that $Sr_2Co_2O_5$ reacts with $H_2O$ to form oxyhydroxide as this cannot be detected by XRD as it is not sensitive to elemental hydrogen);

FIG. 24 shows conductivity (measured on cooling) and ion transfer number of $Sr_2Co_2O_5$ in water, for a sample fired in air without any further treatment (e.g. no reducing treatment by firing in a different atmosphere or treating with a reducing liquid);

FIG. 25 shows the XRD pattern of $Sr_2Co_2O_5$ fired in air, then in Ar and after conductivity measurement in water at temperatures up to 90° C., showing that a single phase is formed after being fired in air and remains after firing in Ar (although more poorly crystallised); after the conductivity measurement in water, the phase remains although some peaks of $Co(OH)_2$ appear;

FIG. 26 shows the conductivity and transfer number of $Sr_2Co_2O_5$ in water measured on cooling; the sample was fired in air then in Ar, and washed with water twice, before the conductivity measurement;

FIG. 27 shows the conductivity and ion transfer number of a pure $Co(OH)_2$ pellet in water, showing two orders of magnitude lower conductivity than those for $Sr_2Co_2O_5$ pellet fired in Ar, under the same conditions;

FIG. 28 shows the conductivity and transfer number of $Sr_2Co_2O_5$ in water measured on cooling, for a sample fired in air and then treated with a reducing reagent (1 M NaOH+7 M NaBH$_4$) for 8 hours before the conductivity measurement;

FIG. 29 shows the XRD pattern of pure $Sr_2Co_2O_5$ before and after being electrochemically reduced at −1.14V vs Ag/AgCl for 10 hours followed by conductivity measurement in water, showing that the main phase remains but is poorly crystallised;

FIG. 30 shows conductivity data for a $Sr_2Co_2O_5$ pellet in water during a heating up process, the pellet was electrochemically reduced for 10 hours and immersed in water at 90° C. for 3 days before the conductivity measurements; and FIG. 31 shows the conductivity and transfer number of an $Sr_2Co_2O_5$ sample fired in air then treated by reducing reagent (1 M NaOH+7 M NaBH$_4$) for 8 hours, in water, measured on cooling.

In the Figures, like or corresponding reference numerals are used for like or corresponding components.

Figure 1:
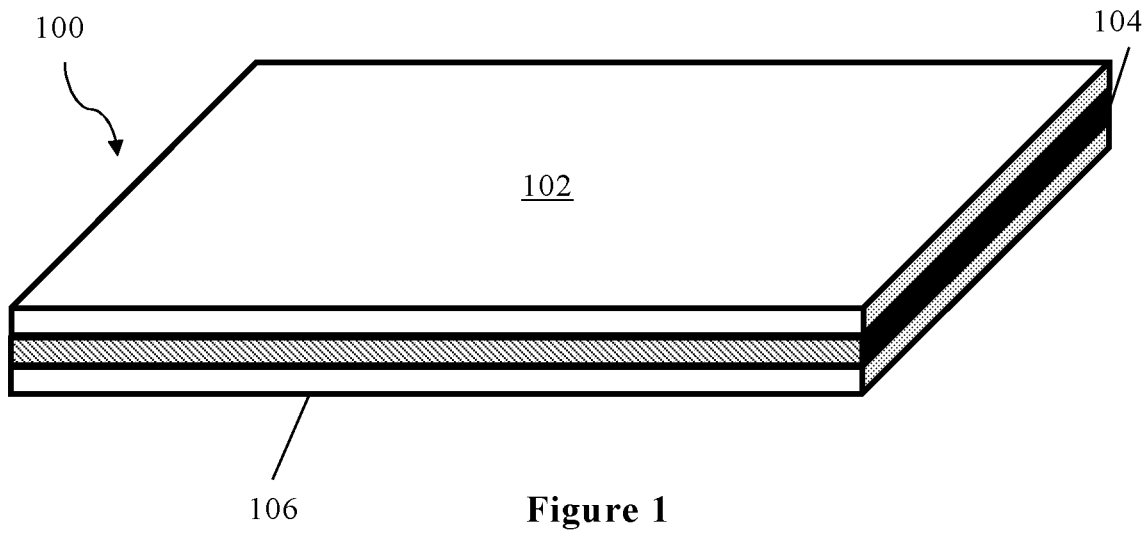
FIG. 1 is a schematic illustration of an electrochemical device.

FIG. 1 illustrates a simplified electrochemical device 100. Electrochemical devices 100, such as fuel cells, generally comprise two electrodes 102, 106 (an anode and a cathode) and an electrolyte 104 separating the anode from the cathode. The electrolyte 104 is selected to be an ionic conductor, to allow ion transport between the electrodes 102, 106, but an electronic insulator, to avoid or minimise short circuits/current leakage. Stable ionic conductivity may be provided by the electrolytes 104 described herein. In alternative embodiments, the electrochemical device 100 may comprise a solid ionic conducting layer which does not function as an electrolyte. The skilled person will appreciate that an electrolyte 104 is an example of a solid ionic conducting layer 104, but that the materials and processes described herein may also be of utility for solid ionic conducting layers which are not electrolytes. Whilst the following description generally refers to electrolytes 104 for ease of reading, it will be appreciated that the invention is not limited to electrolytes 104—indeed, in some cases, the ionic conducting layer may be a mixed ionic and electronic conductor and therefore not suitable for use as an electrolyte of a battery or fuel cell 100, for example. The ionic conductors (pure or mixed ionic/electronic conduction) described here may be added into electrodes for an electrochemical device, or used as a separation membrane for gas separation/purification, typically H$_2$ and O$_2$, in a 'wired' or 'wireless' type gas separation device.

Whilst the embodiments described herein may be described with reference to a fuel cell 100 in particular, the skilled person would appreciate that the electrolytes 104 (or indeed other ionic conducting layers) described may equally be applied to other electrochemical devices 100, and to many different types of fuel cell 100. By way of non-limiting example, suitable electrochemical devices 100 which may use an electrolyte (or other ionic conducting layer) 104 as described herein include:

- Electrolysers, for example for use in splitting water to generate "green" H$_2$ or in an ammonia/urea electrolyser to split ammonia/urea into hydrogen and nitrogen, or in the chlor-alkali industry for electrolysis of NaCl/KCl aqueous solution to produce NaOH/KOH, H$_2$ and Cl$_2$;
- Fuel cells with gas or liquid fuels; typical fuels being hydrogen, methanol, ethanol, ammonia, hydrazine, urea, and methane. Such fuel cells may be used for the sole purpose of generating electricity, or may have a dual purpose. For example, ammonia/urea fuel cells using an electrolyte 104 as described herein can be used for removal of ammonia from ammonia/urea-containing wastewater—electricity generation may be a beneficial by-product rather than the main aim;
- Redox flow batteries or other flow cells;
- Batteries such as metal-air batteries (e.g. Zn-air batteries, or other metal-air batteries, using an OH$^-$ or mixed H$^+$/OH$^-$ ionic conductor as the electrolyte) and aqueous rechargeable batteries, and any aqueous batteries based on H$^+$ or/and OH$^-$ ionic conducting electrolytes;
- Electrochemical devices for electrochemical synthesis of chemicals, such as ammonia and hydrocarbons;
- Supercapacitors;
- Electrodialysis devices, e.g. for wastewater treatment or desalination to produce fresh water from seawater;
- Gas separators (particularly H$_2$ and O$_2$), gas purifiers, or other separation units; and
- Sensors.

In general, the materials described herein can be used in any suitable electrochemical devices 100 which need an ionic conduction layer, be that pure ionic conduction as needed for an electrolyte (e.g. OH$^-$ or mixed H$^+$/OH$^-$ conduction) or mixed ionic-electronic conduction as preferred for an electrode or gas separation membrane (e.g. mixed OH$^-$/e' or mixed H$^+$/OH$^-$/e' conductor). In use as a membrane for gas separation, the material selected may be a mixed H$^+$/OH$^-$/e' conductor. For hydrogen separation, only the H$^+$/e' conduction properties may be used, or, for O$_2$ separation, only the OH$^-$/e' conduction properties may be used.

All materials described and claimed herein are ionic conductors, with some of the materials additionally being electronic conductors (i.e. being mixed ionic/electronic conductors). In particular the materials are generally mixed H$^+$/OH$^-$ ionic conductors, and the mixed ionic-electronic conductors (MIECs) are mixed H$^+$/OH$^-$/e' conductors. In general, the ionic conduction is mainly OH$^-$ conduction, although in some cases H$^+$ conduction may exceed OH$^-$ conduction.

Materials such as $SrZr_{0.8}Y_{0.2}O_{3-\delta}$, $SrCe_{0.8}Y_{0.2}O_{3-\delta}$, and $SrCe_{0.85}Y_{0.15}O_{3-\delta}$ prepared and described herein, and operated in water, were found to act as mixed H$^+$/OH$^-$ ionic conductors even at relatively low temperatures (e.g. 120° C. or lower), in contrast to prior expectations that these perovskite oxides could only operate as $O^{2-}$ or H$^+$ or a mixed $O^{2-}$/H$^+$ conductor at high temperatures (>500° C.). Therefore, even if perovskite oxides with similar chemical compositions are used, due to the difference in environment (e.g. with the material being in contact with liquid water or being exposed to gases with at least 5 vol. % steam) and/or pre-treatment, the conduction mechanism is very different (different charge carriers). Using such oxides in contact with liquid water or exposed to gases with at least 5 vol. % water was found to lead to high OH$^-$ ionic conduction or mixed H$^+$/OH$^-$ ionic conduction (typically at a temperature at or below 100° C., but the temperature could be higher if the device 100 is pressurized).

The following guidelines may be used to select a ceramic material likely to have high ionic conductivity in water or steam or in a hydrated state:

A. The material is rich in anion vacancies, typically oxygen vacancies;
B. When the material is exposed to water or steam, a suitable material can react with water or steam to form oxyhydroxides or hydrated oxides, or to otherwise incorporate OH$^-$ ions into the material;

C. The material may be selected to have a structure with continuous pathways, which facilitate the migration of $H^+/OH^-$ ions in the lattice so as to provide high $H^+/OH^-$ ion conductivity. Typical crystal structures with the required pathways are perovskite and perovskite-related structures, which contain primitive $ABO_3$ perovskite blocks, Brownmillerite, and $K_4CdCl_6$ structures.

In some cases, a material satisfying only two of the three guidelines exhibits suitable behaviour—for example, undoped $SrCeO_3$ was found to exhibit high ionic conductivity when in contact with liquid water or exposed to a gaseous atmosphere with at least 5 vol. % steam, despite not being classed as rich in oxygen vacancies. This primitive perovskite structured material meets the second and third guidelines as listed above, but not the first.

The electrolytes 104 as described herein comprise a ceramic component—the electrolytes 104 may be pure ceramic electrolytes, or for example ceramic-polymer composite or ceramic-ceramic composite electrolytes. The structure and properties of the electrolytes 104 are selected and controlled to provide suitable conductivity, and other parameters, for use in electrochemical devices 100.

Families of oxide materials which exhibit high ionic conductivity when suitably prepared have been identified (e.g. with a conductivity of $1.9 \times 10^{-2}$ S/cm at room temperature for treated $Sr_2Fe_2O_5$—the conductivities being measured in water to ensure that the hydrated material is tested). Unlike prior work on related oxide materials which uses oxide materials themselves as an electrolyte material, the inventor appreciated that forming the hydrated oxide, or the hydrated or non-hydrated oxyhydroxide, of specifically selected oxides provides improved properties when the resultant hydrated oxide or oxyhydroxide material is used to form an electrolyte 104. The oxide materials used to form the electrolytes 104 may be specially prepared to encourage the formation of hydrated oxides, or hydrated or non-hydrated oxyhydroxides (e.g. by introducing oxygen vacancies and/or selecting compositions with suitable reactivities with water).

Figure 2:
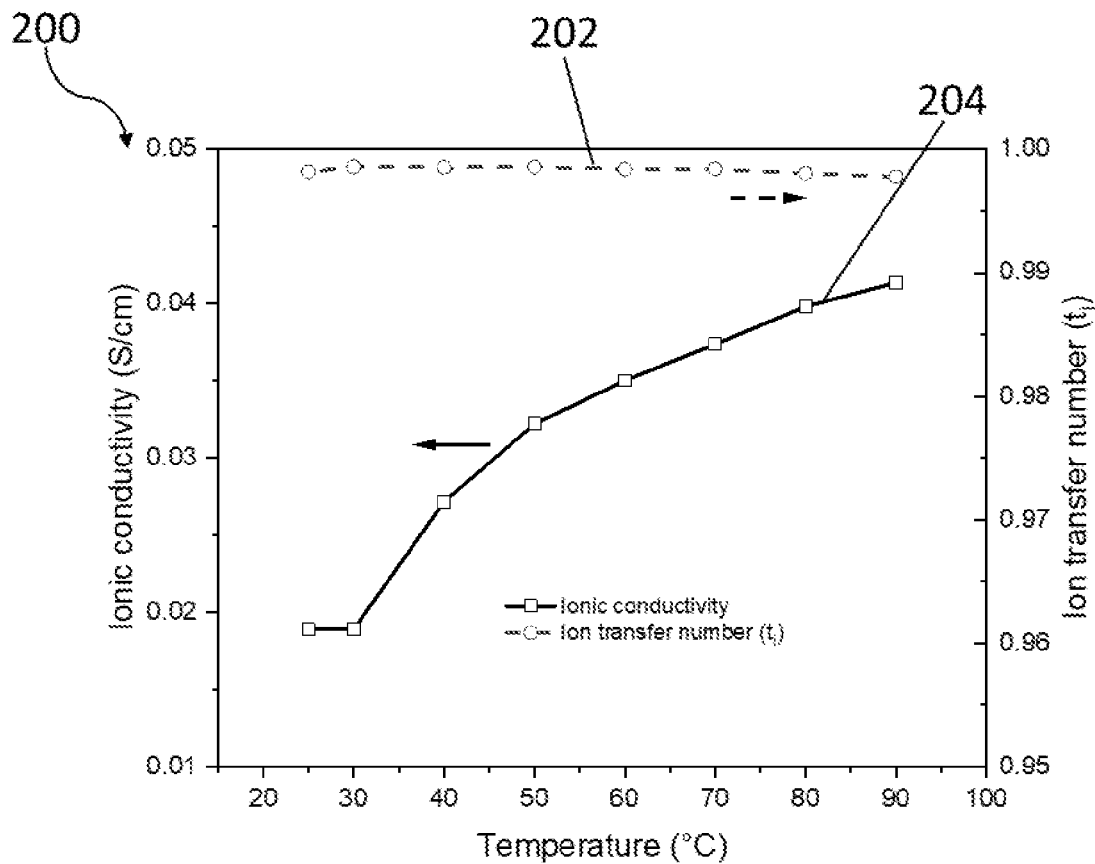
FIG. 2 is a graph of the conductivity and ion transfer number with temperature for a sample $Sr_2Fe_2O_5$ (Brownmillerite structure) after soaking in water at room temperature for 6 days.

As an example, the ionic conductivity and ion transfer number of a $SrFeO_{2.5}(OH)_m \cdot nH_2O$ material between 25° C. and 90° C. is illustrated in a graph 200 in FIG. 2. The ion transfer number 202 is around 0.998, indicating that the material is a pure ionic conductor, suitable to be used as an electrolyte 104 for electrochemical devices 100. The ionic conductivity 204 is 0.041 S/cm at 90° C., which is the same as the commercial Nafion® membrane (0.04 S/cm at 96° C.). To form the $SrFeO_{2.5}(OH)_m \cdot nH_2O$ material for which data are presented in FIG. 2, $Sr_2Fe_2O_5$ was prepared by a standard solid state reaction method. In particular, 14.91 g of $SrCO_3$ and 8.03 g of $Fe_2O_3$ (analytical grade) were mixed using a ball-mill machine (Ortoalresa OABM 255) at 300 rpm for 12 hours and then calcined in air at 1100° C. for 55 hours, with a heating/cooling rate of 5° C./min. The powder was ground and pelletized, and then fired in Argon at 1200° C. for 8 hours. XRD data for the pellet material after firing in Argon are provided in FIG. 10, confirming the expected Brownmillerite structure. Disc-shaped pellets with a 13 mm diameter and a 2.2 mm thickness are taken to be the default for tests described herein, unless otherwise specified—the skilled person would appreciate that any appropriate size and shape of pellet may be used in other embodiments.

For testing the ionic conductivity of the $Sr_2Fe_2O_5$ pellet in water, the two flat side surfaces of the pellet were coated with a silver conductive ink (Fisher Scientific) to form Ag electrodes. The pellet with the Ag ink coating was dried at 130° C. for 150 minutes. A sandwich-structure cell with the pellet between two layers of silver mesh was then immobilised in a jig, with the cell submerged in liquid water. Electrochemical impedance spectroscopy (EIS) was then performed using a Solartron 1470/1455 with 10 mV amplitude and frequency range of 100000-0.01 Hz. DC voltage across the pellet and current therethrough were recorded in order to work out the resistance to electronic conduction. Conductivity results are shown in FIG. 2. Its highest ionic conductivity was found to be 0.041 S/cm, obtained at 90° C. in water, with an ionic transfer number ($t_i$) of 99.8%. The conductivity reduced as temperature was reduced. FIG. 11 provides XRD data for the electrolyte 104 after the immersion in water, showing that the structure has been affected by the hydration (comparison to FIG. 10).

The skilled person would appreciate that structure and composition interact in various and complex ways to provide the reactivity and conductivity of the initial oxide and the produced oxyhydroxide or hydrated oxide, and that extensive research and experimentation was therefore performed to identify suitable families of ceramic oxide starting materials. Further, the reaction with water to produce the oxyhydroxide or hydrated oxide may change the structure of the material, such that the electrolyte material may have a different structure from the starting material oxide. Data were gathered to demonstrate the use of such materials as electrolytes in a fuel cell.

FIG. 8A shows current-voltage (IV) plots for a fuel cell using an electrolyte prepared from $Sr_2Fe_2O_5$, comparing the use of methanol and ethanol as fuels under otherwise the same conditions (operating temperature of 60° C., 1 molar (1 M) solution liquid fuels used). FIG. 8B shows IV plots for the same fuel cell at different temperatures, using a 1 M ammonia solution as the fuel. For these fuel cell tests, a disk-shaped $Sr_2Fe_2O_5$ pellet, previously heated in Argon at 1200° C., with a 15 mm diameter and a 0.8 mm thickness, was used as the electrolyte. The anode and cathode were formed from 20 wt. % Pt/C, adding PAP-BP-100 ionomer and using carbon cloth as a substrate (PAP-BP-100 referring to poly(aryl piperidinium)polymers with N-methyl-4-piperidone, 2,2,2-trifluoroacetophenone and biphenyl, the molar ratio between N-methyl-4-piperidone and aryl monomers is 1:1). To prepare the Pt/C electrode, 68 mg of commercial Pt/C (20 wt. % of Pt) was ultrasonically dispersed in the mixture of 125 μL of deionized water, 125 μL of isopropanol and 385 μL of 5 wt. % PAP-BP-100 ionomer solution for 1 hour in a sonication bath (Fisherbrand FB15051). Carbon cloth was pre-treated with 5 wt. % HCl and isopropanol to remove impurities and contaminants. After the sonication process, the ink was brushed onto the clean carbon cloth, and the electrode placed into a drying oven at 80° C. and dried for 8 hours. The Pt loading of the electrodes was 0.77 mg/cm². The fuel cell 100 was assembled in a fuel cell jig. The $Sr_2Fe_2O_5$ electrolyte 104 was sandwiched between the cathode and the anode. The effective area of the fuel cell was 1×1 cm². A one molar aqueous solutions of each of methanol, ethanol, and ammonia were used as fuels in the tests. The fuel solution was slowly pumped into the anode chamber, and humidified compressed air (obtained using a bubbling set-up) was introduced into the cathode chamber from the opposite direction. The flow rate of the fuel solution was controlled by a pump that rotated at 10 rpm, producing a flow rate of the solution of approximately 0.5 mL/min. The flow rate of air was controlled to be 20 mL/min. The electrolyte was not treated with water before insertion into the fuel cell in the emboidment being described—instead, the electrolyte was left in situ witin the fuel cell with the fuel and humidified air overnight before the fuel cell testing to allow for reaction with water—the water treatment was therefore performed in situ prior to use. In embodiments in which gaseous fuels are used in place of aqueous fuels, the fuel cell 100 may be soaked in water prior to use, and/or the electrolyte 104 may be soaked in water prior to insertion into the fuel cell 100, to allow sufficient time for the electrolyte 104 to react with water and obtain a sufficient ionic conductivity.

The performance of the fuel cell 100 was tested using a Solartron 1287A electrochemical interface controlled by electrochemical software Corr-Ware/CorrView. Fuel cell performance data are shown in FIGS. 8A and 8B. In summary, increasing temperature and ammonia concentration were found to increase the open circuit voltage (OCV) of the fuel cell. The $Sr_2Fe_2O_5$-based electrolyte 104 was therefore shown to be a promising electrolyte material for direct methanol, ethanol and ammonia fuel cells, and in particular to have good suitability for ammonia fuel cell applications, as the fuel cell was found to have an OCV of 0.44 V of OCV when using concentrated ammonia as a fuel. As the electrolyte 104 of this fuel cell is a solid, relatively dense, sintered pellet, with a relatively low porosity and high tortuosity, fuel crossover is avoided.

The identified family of oxides of which $Sr_2Fe_2O_5$ is a part have the general formula $A_2B_2O_{5\pm\delta}$ and a Brownmillerite structure. This family includes mixed Brownmillerite oxides, in which either or both of the A-sites and the B-sites comprise a mixture of elements rather than a single element (i.e. the A can be replaced with A and A', and/or the B replaced with B and B' in the general formula, to give $A_{2-x}A'_xB_{2-y}B'_yO_{5\pm\delta}$). The simplified formula $A_2B_2O_{5\pm\delta}$, or similar, may be used below but the skilled person would appreciate that this is not intended to exclude oxides with mixed A-site and/or B-site elements. Similarly, the more generalised formula is not intended to exclude oxides with a single A-site and/or B-site element. Herein, A, A' are used for A-site elements, and B, B' for B-site elements. However, the skilled person would appreciate that there may be only one A- or B-site element, or that there may be more than two A-site elements or B-site elements (e.g. three, four, or five different elements for each site). The general formula used is selected to emphasise that both A- and B-sites may be occupied by mixed elements, not to limit the embodiments described to having only one or two elements on each site.

In the Brownmillerite oxides being described, A, and A' (where present), are selected from Ca, Sr, Ba, Ln (i.e. any lanthanide element), Y, Na, K, Rb, Cs, Pb, and Bi. More particularly, one or both of A and A' may be Ca, Sr, or Ba.

In the Brownmillerite oxides being described, B, and B' (where present), are selected from Ln, Y, Sc, Mg, Ca, Sr, Li, Na, Co, Fe, Mn, In, Ni, Cu, Zn, Sc, Ti, V, Cr, Ga, Ge, Al, Si, Sn, Sb, Zr, Hf, Nb, Mo, W, Cd, Te, and Ta. In some such embodiments, B, and B' (where present), may be selected from Zr, Ce, In, Y, La, Te, Co, Fe, Mn, Ni, Cu, Zn, Sc, Ti, V, Cr, Ga, Ge, Al, Si, Sn, Sb, Zr, Hf, Nb, Mo, W, As, and Ta (Indium may optionally also be included in this list), and comprise at least one of Zr, Ce, Y, Ti, V, Cr, Mn, Fe, Co, Ni, Te, and Cu. More particularly, one or both of B and B' may be Zr, Ce (a lanthanide, Ln), Y, Ti, Mn, Fe, or Co.

In addition, some of the oxygen may be replaced with N, Cl, F, Br, S, and/or Se, providing a doped oxide (e.g. an oxynitride if N replaces some of the oxygen). For example, an oxynitride such as $Sr_2Fe_2O_{5-x}N_y$ or $SrFeO_{2.5-x}N_y(OH)_m \cdot nH_2O$ may be used as an electrolyte material. The $O_{5\pm\delta}$ in the general formula above may therefore be replaced by $O_{5-z\pm\delta}C_z$, with C representing the doping element(s). The term "oxides" as used herein is therefore intended to include doped oxides such as oxynitrides. The general formula for Brownmillerite oxides explicitly showing the optional doping can be written as: $(A_{2-x}A'_x)_{1-a}B_{2-y}B'_y(O_{1-z}C_z)_{5\pm\delta}$. The dopant element, C, replacing some of the oxygen, is generally selected from N, Cl, F, Br, S, and Se.

The value of a is generally less than or equal to 0.3, optionally ≤0.2, and further optionally ≤0.1 (which may be especially likely for A-site deficient Brownmillerite oxides). In various embodiments, the value of a is less than or equal to 0.15, optionally ≤0.10, and further optionally ≤0.05. The value of z is generally less than or equal to 0.04, and optionally ≤0.02 for anion doped Brownmillerite oxides. In various embodiments, the value of z is less than or equal to 0.02, and optionally ≤0.01.

After reacting with water, an oxyhydroxide and/or a hydrated oxide may be formed. A general formula for the hydrated Brownmillerite oxide is $(A_{2-x}A'_x)_{1-a}B_{2-y}B'_y(O_{1-z}C_z)_{5\pm\delta} \cdot n'H_2O$, where n'≥0.01. The oxyhydroxides are discussed in more detail below.

Figure 3:
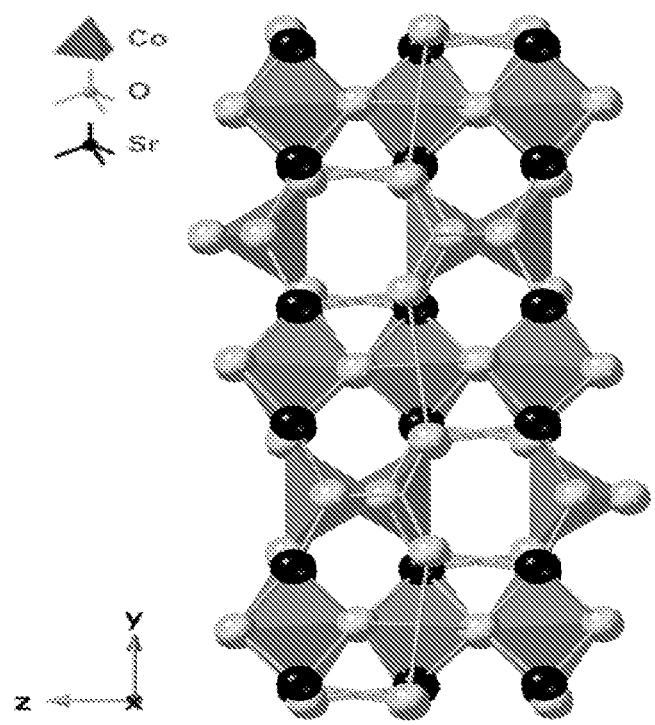
FIG. 3 is a representation of a Brownmillerite structure.

FIG. 3 illustrates a typical Brownmillerite structure, and more specifically shows the structure of $Sr_2Co_2O_5$. The A-site ions (in this case, strontium) are represented by dark grey spheres. The B-site ions (in this case, cobalt) are represented by polyhedra. The oxygen ions (in this case, not mixed with another C-site ion) are represented by light grey spheres. These types of oxides (or doped oxides, such as oxynitrides) are rich in oxygen vacancies, which may adsorb water to form, $A_2B_2O_5(OH)_m$ (a non-hydrated oxyhydroxide) or $A_2B_2O_5(OH)_m \cdot nH_2O$ (a hydrated oxyhydroxide). The $OH^-$ and/or $H^+$ ions are mobile in the $A_2B_2O_5(OH)_m \cdot nH_2O$ lattice, leading to high ionic conduction (the non-hydrated oxyhydroxide having n=0). As described above, this formula may be generalised to $A_{2-x}A'_xB_{2-y}B'_yO_{5-z}C_z(OH)_m \cdot nH_2O$. The oxides of the selected family may have a relatively high density of oxygen or anion vacancies. Once these oxides are treated with water, under appropriate conditions, even at relatively low temperatures (below 100-200° C. and optionally around 25° C.), lattice water or $OH^-$ at or near the former locations of these vacancies can be used to conduct $H^+$ and/or $OH^-$ ions.

In general, the minimum requirement on ionic conductivity is $1.0 \times 10^{-2}$ S/cm for use of these materials as electrolytes 104 (or other ionic conducting layers) for electrochemical devices 100 such as fuel cells, electrolysers and gas separators/purifiers. For batteries, the requirement is generally slightly lower. At higher temperatures, the ionic conductivity generally increases, but even at temperatures around room temperature (20-25° C.) the conductivity is shown to be above this limit. These materials may therefore be used for electrolytes 104 for operation at around room temperature, as well as at higher temperatures. Room temperature fuel cells and electrolysers 100 may therefore use these ceramic electrolyte materials. Advantageously, the materials may be used at temperatures of below 500° C., and optionally below 100° C. or 60° C. For example, the electrolytes 104 as described herein may have working temperatures of between zero and 600° C., optionally between zero and 400° C., and further optionally between zero and 200° C. A lower bound on the working temperature of e.g. 10° C., 15° C., or 20° C. may apply in some embodiments. Relatively low temperature, and room temperature, electrochemical devices 100 may therefore use electrolytes 104 (or other ionic conducting layers) as described herein.

Pure ceramic electrolytes 104 made from these materials are solid state, and can be made dense and robust using standard manufacturing techniques, thus addressing crossover issues associated with currently-used polymer membrane electrolytes or KOH-based alkaline electrolytes.

A high density of oxygen or anion vacancies was mentioned above as helping to provide high ionic conductivity and high ion transfer number, however this was found not to be the only factor. In particular, the below inter-linked factors are considered herein:

(1) Starting material structure: The high ionic conductivity is related to the structure of the starting oxides. For example, doped $CeO_2$ with a fluorite structure has a relatively high density of oxygen vacancies, but experimentation with $Ce_{0.5}La_{0.5}O_{2-\delta}$ following preparation methods as described below yielded materials with too low a conductivity, and also mixed ionic/electronic conduction rather than pure ionic conduction. A high concentration of oxygen vacancies therefore does not guarantee high ionic conductivity.

(2) Starting material oxygen vacancy location: Ordered oxygen vacancies forming a continuous channel, such as for Brownmillerite oxides, or at least local order (as in perovskites) were found to provide improved ionic conductivity.

(3) Starting material composition: Experiments indicate that a relatively high reactivity of the starting oxide with water is desirable; in particular having a tendency to form (optionally hydrated) oxyhydroxides, and hydrated oxides. The reactivity with water, which is related to the structure and composition of the starting oxides, was found to be an important property to form a pure-ionic conductor with high ionic conductivity. A starting material capable of forming an oxyhydroxide was found to be particularly beneficial in some embodiments.

(4) The hydration process: Forming a hydrated oxide or an oxyhydroxide was found to have a strong influence in forming an ionic conducting material with a sufficiently high ion transfer number.

In some oxides such as $SrZr_{0.8}Y_{0.2}O_{3-\delta}$, and $SrCe_{0.8}Y_{0.2}O_{3-\delta}$, there are extrinsic oxygen vacancies due to the doping with a low-valent element at the B-sites. In some cases, oxygen or anion vacancies can also be introduced when doping low-valent elements at the A-site to generate A-site deficient oxides. For most materials such as $SrZr_{0.8}Y_{0.2}O_{3-\delta}$, $SrCe_{0.8}Y_{0.2}O_{3-\delta}$, $SrTi_{0.7}Fe_{0.3}O_{3-\delta}$, and $SrTi_{0.7}Co_{0.3}O_{3-\delta}$, after firing in air to obtain a perovskite phase (may contain a small amount of a secondary phase), followed by being treated in water, they show high ionic conductivity with high ion transfer number. The ionic conduction is highly related to the chemical composition. In general, oxides which are composed of fixed-valent elements are likely to be good pure ionic conductors when in contact with liquid water while those composed of multi-valent elements are likely to be electronic or mixed ionic/electronic conductors when in contact with liquid water. The precise chemical composition of the material is very important too. For example, when only fired in air, $SrTi_{0.5}Fe_{0.5}O_{3-\delta}$ is a mixed ionic/electronic conductor in water while $SrTi_{0.7}Fe_{0.3}O_{3-\delta}$ is primarily an ionic conductor in water. Increasing the Ti content in the $SrTi_{1-x}Fe_xO_{3-\delta}$ series may change the materials from electronic to mixed ionic/electronic conductors, and then to mainly ionic conductors. The untreated oxides of the families selected as starting materials, often with a perovskite or Brownmillerite structure, are generally electronic conductors, semiconductors or ionic and electronic insulators, only gaining their ionic conduction properties when prepared and treated as described herein. The ionic conductivity is generally not high enough for use as an electrolyte 104. On hydration with water, the structure of the ceramic material is affected. Starting with materials with the listed structures was found to provide sufficient pathways for the diffusion of ions (such as $OH^-$ or $H^+$ ions) in the hydrated material. With the presence of $OH^-$ ions, or the new O—H bonds, the continuous diffusion of $OH^-$ and/or $H^+$ ions is facilitated, so improving ionic conductivity. In particular, the reaction between the oxides and water, forming new (hydrated or anhydrous) oxyhydroxides, causes new bonds to be formed, and also breaks pathways for electrons available in the starting material (so reducing or eliminating electronic conductivity). For samples with lower concentrations of oxygen vacancies, the pathway for electrons may not be completely blocked, leading to an electronic conductor or a mixed electronic/ionic conductor, hence a higher concentration of oxygen vacancies is favoured especially when the ionic conducting layer is to be used as an electrolyte, for which minimal or no electronic conduction is desired. When firing the oxides under different conditions, for example, at different temperatures in different atmospheres (optionally a reducing atmosphere), the material composition and/or the number of oxygen vacancies can be tailored. After reacting the fired oxide material with water, nearly pure-ionic conducting materials have been shown to be obtained from a variety of ceramics with a reasonably high concentration of oxygen vacancies. These materials are suitable for use as electrolytes 104 for electrochemical devices 100. When the oxygen vacancy concentration is not sufficiently high, after reacting with water, a mixed ionic/electronic conductor may be formed—the electronic conduction may be too high for use as an electrolyte in such cases. However, these mixed ionic/electronic conductors may find applications as electrode materials for some electrochemical devices or for gas separation membranes.

(5) Ion size: It was found that the ionic conductivity is related to the cation size at the A-site, in particular for perovskite or Brownmillerite structure oxides. Oxides with (relatively small) Sr cations at the A-sites tend to exhibit higher ionic conductivity. Oxides with (larger) Ba cations at the A-sites tend to exhibit lower ionic conductivity. In general, large $Ba^{2+}$ ions at the A-sites will lead to large lattice parameters, and therefore larger gaps between neighbouring $OH^-$ ions in an oxyhydroxide formed from that starting oxide. The jump, or diffusion, of $OH^-$ ions or $H^+$ ions via $OH^-$ ions or lattice $H_2O$ becomes more difficult with the larger spacing, leading to lower ionic conduction. When the A-site ions are too small, however, for example with $Ca^{2+}$ ions in some structures, then the formed oxyhydroxide was generally found to have too high electronic conduction for use as an electrolyte 104 in an electrochemical device 100. The size of A-site ions is therefore selected to be large enough to break the pathways for electrons, but small enough to allow ion "hopping" for ionic conduction. In particular, the A-site ion size is thought to affect OH bond separation in the electrolyte material. It was found that the ionic conductivity of the oxyhydroxide formed from $Ba_2Fe_2O_{5\pm\delta}$ is lower than that formed from $Sr_2Fe_2O_{5\pm\delta}$. This is thought likely to be due to the longer distance/spacing between neighbouring OH bonds in the oxyhydroxide formed from $Ba_2Fe_2O_{5\pm\delta}$ because of the large lattice parameter due to the presence of large cations at the A-site, making the jumping of $OH^-/H^+$ ions more difficult. Oxides with compositions as detailed herein may form oxyhydroxides with appropriately-sized diffusion channels for ions. If the channel is too narrow (when smaller A-site cations are used), the mobility of the ions ($OH^-$ and/or $H^+$ ions) may be limited. When the channels are too large, e.g. with larger A-site cations such as $Ba^{2+}$, jumping of ions from one site to the next available site may become difficult, leading to lower ionic conductivity. In various experiments, samples with $Sr^{2+}$ ions at the A-site were shown to exhibit the highest ionic conductivity. However, the size of the channels, which provide the pathways for ions, is also related to the size of B-site ions and the crystal structure. The channel size can therefore be tailored by doping with cations at A- and/or B-sites. The effect of cation size may also vary between different crystal structures.

The skilled person would appreciate that careful tailoring of the composition and structure of the starting oxides is therefore required to create a material with suitable properties for an electrolyte 104. In particular, it may be desirable to make materials with a reasonably high number density of oxygen vacancies, and which have a layered structure, or for which the formed (hydrated or anhydrous) oxyhydroxide (after treatment with water) has a channel or pathway for the diffusion of $OH^-/H^+$ ions. In particular, a starting material oxide with ordered oxygen vacancies (such as Brownmillerite structures), or which is oxygen vacancy-rich with localised ordering of oxygen vacancies (such as various perovskite oxides), or layered oxides with oxygen vacancies (e.g. various $K_4CdCl_6$-structured oxides), may be favoured.

As described in more detail below, the method of preparation of the electrolyte material may be tailored to provide the desired properties. For example, for oxides with a perovskite or Brownmillerite structure, in general, the starting material is fired in an atmosphere with a low oxygen partial pressure, such as pure $N_2$, Ar or mixed $N_2$/Ar. A reducing gas, typically $H_2$ but optionally another reducing gas such as CO, may be added to the atmosphere. Firing in an atmosphere with a low oxygen partial pressure, and optionally a reducing atmosphere, may help to increase the oxygen vacancy concentration in the resultant fired material. The increased number of oxygen vacancies may facilitate the formation of more $OH^-$ ions in the oxyhydroxides formed in the hydration step, and also the integration of more $H_2O$ into the lattice, leading to higher ionic conductivity.

A solid-state $H^+$ and/or $OH^-$ ionic conducting material as described herein may therefore be used as an electrolyte 104 to replace the state of the art Nafion® membrane or alkaline membrane or KOH solution, for example. The ceramic oxide starting materials described are generally stable in air, compatible with $CO_2$, and can be made dense so as to avoid fuel cross-over. Electrolyte cost may also be low as relatively cheap oxide materials are used to form the electrolytes 104.

Figure 4:
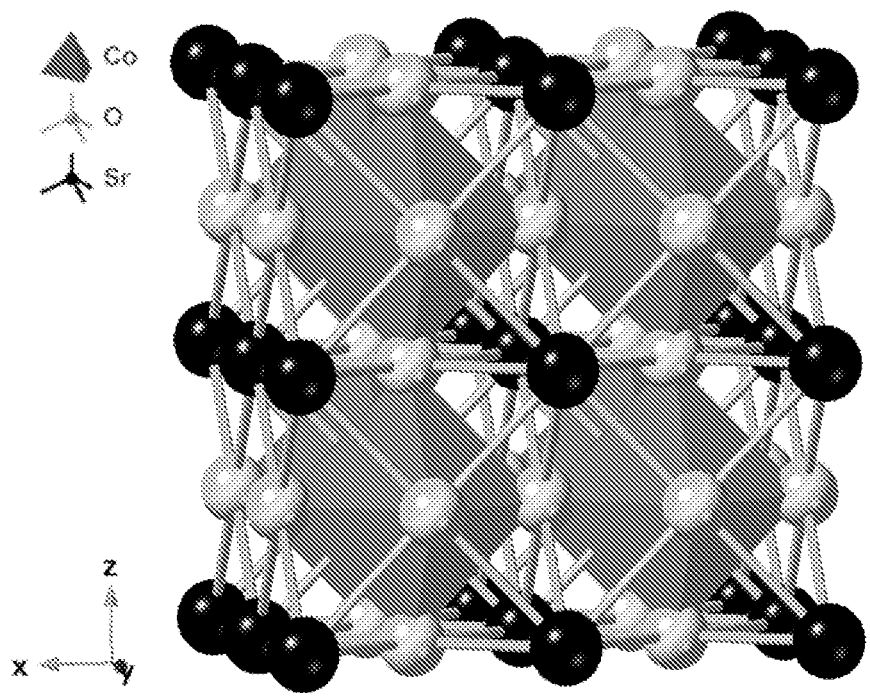
FIG. 4 is a representation of a perovskite structure.
Figure 5:
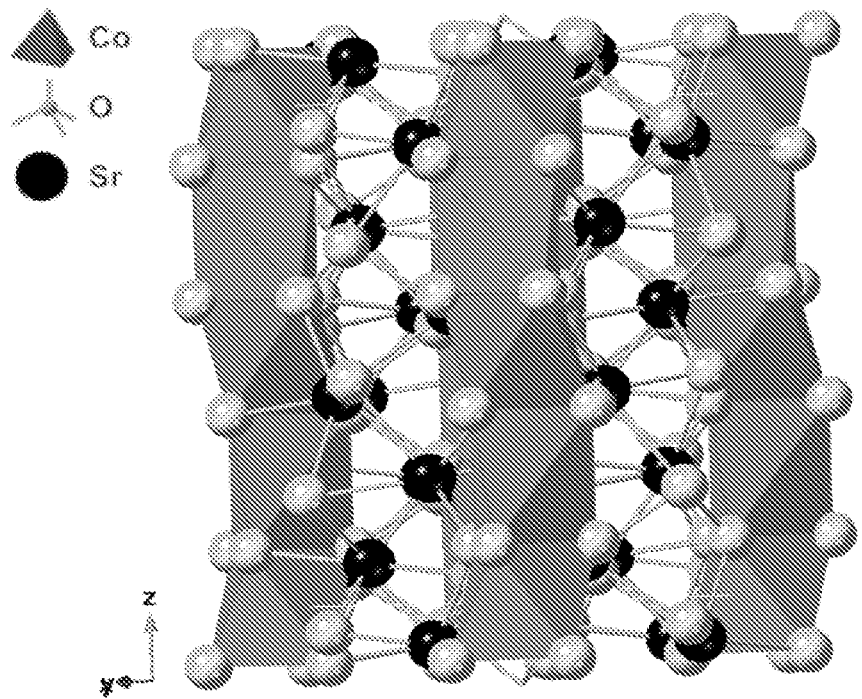
FIG. 5 is a representation of a $K_4CdCl_6$ structure.

The Brownmillerite structured materials described above are an example of one family of materials offering suitable characteristics. To date, the families of starting materials identified as satisfying these criteria and providing electrolyte materials when hydrated are, in terms of structure:
  A. Oxides with a Brownmillerite structure, as shown in FIG. 3;
  B. Oxides with a perovskite structure, as shown in FIG. 4; and
  C. Oxides with a $K_4CdCl_6$ structure, such as $Ca_3Co_2O_6$, as shown in FIG. 5.

The skilled person in the field of crystallography would appreciate that the term "$K_4CdCl_6$ structure" is widely used to refer to a known structure of $K_4CdCl_6$, whatever the elemental composition of the material. $K_4CdCl_6$ itself is not included in the set of "oxides with a $K_4CdCl_6$ structure" as it is not an oxide. The $K_4CdCl_6$ structure is a 1D layered structure as shown in FIG. 5. The structure comprises 1D channels, which provide potential pathways for the diffusion of ions such as $OH^-$ or $H^+$ ions.

As described above, the elemental composition of the starting materials also affects properties and not all oxides with the structures listed above form part of the identified family. Further limitations on each family are provided elsewhere herein—this list of structural definitions of each family is provided here for ease of reference. In addition, the subsequent hydration changes the structure and composition of the starting material to form the electrolyte material. In general, a starting material ceramic oxide with ordered oxygen vacancies (such as Brownmillerite structures), or with a high concentration of oxygen vacancies with localised ordering (such as oxygen vacancy rich perovskite oxides), or a layered oxide with oxygen vacancies, is selected. In most cases, after reaction with water, water molecules and/or $OH^-$ anions are incorporated at or near the locations of the B-site tetrahedra, forming continuous channels to be used as the pathways for ions such as $OH^-$ and $H^+$ ions.

For example, for Family A of the starting materials—the Brownmillerite structure oxides, for a simple, undoped, Brownmillerite ceramic comprising only three elements, the general formula is: $A_{2-a}B_2O_{5\pm\delta}$. A is selected from Ca, Sr, Ba, Ln (i.e. any lanthanide), Y, Na, K, Rb, Cs, Pb, and Bi. B may be selected from Ce, Zr, In, Y, Ti, V, Cr, Mn, Fe, Co, Ni, Cu, and more generally is selected from Ln, Y, Sc, Mg, Ca, Sr, Li, Na, Co, Fe, Mn, In, Ni, Cu, Zn, Sc, Ti, V, Cr, Ga, Ge, Al, Si, Sn, Sb, Zr, Hf, Nb, Mo, W, Cd, As, and Ta. The value for a in the general formula above is generally less than or equal to 0.3, often less than or equal to 0.2, and still further optionally less than or equal to 0.1 for A-site deficient Brownmillerite oxides.

In doped Brownmillerites, one or more of A, B and O can be partially replaced by one or more other elements, again selected from a list to provide the desired properties. A general formula for the doped oxides can be presented as $(A_{2-x}A'_x)_{1-a}B_{2-y}B'_y(O_{1-z}C_z)_{5\pm\delta}$. A and A' are one or more elements selected from the list provided above for A in the undoped oxide: Ca, Sr, Ba, Ln, Y, Na, K, Rb, Cs, Pb, Bi. B and B' are one or more elements selected from Ln, Y, Sc, Mg, Ca, Sr, Li, Na, Co, Fe, Mn, In, Ni, Cu, Zn, Ti, V, Cr, Ga, Ge, Al, Si, Sn, Sb, Zr, Hf, Nb, Mo, W, Cd, As, and Ta. Optionally, B and B' are one or more elements selected from Ce, Zr, Y, Co, Fe, Mn, In, Ni, Cu, Zn, Ti, V, Cr, Ga, Ge, Al, Si, Sn, Sb, Zr, Hf, Nb, Mo, W, Ta, and at least one of B and B' may be selected from the list provided for B in the undoped oxide: Ce, Zr, Y, Ti, V, Cr, Mn, Fe, Co, Ni, Cu. The value of a is generally as described for the undoped oxide. The value of z is generally less than or equal to 0.04, and optionally less than or equal to 0.02, for anion doped Brownmillerite oxides. C, which replaces some of the oxygen of the undoped oxide, is one or more elements selected from: N, Cl, F, Br, S, Te, and Se.

As one example of this family, the ionic conductivity of $Sr_2Fe_2O_{5\pm\delta}$ after reacting with water to form the oxyhydroxide is 0.041 S/cm at 90° C., which is the same as the commercial Nafion® membrane (0.04 S/cm at 96° C.), with an ionic transfer number of 0.998, so providing strong electrolyte performance.

The Brownmillerite structure belongs to a family of compounds formulated as $A_nB_nO_{3n-1}$, where n is greater than or equal to 2. The structures comprise (n−1) alternating perovskite-type layers of corner-sharing $BO_6$ octahedra and a layer of $BO_4$ tetrahedra rows. In the structure of Brownmillerite ($A_2B_2O_5$, i.e. the specific case of n=2), the oxygen vacancies are ordered along (010) planes, forming a one-dimensional (1D) diffusion pathway for oxygen ion migration in the tetrahedral layer.

Turning to Family B of the starting materials—the perovskite structure oxides, FIG. 4 illustrates a perovskite structure, and more specifically the structure of $SrCoO_{2.64}$. This structure is typical of a primitive perovskite. The A-site ions (in this case, strontium) are represented by dark grey spheres. The B-site ions (in this case, cobalt) are represented by polyhedra (in this case, $CoO_6$ octahedra, with some oxygen sites unoccupied). The oxygen ions, (in other embodiments, the oxygen may be mixed with another C-site ion), are represented by light grey spheres. In many embodiments, an oxygen-deficient perovskite-structured oxide material of Family B is reacted with water to form an oxyhydroxide for use as an electrolyte material.

It will be noted that the simplest general formula for a perovskite is $ABO_3$—the stoichiometry of oxygen in $SrCoO_{2.64}$ being just 2.64, rather than 3, indicates an oxygen deficiency. The general formula can be re-written as $ABO_{3-\delta}$, with the value of $\delta$ showing the level of oxygen deficiency. The value of $\delta$ may be zero in some embodiments, but may be selected to be greater than or equal to 0.1, 0.2, 0.3, 0.4 or 0.5 in various embodiments. More specifically, "primitive" perovskite oxides have the general formula $ABO_{3-\delta}$. As with the Brownmillerite oxides, A, B and O can all be partially replaced with one or more other elements, with the term "double perovskite oxides" or "triple perovskite oxides" being used for perovskites with two or three different A-site and B-site elements, respectively, for example. This yields more complex general formulae:

Double perovskite oxides: $(A_{2-x}A'_x)_a B_{2-y}B'_y O_{6-\delta}$
Triple perovskite oxides: $(A_{3-x-x'}A'_x A''_{x'})_a B_{3-y-y'} B'_y B''_{y'} O_{9-\delta}$
Doped double perovskite oxides: $(A_{1-x-x'}A'_x A''_{x'})_{2-a} B_{2-y-y'}B'_y B''_{y'}(O_{1-z}C_z)_{6-\delta}$ In this family of starting materials, the one or more A-site elements are selected from: Ca, Sr, Ba, Ln, Y, Na, K, Rb, Cs, Pb, Bi. The one or more B-site elements are selected from: Ln, Y, Sc, Mg, Ca, Sr, Li, Na, Co, Fe, Mn, In, Ni, Cu, Zn, Sc, Ti, V, Cr, Ga, Ge, Al, Si, Sn, Sb, Zr, Hf, Nb, Mo, W, Cd, and Ta. Optionally, the one or more B-site elements are selected from: Zr, Ce, Y, Co, Fe, Mn, In, Ni, Cu, Zn, Ti, V, Cr, Ga, Ge, Al, Si, Sn, Sb, Zr, Hf, Nb, Mo, W, Ta; and may include at least one of: Zr, Ce, Y, Ti, Mn, Fe, Co, Ni, Cu. C, where present, is selected from N, Cl, F, Br, S, Se. The value for a in the general formula above is generally less than or equal to 0.15, often less than or equal to 0.1, and still further optionally less than or equal to 0.05 for A-site deficient perovskite oxides. The value of z is generally less than or equal to 0.2, and optionally less than or equal to 0.1, for anion doped perovskite oxides. The value of z is zero for undoped oxides. Where the simplified formula $ABO_{3-\delta}$ is used, it will be appreciated that this is often used to represent doped perovskites with any appropriate number of A-site elements and B-site elements, and optionally partial replacement of the oxygen.

Figure 6:
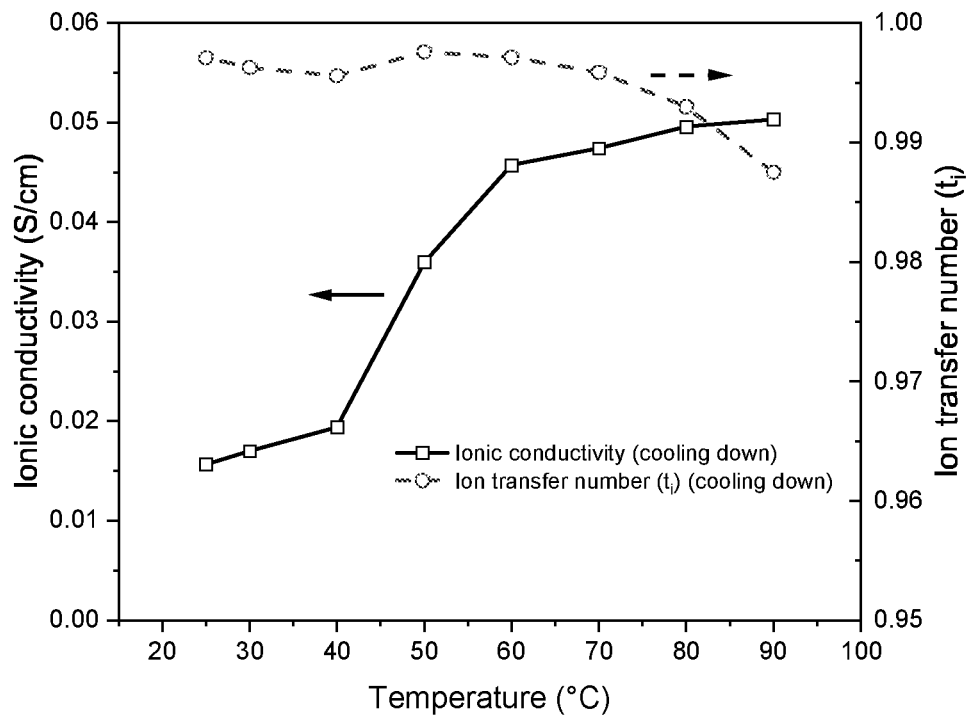
FIG. 6 is graph of the conductivity and ion transfer number with temperature for a sample of $SrCo_{0.5}Ti_{0.5}O_{3-\delta}$ (perovskite structure) after soaking in water at room temperature for 3 days.

For oxides with a perovskite structure, when the oxygen vacancy concentration increases to a certain level, the oxygen vacancies may not be fully ordered, as is generally the case for Brownmillerite structure oxides. However, partial, local, order is thought to occur, providing some channels for ion migration after the reaction with water. A higher concentration of oxygen vacancies generally increases the ionic conductivity, if other factors are unaltered. As an example, the ionic conductivity and ion transfer number of a hydrated $SrCo_{0.5}Ti_{0.5}O_{3-\delta}$ perovskite material between 25 and 90° C.

is illustrated in a graph 200 in FIG. 6. FIG. 6 shows the conductivity and ion transfer number of $SrCo_{0.5}Ti_{0.5}O_{3-\delta}$ after the material is soaked in water at room temperature for 3 days. The ionic conductivity is 0.016 S/cm at room temperature with an ionic transfer number of 0.997. When the temperature increased to 90° C., the ionic conductivity increased to 0.05 S/cm with ionic transfer number of 0.988. This ionic conductivity is higher than that for Nafion® (0.04 S/cm at 96° C.). The $SrCo_{0.5}Ti_{0.5}O_{3-\delta}$ used for the sample tested was synthesized by the standard Pechini method. 21.60 g of $Sr(NO_3)_2$, 14.90 g of $Co(NO_3)_2 \cdot 6H_2O$ and 14.93 g of Titanium isopropanol $(Ti(C_3H_7O)_4)$ were dissolved in deionized water to prepare a mixed solution. Then 46.58 g of citric acid $(C_6H_8O_7)$ was added into the mixed solution, providing a molar ratio of 1.2:1 of citric acid to the total molarity of metal ions. 10.03 g of ethylene glycol $(C_2H_6O_2)$, with a molar ratio of 2:3 to citric acid, was added into the mixed solution and magnetically stirred at 150° C. for 6 hours on a hot plate to form a gel. The gel was dried at a constant temperature of 450° C. for 1 hour to burn off the organic components. After the organic components were removed, the powder was ground and calcined in air at 600° C. for 5 hours with a heating/cooling rate of 5° C./min. Then, the powder was reground and calcined in air at 900° C. for 9 hours to form a $SrCo_{0.5}Ti_{0.5}O_{3-\delta}$ phase. The prepared powder was then pelletized and fired in Argon at 1100° C. for 12 hours with a heating/cooling rate of 2° C./min. FIG. 12 provides XRD data for the pellet after firing in Argon, confirming the expected perovskite structure. For testing the ionic conductivity of the $SrCo_{0.5}Ti_{0.5}O_{3-\delta}$ pellet in water, two side surfaces of the pellet were coated with a silver conductive ink (Fisher Scientific) to form Ag electrodes. The pellet coated with Ag ink was dried at 130° C. for 150 minutes. A sandwich-structure cell with the pellet between two layers of silver mesh was then immobilised in a jig. Electrochemical impedance spectroscopy (EIS) was then performed using a Solartron 1470/1455 with 10 mV amplitude and frequency range of 100000-0.01 Hz. DC conductivity of the pellet was measured by a pseudo four-terminal method by applying 1 V constant DC voltage across the pellet while the current of the sample was recorded. The conductivity and ion transfer number are shown in FIG. 6. The highest ionic conductivity of $SrCo_{0.5}Ti_{0.5}O_{3-\delta}$ is 0.050 S/cm, obtained at 90° C. in water, with an ionic conduction transfer number ($t_i$) of 98.8%. The conductivity was measured during the cooling process.

For perovskite oxides with the general formula $(A_{1-x}A'_x)_{1-a}B_{1-y}B'_y O_{3-z-d}C_z$, after reacting with water, a hydrated perovskite oxide with the following formula may be formed:

$$(A_{1-x}A'_x)_{1-a}B_{1-y}B'_y O_{3-z-d}C_z \cdot n''H_2O.$$

n" is non-zero, and generally n"≥0.01. A, A', B, B', and C are as previously defined. Of the other parameters: $0 \le x \le 1$; $0 \le y \le 1$; $a \le 0.15$; $z \le 0.2$; and $d \le 2$.

The starting Brownmillerite- or perovskite-structured oxides (doped or otherwise) of Families A and B may be selected to contain an element with multi-valence at the B-site in order to accommodate oxygen vacancies, as these were found to be relevant to the electrolyte performance of the treated material. However, single-valent elements may also be used. For example, $SrZr_{0.8}Y_{0.2}O_3$ may provide better performance than $Sr_2Co_2O_5$ in some embodiments. For example, in an ammonia fuel cell or ammonia electrolyser, if pre-treated $Sr_2Co_2O_5$ is used as the electrolyte 104, the cobalt may react with ammonia to form a water-soluble complexing compound, resulting in $Sr_2Co_2O_5$ being slowly lost during operation of. Materials such as $SrZr_{0.8}Y_{0.2}O_3$ may avoid this problem, so providing improved stability.

All the oxides of Families A and B may be prepared from powders by firing. The firing may be performed in air, $N_2$, Ar, He, or optionally in a reducing atmosphere with the introduction of $H_2$, $CH_4$ or CO. When preparing a N-doped oxide, the sample may be fired in $NH_3$ to introduce some nitrogen. Optionally, an atmosphere with a relatively low partial pressure of oxygen compared to air may be used—for example air mixed with an inert gas such as argon. These doped or undoped oxides with Brownmillerite or perovskite structures are typically electronic conductors, semiconductors or insulators, before reacting with water. These oxides are reacted with water to form the desired electrolyte materials. The oxides may be reacted with water by soaking them in liquid water or by placing then in an atmosphere including at least 1 vol. % water (as steam and/or water vapour). The oxides may react with $H_2O$ to form hydrated or non-hydrated oxyhydroxides, or may form hydrated oxides.

The general formula for hydrated or non-hydrated oxyhydroxides formed from the perovskite or Brownmillerite starting materials can be provided as:

$$(A_{1-x}A'_x)_{1-a}B_{1-y}B'_y(O_{3-z-d}C_z)(OH)_m \cdot nH_2O;$$

wherein:
A and A' are selected from Ca, Sr, Ba, Ln, Y, Na, K, Rb, Cs, Pb, and Bi; B and B' are selected from Ln, Y, Sc, Mg, Ca, Sr, Li, Na, Co, Fe, Mn, In, Ni, Cu, Zn, Sc, Ti, V, Cr, Ga, Ge, Al, Si, Sn, Sb, Zr, Hf, Nb, Mo, W, Cd, and Ta, and optionally also As. Optionally, B and B' are selected from Ce, Zr, Y, In, Co, Fe, Mn, Ni, Cu, Zn, Sc, Ti, V, Cr, Ga, Ge, Al, Si, Sn, Sb, Zr, Hf, Nb, Mo, W, and Ta, and may comprise at least one of Ce, Zr, Y, Ti, V, Cr, Mn, Fe, Co, Ni, and Cu. C is selected from N, Cl, F, Br, S, and Se, and optionally also Te; $0 \leq x \leq 1$; $a \leq 0.15$; $z \leq 0.2$; $0 \leq y \leq 1$; $d \leq 2$; $m \geq 0.01$; and $n \geq 0$.

Optionally, a may be less than or equal to 0.1 or 0.05 for A-site deficient perovskite or Brownmillerite oxides. Optionally, z may be less than or equal to 0.1 for anion doped perovskite or Brownmillerite oxides. The value of m is generally variable depending on the valence of the B-site ions and oxygen vacancy concentration. The skilled person would appreciate that the values of z and d generally vary with the value of m. The concentration of anion vacancies is at least in part dependent on the value of (z+d); the higher the z+d value, the more anion vacancies (normally oxygen vacancies), and correspondingly a higher value of m. A higher value of m indicates that there are more charge carriers in the resultant materials, leading to higher conductivity. The value of n is generally variable depending on the chemical composition of the material, and the surrounding steam/water vapour concentration or presence of liquid water. For non-hydrated (anhydrous) oxyhydroxides, doped or undoped, n=0. The value of n for hydrated oxyhydroxides is dependent on the structure and composition of the materials, and may vary widely between embodiments, from near-zero to a relatively high value. The value of n may be less than or equal to 15 or 12, and optionally less than or equal to 6, in various embodiments. The value of n in various embodiments may be in the range from 0.1 to 4, and optionally from 1 to 2. A higher n value may be obtained for more porous/less dense oxide materials, and/or from a longer treatment time with water.

The ionic conducting materials useful as electrolytes (or other ionic conducting layers) are or comprise materials in the form of hydrated or non-hydrated doped or undoped oxyhydroxides in these cases. In additional or alternative embodiments, the ionic conducting materials formed may be or comprise hydrated oxides (doped or undoped) formed from the original starting materials.

For ceramic oxide starting materials with a Brownmillerite structure, the hydrated oxide may have the general formula:

$$(A_{2-x}A'_x)_{1-a}B_{2-y}B'_y(O_{1-z}C_z)_{5 \pm \delta} \cdot n'H_2O$$

wherein:
A and A' are selected from Ca, Sr, Ba, Ln, Y, Na, K, Rb, Cs, Pb, and Bi. B and B' are selected from Ln, Y, Sc, Mg, Ca, Sr, Li, Na, Co, Fe, Mn, In, Ni, Cu, Zn, Sc, Ti, V, Cr, Ga, Ge, Al, Si, Sn, Sb, Zr, Hf, Nb, Mo, W, Cd, and Ta. Optionally, B and B' are selected from Ce, Zr, Y, In, Co, Fe, Mn, Ni, Cu, Zn, Ti, V, Cr, Ga, Ge, Al, Si, Sn, Sb, Zr, Hf, Nb, Mo, W, As, and Ta. C is selected from N, Cl, F, Br, S, Te, and Se. $a \leq 0.15$; $0 \leq x \leq 1$; $0 \leq y \leq 1$; $z \leq 0.04$; and $n' \geq 0.01$. In some embodiments, $a \leq 0.10$ and $z \leq 0.02$. In various embodiments, $a \leq 0.2$, and often $\leq 0.1$, for A-site deficient Brownmillerite oxides. Optionally, $a \leq 0.15$. In various embodiments, $z \leq 0.02$, and optionally $z \leq 0.01$, for anion doped Brownmillerite oxides.

For ceramic oxide starting materials with a perovskite structure, the hydrated oxide may have the general formula:

$$(A_{1-x}A'_x)_{1-a}B_{1-y}B'_yO_{3-z-d}C_z \cdot n''H_2O$$

wherein:
A and A' are selected from Ca, Sr, Ba, Ln, Y, Na, K, Rb, Cs, Pb, and Bi. B and B' are selected from Ln, Y, Sc, Mg, Ca, Sr, Li, Na, Co, Fe, Mn, In, Ni, Cu, Zn, Sc, Ti, V, Cr, Ga, Ge, Al, Si, Sn, Sb, Zr, Hf, Nb, Mo, W, Cd, As, and Ta. Optionally, B and B' are selected from Ce, Zr, Y, Co, Fe, Mn, In, Ni, Cu, Zn, Sc, Ti, V, Cr, Ga, Ge, Al, Si, Sn, Sb, Zr, Hf, Nb, Mo, W, and Ta, and may comprise at least one of Ce, Zr, Y, Ti, V, Cr, Mn, Fe, Co, Ni, and Cu. C is selected from N, Cl, F, Br, S, Te, and Se. $0 \leq x \leq 1$; $0 \leq y \leq 1$; $a \leq 0.15$; $z \leq 0.2$; $d < 2$; and $n'' \geq 0.01$.

In some cases, mixtures of oxyhydroxides and hydrated oxides may be formed from the Family A and/or B starting materials.

Family C starting materials comprise oxides with a $K_4CdCl_6$ structure, as illustrated in FIG. 5. Family C oxide materials, such as $Ca_3Co_2O_6$, and $Sr_3Co_2O_6$, can be reacted in water (e.g. by soaking in liquid water, or treating with water vapour and/or steam) to produce oxyhydroxides and/or hydrated oxides for use as electrolyte materials. More specifically, FIG. 5 illustrates a typical $K_4CdCl_6$ structure, and more particularly shows the structure of $Sr_3Co_2O_6$. The A-site ions (in this case, strontium) are represented by dark grey spheres. The B-site ions (in this case, cobalt) are represented by polyhedra. The oxygen ions (which may be mixed with one or more other C-site ions in other embodiments) are represented by light grey spheres. The structure has distinct one-dimensional features with Co—O chains along the c-axis where the Co-atoms form alternating face sharing coordination polyhedra of trigonal prisms and octahedra. The 1D channels through the structure are provided by the adjoining polyhedra.

As an example of this family, an A-site deficient $Ca_3Co_2O_6$ oxide material was found to have an ionic conductivity of 0.053 S/cm at 90° C. when soaked in water. This conductivity is higher than that of Nafion®, although the ionic transfer number was around 0.91 and more electronic conduction was seen than desired for an electrolyte 104 (this is less strong performance than the performance that was obtained from perovskite or Brownmillerite structure starting materials, but still acceptable in some applications). By tailoring the chemical composition, the ionic transfer number may be further improved.

Oxides with the $K_4CdCl_6$ structure have the general formula shown below, noting that the previous comments about doping and numbers of A- and B-site elements also apply to this family:

$$(A_{1-x}A'_x)_3B_{2-y}B'_yO_{6-z}C_z$$

A and A' are selected from Ca, Sr, Ba, Na, K, Rb, Cs, Ln, Y, Pb, In, Tl, and Bi. B and B' are selected from Co, Fe, Mn, Ni, Cu, Ti, V, Cr, alkaline earth, Mg, Ca, Sr, Ba, lanthanide, Ln (e.g. Ce), Zr, Sc, Y, Zn, Cd, Na, B, Ga, Ge, Al, Si, Sn, Sb, Zr, Hf, Nb, Mo, W, Ta, Pt, Ir, Ru, Li, Rh, and may optionally comprise at least one of the elements Ce, Zr, Y, Sc, Ti, V, Cr, Mn, Fe, Co, Ni, and Cu. C is selected from N, Cl, F, Br, S, I, Te, and Se. y is in the range from 0 to 2; z is in the range from 0 to 0.5; and x is in the range from 0 to 1.

It will be appreciated that, as for structures discussed earlier, the amount of oxygen may not be exactly equal to the amount expected from ideal stoichiometry. For example, for an undoped oxide, the stoichiometry value for oxygen can be higher or lower than 6 by an amount delta ($\delta$)—$Ca_3Co_2O_{6\pm\delta}$. In the embodiments being described $Ca_3Co_2O_{6-\delta}$ is generally preferred to provide oxygen vacancies. The formula above can therefore be written more generally as $(A_{1-x}A'_x)_3B_{2-y}B'_yO_{6-z-\delta}C_z$. The simplified formula above is not intended to exclude non-zero values of delta—the delta is simply not shown for clarity.

Figure 7:
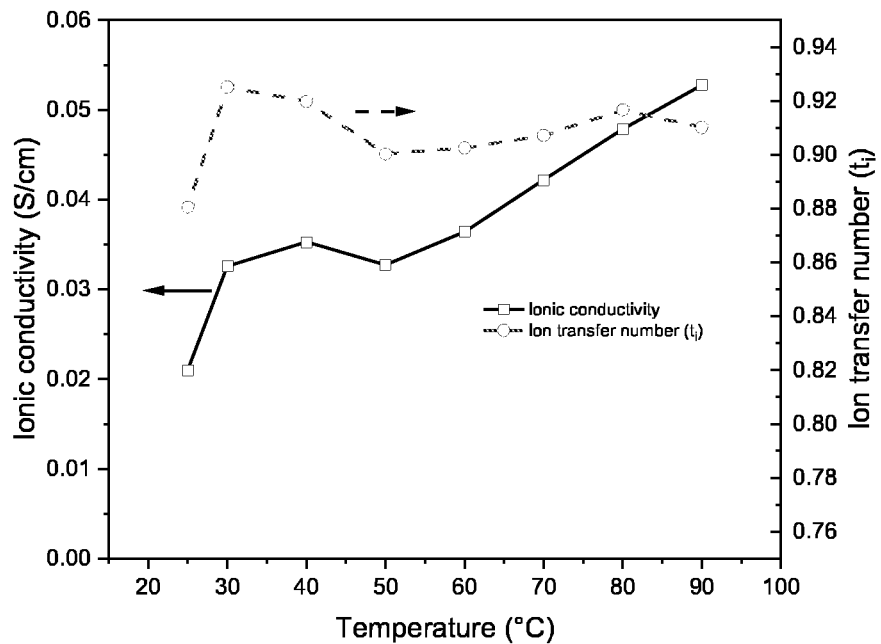
FIG. 7 is a graph of the conductivity and ion transfer number with temperature for a sample of $Ca_3Co_2O_6$ ($K_4CdCl_6$ structure) after soaking in water at room temperature for 3 days.

As an example for Family C, the ionic conductivity and ion transfer number of a $Ca_3Co_2O_6$ material soaked in water for three days at temperatures between 25° C. and 90° C. is illustrated in the graph in FIG. 7. FIG. 7 shows the ionic conductivity and ion transfer number of a sample of $Ca_3Co_2O_6$ after being soaked in water at room temperature for 3 days. The ionic conductivity is 0.021 S/cm at room temperature with an ionic transfer number of 0.881. When the temperature was increased to 90° C., the ionic conductivity increased to 0.053 S/cm with an ionic transfer number of 0.91. The ionic conductivity is higher than that for Nafion® (0.04 S/cm at 96° C.).

A-site deficient $Ca_3Co_2O_6$ was prepared for testing by the following method: $Ca_3Co_2O_6$ was synthesized by a sol-gel process. 19.50 g of $Ca(NO_3)_2 \cdot 4H_2O$, 20.36 g of $Co(CH_3COO)_2 \cdot 4H_2O$, and 37.25 g of citric acid ($C_6H_8O_7$) with a molar ratio of 1:1:2.4 were dissolved in deionized water to form a mixed solution. The mixed solution was magnetically stirred at 125° C. for 12 hours on a hot plate to form a gel. The gel was dried at a constant temperature of 450° C. for 1 hour to allow the organic components in the mixture to be burned off. The resultant powder was ground and calcined in air at 600° C. for 8 hours. Then, the powder was reground and pelletized before being calcined in air at 800° C. for 10 hours to form a $Ca_2Co_2O_5$ phase. After this, the pellets were heated in air at 1000° C. for 10 hours with a heating/cooling rate of 5° C./min to form a $Ca_3Co_2O_6$ phase. X-ray Diffraction (XRD) analysis indicated the formation of $Ca_3Co_2O_6$ phase, with the structure of $K_4CdCl_6$ (data shown in FIG. 13). These XRD data confirmed the resultant pellet to be a single $Ca_3Co_2O_6$ phase.

As the starting material does not include sufficient Ca to form $Ca_3Co_2O_6$, it is believed that a Ca-deficient $Ca_3Co_2O_6$ phase is formed. After treatment with water (soaking in liquid water at room temperature for three days), the material was found to exhibit a relatively high ionic conductivity of 0.053 S/cm at 90° C. in water, with an ionic transfer number of around 0.91. Whilst not as high as values obtained for $Sr_2Co_2O_5$-based oxides, conductivities of around this level remain viable for electrolyte materials. Further, there is a large family of oxides with $K_4CdCl_6$ structures and tuning of the A-site and B-site compositions in line with the principles described herein is likely to improve ionic conductivity and ionic transfer number further. For testing the conductivity of the $Ca_3Co_2O_6$ pellet in water, two side surfaces of the pellet were coated with a silver conductive ink (Fisher Scientific) to form Ag electrodes. The coated pellet was dried at 130° C. for 150 minutes. A sandwich-structure cell with the pellet between two layers of silver mesh was then immobilised in a jig. Electrochemical impedance spectroscopy (EIS) was then performed using a Solartron 1470/1455 with 10 mV amplitude and frequency range of 100000 Hz-0.01 Hz. DC conductivity of the pellet was measured by a pseudo four-terminal method by applying 1 V constant DC voltage across the pellet while the current of the sample was recorded in order to work out the resistance. The conductivity results are shown in FIG. 7. The highest ionic conductivity of $Ca_3Co_2O_6$ is 0.053 S/cm, obtained at 90° C. in water, with an ionic transfer number ($t_i$) of 0.91. The conductivity was measured during cooling of the sample.

It will be appreciated that stoichiometric $Ca_3Co_2O_6$ would generally have a low concentration of oxygen vacancies. However, due to the preparation method described herein, the prepared oxide exhibits a $Ca_3Co_2O_6$ structure but is Ca-deficient, thus having an increased concentration of oxygen vacancies. Firing the precursors in Ar or $N_2$ at 800° C., as opposed to air, may further increase the oxygen vacancy concentration. As the Ca-deficiency introduces oxygen vacancies, firing in air may produce a material with sufficient ionic conductivity even without a subsequent step of e.g. treatment with a reducing liquid or firing in a different atmosphere.

A hydrated oxide or a hydrated or non-hydrated oxyhydroxide derived from an oxide (doped or otherwise) with a $K_4CdCl_6$ structure as described above is formed by treatment with water for use as an electrolyte material. In particular, one or more of the following may be formed: (i) a hydrated oxide with the general formula $(A_{1-x}A'_x)_3B_{2-y}B'_yO_{6-z}C_z \cdot nH_2O$, where n is greater than or equal to 0.01; or (ii) an oxyhydroxide with the general formula $(A_{1-x}A'_x)_3B_{2-y}B'_yO_{6-z}C_z(OH)_m \cdot nH_2O$, where m is in the range from 0.01 to 6. For anhydrous oxyhydroxides, n is equal to zero. The value of n for hydrated oxyhydroxides is generally dependent on the structure and composition of the materials, and may vary widely between embodiments, from near-zero to a relatively high value. For hydrated oxyhydroxides, n is generally greater than or equal to 0.01.

The value of n may be less than or equal to 15 or 12, and optionally less than or equal to 6, in various embodiments. The value of n in various embodiments may be in the range from 0.1 to 4, and optionally from 1 to 2.

Examples of Perovskite Oxides—$SrZr_{0.8}Y_{0.2}O_{3-\delta}$ and Related Materials 1. $SrZr_{0.8}Y_{0.2}O_{3-\delta}$-1300air—Experimental Process:

$SrZr_{0.8}Y_{0.2}O_{3-\delta}$ was synthesized by a sol-gel process. 10.80 g of $Sr(NO_3)_2$, 3.83 g of $Y(NO_3)_3 \cdot 6H_2O$, 13.15 g of $ZrOCl_2 \cdot 8H_2O$, 5 mL of nitric acid (70%), and 38.81 g of citric acid, with a molar ratio of 1:0.2:0.8:1.6:4 were dissolved in deionized water to prepare a mixed solution. Then the mixed solution was magnetically stirred at 90° C. for 12 h on a hot plate to form a gel. The gel was dried at a constant temperature of 400° C. for 1 h and then ignited for combustion. After the organic components in the mixture burned off, the powder was ground and calcined in air at 400° C. for 3 h, then 1000° C. for 2 h. After this, the powder was reground and pelletized before calcined in air at 1300° C. for 24 h with a heating/cooling rate of 5° C./min. to form $SrZr_{0.8}Y_{0.2}O_{3-\delta}$ phase. The XRD pattern indicated formation of a single phase.

For testing the conductivity of the $SrZr_{0.8}Y_{0.2}O_{3-\delta}$ pellet in water, two side surfaces of the pellet were coated with silver conductive ink (Fisher Scientific) to form Ag electrodes. The Ag paste was dried at 130° C. for 150 minutes. The pellets coated with Ag were treated in fresh water at 90° C. twice before the conductivity test, to ensure that the material was hydrated. The resultant sandwich-structure cell was assembled with the pellet between two layers of silver mesh and immobilised in a jig. Electrochemical impedance spectroscopy (EIS) was then performed using a Solartron 1470/1455 with 10 mV amplitude and frequency range of 1 MHz-0.01 Hz. DC conductivity of the pellet was measured by a pseudo four-terminal method by applying 1 V constant DC voltage across the pellet while the current was recorded in order to work out the resistance to electronic conduction. This approach is termed "Method 1" for ease of reference below, as the same method of preparation for, and performance of, conductivity testing was used for a range of pellets.

2. $MZr_{0.8}Y_{0.2}O_{3-\delta}$ (M=Ca, Sr, Ba) Pellet—Experimental Process:

$MZr_{0.8}Y_{0.2}O_{3-\delta}$ (M=Ca, Sr, Ba) was synthesized by a sol-gel process. $M(NO_3)_2$ (M=Ca, Sr, Ba), $Y(NO_3)_3 \cdot 6H_2O$, $ZrOCl_2 \cdot 8H_2O$, nitric acid, and citric acid with molar ratio of 1:0.2:0.8:1.6:4 were dissolved in deionized water to prepare a mixed solution. Then the mixed solution was magnetically stirred at 90° C. overnight on a hot plate to form a gel. Then the gel was dried at a constant temperature of 400° C. for 1 h and ignited for combustion. After the organic components in the mixture burned off, the powder was ground and calcined in air at 400° C. for 3 h, then at 1000° C. for 2 h. After this, the powder was reground and pelletized before being calcined in air. A $SrZr_{0.8}Y_{0.2}O_{3-\delta}$ phase was formed by treatment at 1300° C. for 24 h, a $CaZr_{0.8}Y_{0.2}O_{3-\delta}$ phase at 1300° C. for 4 h, and a $BaZr_{0.8}Y_{0.2}O_{3-\delta}$ phase at 1500° C. for 4 h.

For testing the conductivity of the $MZr_{0.8}Y_{0.2}O_{3-\delta}$ (M=Ba, Ca, Sr) pellet in water, Method 1 as defined above was again performed.

3. $SrZr_{1-x}Y_xO_{3-\delta}$-1300air (x=0 to 0.2) Pellets—Experimental Process:

$SrZr_{1-x}Y_xO_{3-\delta}$-1300air (x=0 to 0.2) was synthesized by a sol-gel process. $Sr(NO_3)_2$, $Y(NO_3)_3 \cdot 6H2O$, $ZrOCl_2 \cdot 8H2O$, nitric acid, and citric acid with molar ratio of 1:0.2:0.8:1.6:4, 1:0.1:0.9:1.8:4, and 1:0:1:2:4 when x=0.2, 0.1 and 0 respectively were dissolved in deionized water to prepare a mixed solution. Then the mixed solution was magnetically stirred at 90° C. overnight on a hot plate to form a gel. Then the gel was dried at a constant temperature of 400° C. for 1 h and ignited for combustion. After the organic components in the mixture burned off, the powder was ground and calcined in air at 400° C. for 3 h, then 1000° C. for 2 h. After this, the powder was reground and pelletized before calcined in air at 1300° C. for 24 h with a heating/cooling rate of 5° C./min to form a $SrZr_{0.8}Y_{0.2}O_{3-\delta}$ phase. The XRD pattern indicates that a single phase was obtained.

For testing the conductivity of the $SrZr_{1-x}Y_xO_{3-delta}$-1300air (x=0 to 0.2) pellet in water, Method 1 was again performed.

Results:

The main phase of as-prepared $SrZr_{0.8}Y_{0.2}O_{3-\delta}$ is a solid solution with the structure of $SrZrO_3$ (PDF Card Number 31-1365), and also contains a tiny amount of $SrY_2O_4$ (PDF card number 32-1272). The XRD patterns of $SrZr_{0.8}Y_{0.2}O_{3-\delta}$ shown in FIG. 14 illustrate that what was formed is a nearly pure solid solution phase.

Each of the various samples was heated in water at 90° C. for one day, then cooled down to room temperature. The water was then replaced, followed by heating up to 90° C., then cooling down to room temperature again—this process was repeated three times. This process is to get rid of any unreacted impurities such as SrO or $Sr(OH)_2$ which may be formed when SrO reacts with $H_2O$. Conductivity data shown in FIG. 15 were then obtained on a subsequent cooling process, after that initial treatment. In general, in the $SrZr_{1-x}Y_xO_{3-\delta}$ series, as the value of x increases, more oxygen vacancies are introduced into the lattice. After being treated in water, the $SrZr_{0.8}Y_{0.2}O_{3-\delta}$ sample exhibits the highest ionic conductivity because it has the highest doping level at the B-site. However, this is not the only factor. For example, in the $SrCe_{1-x}Y_xO_{3-\delta}$ series, after being treated in hot water at 90° C., the ionic conductivity of undoped $SrCeO_{3-\delta}$ is higher than that of $SrCe_{0.9}Y_{0.1}O_{3-\delta}$. Therefore, some undoped materials with few oxygen or anion vacancies may also exhibit high ionic conductivity after being treated in water, particularly hot water. However, the ionic conductivity of $SrCeO_{3-\delta}$ is still lower than that of the heavily doped sample $SrCe_{0.8}Y_{0.2}O_{3-\delta}$ when measured in water. This indicates that introduction of extra oxygen vacancies is still an excellent strategy to obtain materials with high ionic conductivity.

These experiments, for which results are shown in FIG. 15, indicate that in the $SrZr_{1-x}Y_xO_{3-\delta}$ solid state solution, at higher Y-doping, the samples have more oxygen vacancies, leading to higher ionic conductivity. The ionic conductivity is related to oxygen vacancies. Further, as shown in FIG. 16, at the same doping level, the ionic conductivity is seen to be related to the cation size of the A-site in perovskite oxides. The $SrZr_{0.8}Y_{0.2}O_{3-\delta}$ sample exhibits the highest ionic conductivity of the set tested.

For a conventional proton conductor in the $MZr_{0.8}Y_{0.2}O_{3-\delta}$ (M=Ca, Sr, Ba) series, the sample $BaZr_{0.8}Y_{0.2}O_{3-\delta}$ is expected to exhibit the highest $H^+$ or mixed $H^+/O^{2-}$ conductivity at a temperature above 500° C. because it has the largest cell volume thus more 'free volume' (space not occupied by ions in a lattice) to allow the transport of $H^+/O^{2-}$ ions. However, in the study reported herein, using water treatment, it was found that the sample $SrZr_{0.8}Y_{0.2}O_{3-\delta}$ exhibits the highest ionic conductivity in the $MZr_{0.8}Y_{0.2}O_{3-\delta}$ (M=Ca, Sr, Ba) series, much higher than those for $CaZr_{0.8}Y_{0.2}O_{3-\delta}$ and $BaZr_{0.8}Y_{0.2}O_{3-\delta}$, indicating the type of mobile ions ($H^+/OH^-$ ions instead of $H^+/O^{2-}$ ions) may be different, the material providing a different transport mechanism. It was found that $SrZr_{0.8}Y_{0.2}O_{3-\delta}$ is a mixed $H^+/OH^-$ ionic conductor in liquid water, which is very different from the proton conduction properties at high temperature.

It was therefore deduced that, when the lattice parameters are too big, the distances between neighbouring vacancy sites are too long, thus it is difficult for ions to jump or diffuse. When the lattice parameters are too small, the free volume (unoccupied space) is too small which also makes the jumping/diffusing of ions difficult. Neither the too large 'free volume' in $BaZr_{0.8}Y_{0.2}O_{3-\delta}$ nor the too small 'free volume' in $CaZr_{0.8}Y_{0.2}O_{3-\delta}$ leads to high ionic conductivity in water—instead, there is an optimised lattice size or 'free volume' between these two. In particular, the sample of $SrZr_{0.8}Y_{0.2}O_{3-\delta}$ exhibited the highest ionic conductivity of the tested samples. The distance between two available neighbouring sites for the jumping/transfer of $H^+/OH^-$ cannot be too long in order to form continuous pathways for the transport of $H^+/OH^-$ ions. This could be the reason why the $BaZr_{0.8}Y_{0.2}O_{3-\delta}$ sample has more 'free volume' while exhibiting a lower ionic conductivity than the $SrZr_{0.8}Y_{0.2}O_{3-\delta}$ sample when exposed to water. The ionic conductivity of $CaZr_{0.8}Y_{0.2}O_{3-\delta}$ is lower than that for $SrZr_{0.8}Y_{0.2}O_{3-\delta}$ because it has smaller 'free volume'. Therefore, there is an optimised ionic size at the A-site, balancing between 'free volume' and the jumping/transporting distance of $H^+/OH^-$ ions, to achieve the highest ionic conductivity.

As shown in FIG. 17, at 90° C., the conductivity of $SrZr_{0.8}Y_{0.2}O_{3-\delta}$ in water was seen to slightly decrease initially and then stabilise after 75 hours, indicating excellent stability.

FIG. 18 illustrates the ionic conductivity of $SrZr_{0.8}Y_{0.2}O_{3-\delta}$ in wet air at different temperatures. At temperatures below 100° C., the conductivity was seen to increase with increasing temperature. However, when the temperature is above 100° C., the conductivity drops significantly, in the range of $10^{-6}$-$10^{-5}$ S/cm. This experiment indicates the high ionic conductivity of $SrZr_{0.8}Y_{0.2}O_3$ is related to water or steam at low temperature, typically below 100° C. This is very different from the reported proton conduction or mixed $H^+/O^{2-}$ ion conduction of perovskite oxides at high temperatures, typically above 500° C., for use as electrolytes for solid oxide fuel cells and solid oxide electrolytical cells. FIG. 19 illustrates the variation in conductivity and ion transfer number with temperature below 100° C. in more detail. The ion transfer number is over 99.6%, indicating that the material is a good ionic conductor, suitable to be used as an electrolyte for various electrochemical devices.

FIG. 20 provides conductivity data over time. This experiment indicates that the conductivity of $SrZr_{0.8}Y_{0.2}O_{3-\delta}$ is stable in wet air, so indicating that the material is suitable to be used as an electrolyte for fuel cells or other electrochemical devices, when water may be supplied as steam or a humidified gaseous atmosphere, rather than as a liquid, because the high ionic conductivity is retained when it is exposed in a humidified atmosphere. This is particularly useful when used as an electrolyte membrane (optionally as part of a composite to enhance the flexibility and mechanical strength) for a direct hydrogen fuel cell, in which humidified hydrogen is supplied at the anode, and humidified air or $O_2$ is supplied at the cathode. Such an electrode membrane may replace the state-of-the-art Nafion® membrane electrolyte for hydrogen fuel cells with polymer exchange membrane electrolytes, lowering the cost. Unlike the acidic Nafion membrane, the acidity of the materials described herein is much weaker, and some may even be alkaline. Thus, the materials can also be used as electrolyte membranes for alkaline membrane fuel cells. As most of these oxides are chemically compatible with $CO_2$ in air, the poisoning of the conventional alkaline membrane by $CO_2$ from air, leading to reduced $OH^-$ ion conductivity, will not be an issue for these electrolyte materials. Therefore, the disclosed materials may overcome the biggest challenge (avoiding $CO_2$ poisoning) of the conventional alkaline membrane fuel cells and electrolysers.

Testing $SrZr_{0.8}Y_{0.2}O_{3-\delta}$-1300air Pellets in $D_2O$—Experimental Process:

For testing the conductivity of the $SrZr_{0.8}Y_{0.2}O_{3-\delta}$ pellet in $H_2O$ and $D_2O$, Method 1 as described above was again performed. The results of the conductivity testing are shown in FIG. 21.

The conductivity of $SrZr_{0.8}Y_{0.2}O_{3-\delta}$ in $D_2O$ was found to be much lower than that in $H_2O$, indicating that the ionic conduction is related to the migration of a hydrogen-containing species, such as $H^+$ or $OH^-$ ions, or both. From the concentration cell measurement described below, the material was indicated to be a mixed $H^+/OH^-$ ion conductor but mainly an $OH^-$ ion conductor. Whether the material is mainly an $H^+$ or $OH^-$ conductor may depend on one or more of the structure, chemical composition, temperature, and hydration level.

FIG. 22 shows $^1$H-MAS solid state NMR data for hydrated (solid line) and deuterated (dashed line) $SrZr_{0.8}Y_{0.2}O_{3-\delta}$, measured at room temperature. The two peaks at chemical shifts of 3.52 ppm and 0.71 ppm correspond to the Zr—OH—Zr and Zr—OH—Y respectively. It has been confirmed that the hydrogen at the chemical shift of 0.71 ppm, either in the form of $H^+$ or $OH^-$ ions, is mobile. The peak at 0.71 ppm becomes very weak when the sample is dehydrated, indicating that it is related to the physically or chemically adsorbed water, or both. This indicates that a humidified environment is very important to keep the materials hydrated in order to retain high ionic conductivity, which can be achieved either by direct contact with liquid water or being exposed in an atmosphere with at least 5 vol. % water (e.g. as steam). The same materials may exhibit very different conducting properties when they are put in different environments.

To determine whether the material is an $H^+$ or $OH^-$ ion conductor or a mixed $H^+/OH^-$ ion conductor, a concentration cell was used, following the method described in *J. Am. Chem. Soc.* 2013, 135, 1112-11130. For the ceramic oxide electrolyte $SrZr_{0.8}Y_{0.2}O_{3-\delta}$, immersed in water at room temperature, the transport number of $OH^-$ was found to be 0.80 after 30 minutes in an H-cell.

Through this measurement, in water, $SrZr_{0.8}Y_{0.2}O_{3-\delta}$ is shown to be a mixed $H^+/OH^-$ ion conductor, but mainly an OH– ion conductor. This is very different from similar oxides such as doped $BaZrO_3$ and $BaCeO_3$, which are known as H+ ion or a mixed $H^+/O^{2-}$ ion conductor at a temperature above 500° C., and which have been used as electrolytes for fuel cells or electrolytic cells under those conditions. By contrast, the operating temperature selected for the ionic conducting layers described herein is generally selected to be much lower, normally at or below 100° C., and water or a humidified atmosphere is provided. The conduction species are $H^+/OH^-$ ions in the humidified environment below 100° C., while the same material can act as an $O^{2-}/H^+$ ion conductor at temperatures above 500° C. As shown in FIG. 18, the conductivity of $SrZr_{0.8}Y_{0.2}O_{3-\delta}$ in wet air at a temperature above 200° C. is on the order of $\sim 10^{-6}$ S cm$^{-1}$, which is generally too low to be used as an electrolyte for an electrochemical device. However, its ionic conductivity is in the range of $10^{-3} \sim 10^{-2}$ S cm$^{-1}$ at temperatures below 100° C. when in contact with liquid water or exposed to humidified air (FIGS. 16-20), while also exhibiting good stability. As the ionic conductivity of $10^{-3} \sim 10^{-2}$ S cm$^{-1}$ is high enough for use as an electrolyte in an electrochemical devices, this oxide was shown to be a practically useful material.

$Sr_2Co_2O_5$ $Sr_2Co_2O_5$ Pellets Fired in Air—Experimental Process:

$Sr_2Co_2O_5$ was prepared by standard solid-state techniques. 21.59 g of $Sr(NO_3)_2$ and 29.79 g of $Co(NO_3)_2 \cdot 6H_2O$ were ground to form mixture and then calcined in air at 600° C. for 8 h with a cooling rate of 1° C./min. Then, the powder was ground and calcined in air at 1100° C. for 3 h with a cooling rate of 1° C./min to form a $SrCoO_{2.5}$ phase. After this, the as-prepared powder was pelletized and sintered in air at 1100° C. for 3 h with a cooling rate of 1° C./min. The XRD pattern, shown in FIG. 23, indicated that a single phase was formed. For testing the conductivity of the $Sr_2Co_2O_5$ pellet in water, Method 1 as described above was again used. The conductivity data, shown in FIG. 24, indicate that pure $Sr_2Co_2O_5$, fired in air, is primarily an electronic conductor in water. XRD showed the single phase to remain after the conductivity testing, indicating that the phase is stable. However, XRD cannot rule out the possibility that $Sr_2Co_2O_5$ reacts with $H_2O$ to form an oxyhydroxide as this cannot be detected by XRD as it is not sensitive to the element hydrogen.

$Sr_2Co_2O_5$ Pellets Fired in Air then Treated with Argon—Experimental Process:

$Sr_2Co_2O_5$ was prepared by standard solid-state techniques. 21.59 g of $Sr(NO_3)_2$ and 29.79 g of $Co(NO_3)_2 \cdot 6H_2O$ were ground to form mixture and then calcined in air at 600° C. for 8 h with a cooling rate of 1° C./min. Then, the powder was ground and calcined in air at 1100° C. for 3 h with a cooling rate of 1° C./min to form a $Sr_2Co_2O_5$ phase. After this, the as-prepared powder was pelletized and heated in Argon at 1100° C. for 8 h to increase oxygen vacancies of the solid structure. For testing the conductivity of the $Sr_2Co_2O_5$-1100Ar pellet in water, Method 1 was again performed. As shown in FIG. 25, Some peaks for $Co(OH)_2$ were seen in the XRD pattern for the sample after the conductivity test.

Some $Co(OH)_2$ powder was prepared by co-precipitation from $CoCl_2$ and NaOH, then directly pressed into a pellet to test its conductivity in water. XRD data shown in FIG. 25 confirmed that the synthesized $Co(OH)_2$ was a single phase. FIG. 26 shows conductivity data for $Sr_2Co_2O_5$ in water, measured on cooling, and FIG. 27 shows conductivity data for the pure $Co(OH)_2$ sample in water, showing two orders of magnitude lower conductivity than that for the $Sr_2Co_2O_5$ pellet fired in Ar, under the same conditions. This experiment indicates the high ionic conductivity of $Sr_2Co_2O_5$ after firing in Ar is not due to any formed $Co(OH)_2$.

$Sr_2Co_2O_5$ Pellets Fired in Air then Treated in a Reducing Liquid—Experimental Process:

$Sr_2Co_2O_5$ was again prepared by standard solid-state techniques. 21.59 g of $Sr(NO_3)_2$ and 29.79 g of $Co(NO_3)_2 \cdot 6H_2O$ were ground to form mixture and calcined in air at 600° C. for 8 h with a cooling rate of 1° C./min. Then, the powder was ground and calcined in air at 1100° C. for 3 h with a cooling rate of 1° C./min to form a $Sr_2Co_2O_5$ phase. After this, the as-prepared powder was pelletized and sintered in air at 1100° C. for 3 h with a cooling rate of 1° C./min. The XRD pattern indicates formation of a single phase.

In order to increase oxygen vacancies of the solid structure, the $Sr_2Co_2O_5$-1100air pellet was immersed in a reducing reagent composed of 2 M NaOH and 14 M $NaBH_4$ at room temperature for 5 days. Then the pellet was rinsed with deionized water several times and immersed in deionized water for 12 h to wash out the residual reducing reagent on the pellet.

For testing the conductivity of the $Sr_2Co_2O_5$—$NaBH_4$ pellet in water, Method 1 was again performed. The conductivity data for the treated pellet, shown in FIG. 28, confirm that treating the oxide in a reducing liquid can convert a normally-electronic conductor such as $Sr_2Co_2O_5$ into an ionic conductor, when the material is exposed to liquid water or humidified conditions. This method may be applied to other materials, particularly those with multivalent elements in the composition.

$Sr_2Co_2O_5$ Pellets Fired in Air then Electrochemically Reduced (ER)—Experimental Process:

$Sr_2Co_2O_5$ was again prepared by standard solid-state techniques. 21.59 g of $Sr(NO_3)_2$ and 29.79 g of $Co(NO_3)_2 \cdot 6H_2O$ were ground to form a mixture and then calcined in air at 600° C. for 8 h with a cooling rate of 1° C./min. Then, the powder was ground and calcined in air at 1100° C. for 3 h with a cooling rate of 1° C./min to form a $Sr_2Co_2O_5$ phase. After this, the as-prepared powder was pelletized and sintered in air at 1100° C. for 3 h with a cooling rate of 1° C./min. The XRD pattern indicates formation of a single phase.

An electrochemical reduction process was applied to the $Sr_2Co_2O_5$ pellet in order to increase oxygen vacancies of the solid structure. Two side surfaces of pellet were coated with silver conductive ink (Fisher Scientific) to form Ag electrodes. The Ag paste was dried at 130° C. for 150 minutes. An oversaturated $Sr(OH)_2$ solution composed of 8 g of $Sr(OH)_2 \cdot 8H_2O$ and 30 mL deionized water was used as the electrolyte. The $Sr_2Co_2O_5$-1100air pellet coated with Ag paste, Pt mesh and Ag/AgCl functioned as working electrode, counter electrode, and reference electrode, respectively. The electrochemical reduction voltage was controlled at −1.14 V vs. Ag/AgCl for 10 h by an electrochemical interface (Solartron 1287A). Then the pellet was rinsed with deionized water several times and immersed in deionized water for 2 h to wash out residual $Sr(OH)_2$ on the pellet. After this, the pellet was dried at room temperature and recoated by silver conductive ink (RS Components) for further conductivity testing. For testing the conductivity of the $Sr_2Co_2O_5$-ER pellet in water, Method 1 was performed, but not including the adding of a silver ink layer, instead using the silver ink already added. FIG. 29 shows the XRD pattern of the electrochemically reduced $Sr_2Co_2O_5$ pellet after the conductivity testing in water. The main phase remains but it is poorly crystallised. FIG. 30 shows the obtained conductivity data for the pellet, immersed in water. After the electrochemical reduction, the ionic transfer number of $Sr_2Co_2O_5$ in water is over 0.9, showing that the material is mainly an ionic conductor. This experiment indicates that the electrochemical reduction process can also convert an electronic conductor into a dominantly ionic conductor when exposed to water. Again, this method may be applied to other materials, particularly those with multivalent elements in the composition.

In some embodiments, for any of the families and materials described, a pure ceramic electrolyte 104 is formed. This electrolyte 104 may at least substantially consist of one or more hydrated oxides and/or hydrated or non-hydrated oxyhydroxides as described above. These materials may be formed by sintering the prepared powders in a selected atmosphere and at a selected temperature to form a solid ceramic electrolyte 104 with the desired properties. In alternative embodiments, a composite ceramic-polymer electrolyte 104 is formed.

The solid ionic conducting layer 104 may be a composite solid ionic conducting layer comprising at least one hydrated oxide or hydrated or non-hydrated oxyhydroxide as described herein, mixed with one or more polymeric materials to form a composite material. The oxide or oxyhydroxide may, alternatively or additionally, be mixed with one or more metal or ceramic materials, either crystallized or non-crystallized, to form a composite material with good mechanical strength while retaining sufficient ionic conductivity. When an ionic conductor is mixed with a polymeric material, a ceramic material, or a non-metallic material such as carbon/graphite, at an appropriate volume ratio, if the polymeric or non-metallic material itself is not an electronic conductor, the new composite material will be a pure ionic conductor, suitable to be used as an electrolyte for electrochemical devices. When the ionic conductor is mixed with an electronically conductive polymer, such as polypyrrole (PPY) or polyaniline (PAN), a metal or electronic conductive non-metal material, such as carbon, graphene, graphite, and/or one or more electronically conductive oxides/nitrides/carbides, the newly formed composite will be a mixed ionic/electronic conductor. At an appropriate volume ratio, when a mixed ionic/electronic conductor such as $SrTi_{0.5}Fe_{0.5}O_{3-\delta}$, is mixed with any other electronic conductor or insulator, potentially the newly formed composite will be a mixed conductor.

A composite ceramic-polymer electrolyte 104 may comprise one or more hydrated oxides and/or hydrated or non-hydrated oxyhydroxides as described above, mixed with one or more polymers. The one or more hydrated oxides and/or hydrated or non-hydrated oxyhydroxides as described above are the only ionic conductors of the ceramic-polymer electrolyte 104 in some embodiments; the selected polymer may provide some ionic conductivity in other embodiments. The polymeric component may provide a flexible support matrix for the ceramic. The ceramic may be provided as a powder for combination with the polymer. When preparing ceramic-polymer composite electrolytes 104, sintering of ceramic powder is generally not required or indeed desirable. However, firing the powder at a relatively high temperature, typically in a reducing atmosphere or an atmosphere with a low oxygen partial pressure, was found to be beneficial in forming the desired oxygen vacancies in the oxide powders in some embodiments.

A typical method for preparing a ceramic-polymer composite electrolyte may be as follows. A suitable ceramic oxide starting material is acquired. If this material has an insufficient concentration of oxygen vacancies, the material may be fired in an atmosphere with a low partial pressure of oxygen, or optionally in a reducing atmosphere, to introduce more oxygen vacancies. For example, the material may be fired in 5 vol. % $H_2$/Ar or 5 vol. % $H_2$/$N_2$. The firing temperature for this step may be in the range of 200-1200° C., and optionally of 200-700° C., with the temperature being selected based on the material's composition and structure. Instead of, or as well as, this firing step, the materials may be treated with a reducing liquid, or electrochemically reduced, to introduce more oxygen vacancies. If the material is sintered, rather than a powder, the material may be ground to a powder to facilitate making the polymer-ceramic composite. The selected one or more polymers are dissolved in a suitable solvent, or a polymer suspension is prepared. The oxide powder is then mixed with the polymer-containing liquid in a selected ratio. A ceramic-polymer membrane, pellet, or other article of the desired shape, size and thickness is then formed, e.g. by moulding or printing. The composite article is then dried, for example at room temperature or a little warmer, to remove solvents. The prepared ceramic-polymer article is then treated in water, allowing the ceramic component to react and obtain the desired ionic conduction properties, so forming a composite ionic conductor, such as an electrolyte.

The one or more polymers used to form the oxide-polymer composite electrolyte materials are selected from the following list in some embodiments, although the skilled person would appreciate that other suitable polymers may be used instead of, or as well as, those listed: Nafion®; a Nafion® ionomer, high density polyethylene (HDPE), low density polyethylene (LDPE), polyether ether ketone (PEEK); polybenzimidazole (PBI); polyvinyl alcohol (PVA); poly(acrylic acid) (PAA); poly(aryl piperidinium) (PAP); poly(ethylene oxide) (PEO); polypropylene oxide (PPO); poly(ethylene glycol) (PEG); polysulfone (PS); poly (aryleneethersulfone) (PESF); poly (methyl methacrylate) (PMMA); poly(vinylidene fluoride) (PVdF); poly (acrylonitrile) (PAN); polyurethane (PU); polyvinyl pyrrolidone (PVP); polyacrylamide (PAAm); poly-(diallyldimethylammonium) (PDADMA); poly(vinylidene difluoride-co-hexafluoropropylene) (PVDF-HFP); polytetrafluoroethylene (PTFE); polybenzimidazole (PBI); polyvinyl chloride (PVC); chitosan, and an alkaline ionomer. The skilled person would appreciate that all the polymer materials previously investigated for proton-exchange membrane fuel cells (PEMFs) or alkaline membrane fuel cells (AMFCs) may be suitable for forming oxide-polymer composite materials as described herein. In many embodiments, the polymer is selected to be insoluble in water, as it may be in contact with water in use. However, when used as electrolyte for a battery, for example, it is in a sealed environment, and a water soluble polymer such as poly(vinyl alcohol) (PVA) or poly(acrylic acid) (PAA) may also be used as there is no running water to dissolve the polymer.

Water-treated oxide powers as described herein, such as $Sr_2Fe_2O_{5\pm\delta}$ can therefore be mixed with one or more polymers, for example to form a polymer/oxyhydroxide composite electrolyte. As the major conduction relies on the conductive (hydrated or anhydrous) oxyhydroxide, the stability of these composite membranes can be very good. The membranes can therefore be made thin—e.g. with a thickness of around 25 μm to 100 μm—so facilitating wetting of the material. A single polymer, or a mixed polymer, may be used in the composite. In some embodiments, PVA and/or PEO is selected. Low-cost polymers such as PVA, PEG, PS may be of particular interest to reduce the cost for the composite membrane.

In most embodiments, the polymeric component is selected to be hydrophilic. However, a relatively small amount of a hydrophobic polymer may be used with another polymer, for example using a small amount of PTFE (which is generally hydrophobic) to improve the mechanical strength of the composite. In embodiments in which a Nafion®-ceramic oxide electrolyte 104 is prepared, for example in the form of a membrane, ionic conductivity is provided by both the Nafion® and the ceramic material. The overall ionic conductivity may therefore be higher than for the same vol. % of a non-conducting polymer. The presence of the ceramic oxide in the membrane may reduce the level of oxidation of Nafion® (e.g. by $H_2O_2$ generated at a fuel cell cathode) as the oxide can provide the desired ionic conduction, so potentially reducing fuel cell degradation. If the ceramic phase is mainly an $OH^-$ ion conductor, a ceramic-Nafion® membrane made therefrom is generally a hybrid $H^+/OH^-$ conductor. When used as the electrolyte 104 for a hydrogen fuel cell, water/steam may be generated at both the anode and the cathode, so wetting the ceramic-polymer composite membrane, and alleviating any requirement for wetting the $H_2$ at the anode side or the air/$O_2$ at the cathode side.

In various embodiments, the oxide powder may be mixed with a polymeric alkaline ionomer to make an alkaline polymer-ceramic oxide composite membrane. As the alkaline polymer in the ceramic oxide-polymer composite also conducts $OH^-$ ions, similar to the Nafion®-ceramic oxide membrane, the overall ionic conductivity may therefore be higher than for the same vol. % of a non-conducting polymer. If the ceramic oxide is mainly a proton conductor, then the alkaline polymer-ceramic oxide membrane will be a hybrid $H^+/OH^-$ conductor. When used as the electrolyte 104 for a hydrogen fuel cell 100, water/steam is again generated at both the anode and the cathode side to wet the ceramic-polymer composite membrane, so alleviating any requirements for wetting the $H_2$ on the anode side or the air/$O_2$ on the cathode side.

In various embodiments, a broad range of volume percentages of ceramic can be used. For example, a composite electrolyte 104 with only 1 vol. % ceramic may work, especially if the polymer is an ionic conductor (e.g. protonic or alkaline polymers), but may not offer a particular benefit in terms of performance, and may have low efficiency. When the vol. % of ceramic is over around 33 vol. %, the ceramic particles start to form continuous pathways, improving the conductivity. If a strong polymer such as PMMA is used, the volume of ceramic could be 80% or over to maximise the ionic conductivity. For other polymers, more polymer matrix material may be required for structural integrity. In various embodiments, the ceramic (oxyhydroxide or hydrated oxide) is the major conducting phase. In various embodiments, the ceramic (oxyhydroxide or hydrated oxide) comprises at least 30 vol. % of the electrolyte. The polymers used in the composite can be insulators or ionic conductors, but should be electrically insulating when the ionic conducting material is to be used as an electrolyte 104.

Manufacturing techniques already known to the skilled person may be used to create ceramic-polymer composites using these ceramic materials. For example, Nafion® membranes comprise $CeO_2$ (normally less than 20 wt. %) in order to protect it from oxidation/damage by $H_2O_2$ generated at the fuel cell cathode, so reliable composite polymer-ceramic electrolyte membrane manufacturing techniques are known. Typical plastics known for use in moulding may be used to form ceramic-polymer composite materials which provide very low cross-diffusion (examples of such polymers are provided here: https://www.plastikcity.co.uk/useful-stuff/material-melt-mould-temperatures). This may be very important in some embodiments—e.g. for use as an electrolyte or gas separation membrane—for avoiding chemical or gas cross-over. The ionic and mixed ionic/electronic conductors described herein may be mixed with a polymer such as high-density polyethylene (HDPE), low density polyethylene (LDPE), polyamides (Nylon), polyvinyl chloride (PVC), poly (oxy-1,4-phenyleneoxy-1,4-phenylenecarbonyl-1,4-phenylene) (PEEK), polyvinylidene fluoride or polyvinylidene difluoride (PVDF), polytetrafluoroethylene (PTFE) etc. to form a thin film (e.g. formed using a hot-press), or to be made in different shapes through model casting or similar for different specific applications. The approach as described herein is not limited to hot-pressing, model casting, or any particular forming technique—any appropriate technology for manufacturing ceramic-polymer composite materials can be applied to the materials described herein.

A ceramic-polymer composite membrane made from some polymers such as HDPE may effectively minimize the cross-diffusion of chemicals and gases between the two chambers at the negative and positive electrodes in electrochemical devices such as redox flow batteries/cells, fuel cells, electrolysers, gas separation/purification etc. Material properties may be tailored by using different polymers and/or other materials to form the composite. Oxide/oxyhydroxide-polymer composite electrolytes as described herein may provide one or more of the following benefits:

Better mechanical strength and flexibility in shape as compared to pure ceramic electrolytes;

Ease of manufacture (e.g. for continuous production of a membrane/thin film);

Reduced resistance of the electrolyte due to the use of thin film, and higher fuel cell power density;

Better wetting of the oxide/oxyhydroxide in order to maintain the high ionic conductivity—for example, in a fuel cell, if a liquid fuel including water is used as the anode, but the cathode is exposed to dry or wet air, wetting of ceramic material on the cathode side of a dense, pure ceramic, electrolyte may not be sufficient to achieve high ionic conductivity, especially if the ionic conductivity relies on a hydrated oxide. However, if the pure ceramic membrane is replaced by the oxide/oxyhydroxide-polymer composite membrane, the polymer may allow water at the anode to more easily diffuse into the membrane to wet the ceramic material, so maintaining the higher ionic conductivity.

Despite the lower flexibility, pure ceramic electrolytes or ceramic-ceramic composite electrolytes have their own advantages, such as avoiding cross-diffusion of chemicals or gases between two sides of the electrochemical devices, and may be preferred in various applications, such as many electrolysers and flow batteries, and fuel cells with liquid fuels on both sides. A method 900 of forming solid electrolytes 104 of the embodiments laid out above is now described with respect to FIG. 9. In summary, the method 900 comprises:

Acquiring 902 a ceramic oxide material. The ceramic oxide material is a starting material for forming a solid electrolyte 104, and may be as described above.

Forming additional 904 oxygen vacancies in the ceramic oxide material. This may be done by firing—a temperature and atmosphere for the firing may be selected as appropriate for the material to introduce oxygen vacancies into the material. Alternatively or additionally, it may be done by treatment 904 with a reducing liquid, or by electrochemical reduction 904.

Treating 906 the ceramic oxide material with water so as to form a hydrated oxide, a hydrated oxyhydroxide, and/or an anhydrous oxyhydroxide.

The acquiring step 902 may comprise acquiring 902 a ceramic oxide material in one of the three families described above. The skilled person would appreciate that, for some of the materials described herein (such as $Ca_3Co_2O_6$), the material may have sufficient oxygen vacancies to provide good ionic conductivity after treatment with water even without the performance of step 904—for example if the material is created by standard techniques including firing in air. This step 904 is therefore not considered necessary for the formation of all electrolytes 104 as described herein, but may further improve performance even when viable electrolyte characteristics are obtained without the deliberate adding of further oxygen vacancies. In some embodiments, a ceramic-ceramic composite material may be desired. To make a ceramic-ceramic composite, the precursors for preparing the ceramic material(s) of one of the three families described above may be mixed with one or more other ceramic materials, the other material(s) being selected such that they do not react with the precursors or the yielded ceramic ionic conductor. Alternatively, the ceramic ionic conductor of one of the three families described above may be made first, e.g. by firing in air, and then mixed with another ceramic material (or optionally multiple other ceramic materials) to form a mixture, and the mixture may then be shaped and fired in air again (or fired in a controlled atmosphere such as $N_2$, Ar, or 5% $H_2$/Ar) to form a ceramic-ceramic composite material.

The step 906 of treating the material with water prior to use may comprise a relatively long-term water treatment, for example of from 1 to 2 hours to 2 weeks, depending on material, temperature, and type of water exposure (e.g. steam or liquid water). After the first treatment 906, the ionic conducting material is preferably then retained in a humidified environment until, and during, use. To recover the ionic conductivity if the material dries/is kept in a non-humidified environment, a second treatment may be performed—this second treatment may take only a few minutes, especially if performed at a relative higher temperature (e.g. 90° C.). Again, the suitable treatment time may depend on material structure and composition.

In particular, the ceramic oxide material is an oxide with a perovskite, Brownmillerite or $K_4CdCl_6$ structure and comprises A-site ions of one or more elements selected from Ca, Sr, Ba, Ln, Y, Na, K, Rb, Cs, Pb, and Bi, In, Tl, and B-site ions of one or more elements selected from Ln (e.g. Ce, La), Y, Sc, Mg, Ca, Sr, Li, Na, Co, Fe, Mn, In, Ni, Cu, Zn, Sc, Ti, V, Cr, Ga, Ge, Al, Si, Sn, As, Sb, Zr, Hf, Nb, Mo, W, Cd, Rh, Mg, Ba and Ta, and optionally also Pt, Ir and Ru. The ceramic oxide material may be a single phase (discounting any impurities), or may comprise multiple different phases. The ceramic oxide material may be in the form of a powder, optionally a fine powder. The ceramic oxide material may be prepared by any suitable technique known in the art, for example solid state reaction, a sol-gel process, a co-precipitation method, PVD (physical vapour deposition), CVD (chemical vapour deposition), nebulized spray pyrolysis (NSP), combustion synthesis, solvent thermal synthesis, microwave synthesis, or pulsed laser deposition (PLD). Typically, the oxide material may be prepared using a solid state reaction using precursors such as oxides, carbonates, and/or nitrates. However, any other methods known to be suitable may be used, such as those listed above. When preparing Cl, Br, S or Se-doped oxides, solvent thermal synthesis may be used with added Cl, Br, S or Se precursors.

The acquired ceramic oxide material is then treated 904 so as to introduce additional oxygen vacancies in step 904. When the treatment 904 is performed by firing, the firing atmosphere can be air, or can be $N_2$, Ar, $H_2$, mixed $H_2/N_2$, mixed $H_2/Ar$, $NH_3$, $CH_4$, or another inert or reducing atmosphere. The atmosphere may be selected based on the chemical composition and/or structure of the oxide material. In various embodiments, the principle is to maximise the oxygen vacancy concentration while avoid destroying the crystal structure or otherwise decomposing the oxides.

In various embodiments in which a pure ceramic electrolyte 104 is desired, the ceramic oxide material is sintered. The sintering may occur simultaneously with the firing 904 to introduce oxygen vacancies, or may be performed beforehand. The sintering process comprises shaping the powder suitably (e.g. forming pellets, or tape-casting) and firing it at a temperature selected to make the sintered material with a sufficient mechanical strength to keep its shape (e.g. pellet or film). The firing temperature may be a temperature of between 50° C. and 300° C. below the melting point of the ceramic oxide material, and optionally between 50° C. and 200° C. below the melting point. In some embodiments, with certain materials, sintering may be achieved at lower temperatures, further below the melting point—e.g. a temperature between 50° C. and 700° C. below the melting point. Use of a sintering aid, such as $H_3BO_3$, may be beneficial for lower relative-temperature sintering—such sintering aids can reduce the minimum temperature needed for sintering.

For various oxides tested, optimal firing temperatures were found to be between 800-1200° C. In various embodiments more generally, firing temperatures may be in the range of 300-1700° C. or 500-1700° C., optionally of 500-1500° C. or 700-1400° C., and further optionally of 800-1200° C.

In embodiments in which the electrolyte 104 is assembled by PVD, CVD, or other methods which form a structured solid, the oxide material film or pellet may be formed directly, and no sintering may be needed. If the formed material does not have a sufficiently high concentration of oxygen vacancies, a subsequent firing step may be performed in a reducing atmosphere, inert atmosphere, or other atmosphere with a low partial pressure of oxygen, so as to introduce more oxygen vacancies. Additionally or alternatively, the formed material may be treated 904 with a reducing liquid, or electrochemically reduced 904. In embodiments in which the formed oxide material contains sufficient oxygen vacancies, there may be no need for a firing step or other treatment step 904. It will be appreciated that, for oxide materials made by physical vapour deposition (PVD) and pulsed laser deposition (PLD), the preparation is often performed under vacuum or in an inert gas atmosphere—such materials may have a sufficient concentration of oxygen vacancies without further treatment.

In embodiments in which a pure ceramic electrolyte 104 is wanted, the sintered material may be in the form of a ceramic membrane, film, pellet, or block, optionally shaped and sized as desired for target electrochemical device 100. A ceramic membrane or film may be made by any suitable method known in the art, for example pressing into pellets, screen-printing, tape-casting, gel-casting, slip-coating, dip-coating, spin-coating, sol-gel process, PVD, or CVD. The acquired oxide material may be shaped before sintering so that it retains the desired shape once fired/sintered.

In embodiments in which a composite polymer-ceramic electrolyte 104 is wanted, generally no sintering is performed. The ceramic oxide material is provided as a powder for ease of mixing 908 with one or more polymers to form a homogeneous film (e.g. with a thickness of around 100 µm). The powder particle size may be selected to be fine enough to easily make a film of the desired thickness, and coarse enough to provide good contact of the oxide phase (it will be appreciated that having more grain boundaries may reduce ionic conductivity, as ion transfer through grain boundaries is generally more difficult than transfer through the bulk material). Particle size of the powder may therefore be selected as suitable for the material and the desired electrolyte shape. The mixing 908 of the ceramic and polymer components of the composite electrolyte 104 may be performed before or after the treatment 906 with water, and before or after the addition 904 of oxygen vacancies into the ceramic material. The order shown in FIG. 9 may be typical of various embodiments, but is not intended to be limiting. Step 908 is generally not performed at all for pure ceramic electrolytes 104.

In various embodiments, the loose powder (i.e. the powder is not pressed or otherwise shaped, as may be done for a pure ceramic electrolyte) is fired 904 at a selected temperature, and in a selected atmosphere, to introduce oxygen vacancies. The temperature and atmosphere selection may be as described above, although lower temperatures (and/or shorter firing times) may be preferred in some embodiments to avoid sintering. The use of a lower firing temperature may also reduce energy costs. In some embodiments, firing the oxide material in air or Ar or Nitrogen at a lower temperature may lead to a fired material with an oxygen vacancy concentration which is not high enough to form a good ionic conductor. Firing the sample is a reducing atmosphere, e.g.

pure $H_2$, may facilitate the formation of a single phase oxide with a sufficient oxygen vacancy concentration at a much lower temperature, however (e.g. 400-500° C. or more below the melting temperature).

To minimise cost, the simplest method for preparing oxide materials is generally to prepare and fire them in air, rather than an inert or reducing atmosphere. However, oxides produced by firing in air have been found to often lack a high enough concentration of oxygen vacancies (although the concentration may be sufficient in some cases, as for the example of Ca-deficient $Ca_3Co_2O_6$ described above). Indeed, many oxides with a Brownmillerite structure cannot be formed by firing in air, but can be formed by firing in Ar or $N_2$ at high temperature. The oxide material is therefore fired in air in some embodiments. It will be appreciated that firing in air is generally cheaper, and has lower equipment requirements, than firing in other environments. When oxide materials are fired in air, the oxygen vacancy concentration is often relatively low. The fired oxide materials (e.g. in the form of oxide pellets or powders) may be treated 904 with a reducing reagent, such as a reducing liquid, to increase the concentration of oxygen vacancies. The concentration of the reducing liquid and the temperature can be carefully controlled to allow some lattice oxygen in the oxides to be removed, forming the additional oxygen vacancies. Treatment 904 with a reducing liquid may be used even when the firing 904 is not performed in air, if it is desirable to further increase the oxygen vacancy concentration.

The reducing liquid may be an aqueous solution, in which case the treatment 904 with a reducing liquid may also fulfil the role of the treatment 906 with water. Formed oxygen vacancy rich oxides may simultaneously react with $H_2O$ in the reducing liquid in such embodiments, to form hydrated oxides or hydrated or anhydrous oxyhydroxides. In additional or alternative embodiments, the material may be treated 906 with water after treatment with a reducing liquid. Use of a reducing liquid may serve to convert an electronic conductor into an ionic conductor. For example, sodium borohydride or potassium borohydride may be used as a reducing reagent.

A mixture of $NaBH_4$/NaOH may be used as the reducing liquid, or $KBH_4$/KOH or similar. The use of NaOH (or KOH) may avoid the hydrolysis of $NaBH_4$ (or $KBH_4$, as applicable). For example, $Sr_2Co_2O_5$, fired in air, is an electronic conductor in water. After being fired in Ar, it is an ionic conductor in water, but high temperature firing in Ar is costly so use of a reducing reagent may be preferred instead. The $Sr_2Co_2O_5$ material may be placed in a mixed $NaBH_4$/NaOH aqueous solution bath, and treated at room temperature or heated up (e.g. to 45° C. or 90° C.), so as to convert the material into an ionic conductor, avoiding more costly higher temperatures. The preparation of $Sr_2Co_2O_5$ pellets fired at 1100° C. in air ("$Sr_2Co_2O_5$-1100air pellet") followed by such a reducing treatment is described below. $Sr_2Co_2O_5$ was prepared by standard solid-state techniques. 21.59 g of $Sr(NO_3)_2$ and 29.79 g of $Co(NO_3)_2 \cdot 6H_2O$ were ground to form a mixture and then calcined in air at 600° C. for 8 h with a cooling rate of 1° C./min. Then, the powder was ground and calcined in air at 1100° C. for 3 h with a cooling rate of 1° C./min to form a $SrCoO_{2.5}$ phase. After this, the as-prepared powder was pelletized and sintered in air at 1100° C. for 3 h with a cooling rate of 1° C./min. XRD data indicated formation of a single phase. The $Sr_2Co_2O_5$-1100air pellet was then immersed in a 1 M NaOH+7 M $NaBH_4$ reducing reagent at room temperature (RT) for 2 h, and then immersed in deionized water at RT overnight. Afterwards, the pellet was immersed in the same reducing reagent at RT for 3 h and heated in water at 90° C. overnight. This process was repeated twice, so the total chemical reduction time applied on the pellet (total time in the reducing reagent) was 8 hours (at room temperature). The pellet was then rinsed with deionized water to wash out the residual reducing reagent, dried at room temperature, and coated with a silver conductive ink (RS Components) to facilitate conductivity testing. For testing the conductivity of the $Sr_2Co_2O_5$ pellet in water after the treatment process described above, two side surfaces of pellet are coated by silver conductive ink (RS Components) to form Ag electrodes. The Ag paste was dried at room temperature for 40 minutes. The resultant sandwich-structure cell, with a layer of pellet between two layers of silver mesh, was then immobilised in a jig. The Ag-coated pellets were treated in fresh water at 90° C. before the conductivity test, to allow the pellet to take up water. Electrochemical impedance spectroscopy (EIS) was then performed using a Solartron 1470/1455 with 10 mV amplitude and frequency range of 1 MHz-0.01 Hz. DC conductivity of the pellet was measured by a pseudo four-terminal method by applying 10 mV constant DC voltage across the pellet while the current was recorded in order to determine the electronic resistance. FIG. 31 shows conductivity data for a sample prepared as described above, illustrating high conductivity at temperatures above 60° C.

Another process 904 which may be used to generate oxygen vacancies in an oxide at ambient temperature, instead of or as well as treatment with a reducing liquid, is electrochemical reduction 904. It is well known that graphene oxide can be reduced to graphene by an electrochemical reduction process. The same process 904 can be applied to partially reduce oxides prepared in air, in an electrochemical cell, to form oxygen vacancy rich oxides (removing lattice oxygen). The partially-reduced oxides can then be reacted 906 with water—either simultaneously or subsequently—to form oxyhydroxides and/or hydrated oxides. Low costs can be maintained as the treatments 904 can be performed on the bench/without a controlled atmosphere, and at ambient temperatures and pressures.

In other embodiments, the oxide material is fired 904 in an atmosphere with a reduced oxygen partial pressure as compared to air—for example in nitrogen, argon, or another inert gas, or a mixture of air and an inert gas. In various cases, especially when sintering is desired, a higher firing temperature may be required for the same material when firing in an atmosphere with a lower oxygen partial pressure. Herein, the term "low oxygen partial pressure" is used to refer to a partial pressure of oxygen less than that of air (of which around 21% is oxygen, giving a partial pressure of around 0.21 atmospheres, which is around 21 kPa). An oxygen partial pressure of around 0.01 atmospheres (around 1 kPa) is preferred in some embodiments. In some embodiments, the oxide material is fired in a reducing atmosphere, for example containing a reducing agent such as $H_2$ or CO. For example, an atmosphere with 5 vol. % $H_2$ in Ar, or pure $H_2$, or a different concentration of $H_2$ in Ar or $N_2$ may be used. In general, for a given oxide material, the higher the concentration of $H_2$, the lower the firing temperature. High temperature itself can be regarded as a reducing agent—therefore, for the same materials, firing at higher temperature will result in higher concentration of oxygen vacancies, and thus generally a high ionic conductivity after reacting with water. If the firing temperature is too high, the oxides may be reduced too far, and the lattice may collapse and further decompose to other mixed oxides, or metal(s) and oxide(s), which are more stable in the reducing conditions.

As mentioned above, if the oxides fired in air (for example) have an insufficiently high concentration of oxygen vacancies, the fired material can be put in a liquid reducing environment prior to the treatment 906 with water, or may be treated 906 with an aqueous reducing solution, to provide simultaneous reduction and water treatment. For example, a mixture of hydrazine ($N_2H_4$) or $NaBH_4$/$KBH_4$ and an alkaline solution such as NaOH(aq) or KOH(aq) may be used to partially remove the lattice oxygen atoms in order to generate an oxygen vacancy-rich oxide. The reducing liquid may partially reduce any multi-valent elements (e.g. Mn, Fe, Co, Ni, Cu) at the B-site in the oxides to generate oxygen vacancies. This may be simpler and more cost-effective than firing in 5% $H_2$/Ar or 5% $H_2$/$N_2$. The length of time selected for soaking in the reducing environment generally depends on the chemical composition of the oxides, the concentration of the liquid reducing reagent, the reactivity, and the temperature. Suitable parameters may be selected for a given ceramic material so as to generate more oxygen vacancies without destroying the structure.

In various embodiments, the oxides are prepared by solid state reaction methods, as mentioned above. For example, to prepare $Sr_2Fe_2O_5$, $SrCO_3$ and $Fe_2O_3$ were mixed by ball-milling at 300 rpm for 12 hours and then calcined in air at 1100° C. for 55 hours with a heating/cooling rate of 5° C./min. The powder was ground and pelletized, and then fired 904 in Argon at 1200° C. for 8 hours.

When preparing a ceramic membrane by tape-casting, for example, the acquired oxide material can be prepared in air initially, then mixed with one or more binders to prepare a thin film by tape-casting. The thin film can then be fired in air at a temperature of up to 700° C. to burn off the organic binder(s) in the tape-cast membrane. A further firing step may then be performed, optionally at a higher temperature, in an atmosphere with low oxygen partial pressure such as $N_2$ or Ar (inert gas). Some sintering may occur in the first firing step. The second firing step may be used to ensure that the material is sintered to a desired level, and to introduce oxygen vacancies.

The firing may therefore be implemented in one or two steps. For a single-step, when the oxide material is prepared by a solid state reaction method, the oxide/carbonate precursors may be pre-fired to decompose the carbonate precursor, and then the pre-fired powders may be pressed into pellets. The pellets may then be fired directly in air, or $N_2$ or Ar (for example). The temperature for the firing of the pellets is typically between 700 and 1300° C., depending on the melting point of the materials. This firing 904 both sinters the materials and introduces the desired additional oxygen vacancies in some embodiments, or a non-firing step (e.g. electrochemical reduction) may be used subsequently to introduce additional oxygen vacancies. For a two-step firing process, the pellets may be fired in air first to obtain a sufficient mechanical strength, typically with a relative density 70%. Then these pellets can be fired 904 at a relatively low temperature (e.g. 50-600° C.) in a reducing atmosphere, (e.g. 5% $H_2$/Ar or 5% $H_2$/$N_2$), to remove some lattice oxygen in order to generate more oxygen vacancies.

For a single-step firing process 904, the dwell time is generally variable from a couple of hours to up to 48 hours, and often around four to ten hours. For many of the oxide materials described herein, four hours is sufficient to obtain pellets with good mechanical strength if the temperature is fairly close to the melting point of the material. For a two-step firing process, the firing 904 in a reducing atmosphere is generally performed for up to 48 or 72 hours. The firing temperature is normally determined from Simultaneous Thermal Analysis (STA) in that atmosphere—selecting the temperature at which the ceramic material starts to lose oxygen/weight. It should be noted that the oxides may decompose if the firing temperature is too high or if the firing duration is too long.

The fired material is then treated 906 with water, to form a hydrated oxide and/or an oxyhydroxide (which may be hydrated or anhydrous) from the oxide starting material. The treatment 906 with water may also be performed in a variety of ways. For example, pellets of oxygen vacancy-rich oxides (e.g. fired in Ar or $N_2$, or fired in air and then optionally reduced) may be soaked in (liquid) water at room temperature for four days. Alternatively, the oxide materials may be treated with an atmosphere containing at least 1 vol. % water, and optionally at least 3-4 vol. % water (e.g. as water vapour in a humidified gas flow, or as steam), and further optionally at least 5 vol. % water to form the desired hydrated or unhydrated metal oxyhydroxides and/or hydrated oxides. Treatment with liquid water or an atmosphere containing at least 5 vol. % water may be needed in embodiments in which the oxide material has been fired in air and has not undergone any reducing treatments after firing. For example, air or another carrier gas may be passed through water at 25° C. (e.g. using a gas bubbler). The resultant air flow may have a water content of around 3 vol. %. Alternatively or additionally, steam may be used.

The time period selected for the treatment 906 depends on the porosity/relative density and tortuosity of the material, the size and shape of the material (e.g. pellet or thin film) and the nature/composition of the oxides. Increasing the temperature of water may facilitate the reaction between the oxygen vacancy-rich oxides and water to form hydrated or unhydrated metal oxyhydroxides and/or hydrated oxides, and the time period may therefore be reduced for higher temperature water treatment 906. Too high a temperature (e.g. high temperature steam) may cause degradation of the material. The time period may also be reduced for thinner, and/or more porous, materials, and for materials which are more reactive with water. For example, a time period of less than an hour, or of equal to or around any of 2 hours, 8 hours, 10 hours, 24 hours, 48 hours or 72 hours may be selected. At the same temperature, the exposure time selected in a wet atmosphere is likely to be longer than that in liquid water, although an increased temperature of the atmosphere, and/or the use of steam in place of water vapour in a humidified gas stream, may change that balance. If steam is used to generate the ionically conductive (optionally hydrated) oxyhydroxides or hydrated oxides, the exposure temperature is limited to be below the decomposition temperature of the desired (optionally hydrated) oxyhydroxides or hydrated oxides. Increasing the vol. % of water is also likely to reduce the time period.

In embodiments in which the material is treated with an atmosphere containing at least 1 vol. % water (and optionally at least 5 vol. % water), steam (temperature above 100° C. at standard pressure), or water vapour (e.g. a humidified air flow at ambient pressure and temperature) may be selected depending on the material. For example, in the case of $SrFeO_{2.5-x}(OH)_{2x} \cdot nH_2O$, the material is stable in liquid water at a temperature below 100° C. or in an atmosphere which is saturated with water vapour at such a temperature (e.g. at 80° C.).—the hydrated oxyhydroxide $SrFeO_{2.5-x}(OH)_{2x} \cdot nH_2O$ is therefore formed and remains stable. When the temperature is increased above 100° C., this phase may start to lose hydrated water from the lattice. As the charge carriers are thought to include hydrated water in the lattice and the OH⁻ ions formed therefrom, the loss of $H_2O$ means a loss of charge carriers. For $H^+$ and/or $OH^-$ ion charge-carriers, the conduction pathway may rely on lattice $H_2O$, so the loss of hydrated $H_2O$ in the lattice limits the mobility of $H^+$ and/or $OH^-$ ions. In both cases, loss of lattice water may lead to reduced ionic conductivity, and therefore be undesirable—liquid water or water vapour may therefore be used instead of steam. If the transfer of $H^+$ and/or $OH^-$ ions does not rely so much on the lattice $H_2O$, then loss of $H_2O$ will not affect the conductivity so much, thus the ionic conduction may be retained for the anhydrous phase $SrFeO_{2.5-x}(OH)_{2x}$ (n=0). The temperature ranges within which $SrFeO_{2.5-x}(OH)_{2x} \cdot nH_2O$ and $SrFeO_{2.5-x}(OH)_{2x}$ are stable are dependent on the partial pressure of $H_2O$, $pH_2O$. The higher the $pH_2O$, the higher the temperature for the decomposition of the materials. At the point at which the anhydrous $SrFeO_{2.5-x}(OH)_{2x}$ loses further water to form $Sr_2Fe_2O_5$, the material changes from an ionic conductor to an electronic conductor or a semi-conductor, and is no longer useful as an electrolyte material.

For most of the materials described herein, an atmosphere of at least 1-3 vol. % (and optionally at least 5 vol. %) water at a standard pressure (1 atmosphere) is sufficient for the reaction, and there is no need for pressurisation. The selected temperature may be room temperature, or may be the operating temperature of the electrochemical device 100. A saturated airflow at the given temperature may be used. These conditions may be relatively easy to obtain in situ within the device 100 (e.g. in a PEMFC 100), so allowing the correct phase(s) to be created and maintained in situ, for example through heat exchange with the device 100 when the selected temperature is above room temperature. For example, if the operating temperature of the hydrogen fuel cell is 80° C., the air or $O_2$ provided to the cathode may be provided at 80° C. and saturated at that temperature. These conditions are already provided in commercial hydrogen fuel cells based on Nafion® electrolytes. The operating temperature of other electrochemical devices 100, such as fuel cells using a pure ceramic membrane 104 or ceramic-polymer composite membrane 104, can be over 100° C., and optionally as high as 200° C. Flowing air saturated with steam at 200° C. may be provided to the cathode at ambient pressure—a combination of steam and water vapour may be present. High pressure is not required. Pressurisation may be desirable if the temperature is increased further. As mentioned above, when a hybrid $H^+$/$OH^-$ membrane is used as the electrolyte for a hydrogen fuel cell, any requirements for deliberate/additional wetting of the electrolyte may be lower as water/steam is generated at both anode and cathode sides and may provide sufficient wetting.

In various embodiments, the operating temperature may be less than or equal to 120° C.; at temperatures above 100° C., the electrochemical device 100 may be pressurised, or pressurised steam may be supplied, to maintain hydration of the ionic conducting layer, where applicable. Most electrochemical devices work at a pressure close to ambient pressure. However, in some electrochemical devices such as water electrolysers, the outlet $H_2$ and $O_2$ pressure may be as high as 30 bar (3000 kPa) or even 50 bar (5000 kPa). At 120° C., if the pressure is 2 bar (200 kPa), water is still in the liquid state and may serve to hydrate the oxide ionic conductors. When used in a water electrolyser, if pressure of the outlet gases is 5000 kPa, water is still in the liquid state even at a temperature of around 250° C. As long as the operating temperature of such an electrolyser does not exceed 250° C., for example being 230° C. or 250° C., liquid water can be used to provide smooth operation of the ionic conducting layer. The equilibrium pressure for water at 265° C. is around 5000 kPa. If the outlet pressure of the outlet $H_2$ and $O_2$ from an electrolyser is 5000 kPa, the working temperature of the water electrolyser could be higher, e.g. 265° C. Therefore, a working environment with liquid water may be provided at elevated temperatures (above 100° C.) by adjusting the pressure accordingly. Alternatively, a gaseous environment which contains at least 5 vol. % steam may be provided at elevated temperatures, for ionic conducting materials in need of that hydration for sufficiently strong ionic conduction performance.

For various oxides of the three families identified, a treatment period of at least 48 hours soaking in water was found to achieve the highest ionic conductivity. However, an acceptable conductivity may be obtained in a shorter timeframe. For example, $Ca_3Co_2O_6$ soaked in water for around two hours was found to have an ionic conductivity of 0.001 S/cm, although this increased 0.053 S/cm at 90° C. after being soaked in water at room temperature for three days. For other oxides which are more reactive with water, or differently shaped (e.g. a thinner film, or granules for use in a composite electrolyte), a still shorter time period of soaking in water may provide an acceptable conductivity. It was found that, for many oxides, the conductivity of the ceramic pellets tested increased and then reached a plateau, whilst being soaked in water. For samples with a high relative density (as compared to the theoretical density—i.e. a low porosity), the diffusion of water to the centre of the pellets is slow, thus a longer time period was needed. For most pellets tested (with diameters of around 12-13 mm and thicknesses of around 2 mm), 4 days at room temperature is sufficient for the plateau to be reached. Increasing the temperature can facilitate the formation of (hydrated or anhydrous) oxyhydroxides, thus reducing the period of time. It will be appreciated that a shorter time period may suffice for smaller/thinner pellets. The composition and reactivity of the oxide materials also influence the time taken to reach the plateau. For some relatively reactive materials, such as $Ca_6Co_2O_6$, the reaction with water to convert a semiconductor to an ionic conductor takes only a few minutes, but more time may be needed to achieve a sufficiently high ionic conductivity for use in electrochemical devices—at room temperature, it may take 48 hours of soaking in water.

When forming pure ceramic electrolytes, the sintered ceramic oxide may have a relative density of 60-99% (i.e. a density of 60-99% of the theoretical density for that structure), and optionally of 70-85%. After the reaction with water, the relative density may increase to 70-99%, and optionally to 85-99%. After the reaction 906 with water, the formed (hydrated or anhydrous) oxyhydroxide or hydrated oxide may have a porosity of 1 to 30%, optionally 1-15%, and further optionally 1-5%. A lower porosity (and therefore a higher density) is generally favoured to minimise or avoid cross-over of e.g. hydrogen or other fuels/reactants, and to maximise available ionic conduction pathways. If the ionic conductivity is high enough, a thicker film/layer can be used as an electrolyte and a lower, relative density may be acceptable (i.e. may be sufficient to minimise or avoid cross-over of e.g. hydrogen or other fuels/reactants). Closed pores tend to reduce the conductivity but generally do not affect the sealing of the electrolyte 104. For open pores, they decrease the conductivity, and also affect the sealing of the electrolyte 104 (potentially allowing deleterious cross-over). Bounds on desired porosity are therefore linked to both the thickness of the electrolyte 104 and the nature of the pores (e.g. tortuosity). An upper limit on the thickness of the electrolyte 104 may be based on the ionic conductivity.

It was also found that the mechanical strength of the ceramic material can be tailored by changing the composition. For example, the mechanical strength of the oxyhydroxide derived from the reaction between $SrCoO_{3-\delta}$ and water was found to be relatively low, but doping the B-site with Ti, to instead form $SrCo_{0.5}Ti_{0.5}O_{3-\delta}$ improved the mechanical strength. The mechanical strength may be more important for a dense ceramic membrane or film than for a polymer-composite electrolyte.

In the embodiments being described, the sintered ceramic material is treated 906 evenly on all exposed surfaces, and time is allowed for the water to diffuse throughout the structure.

The ceramic oxide materials with oxygen vacancies are therefore reacted with water—generally by soaking the ceramic oxides in water for a few days, typically 2 to 4 days—to form hydrated oxides and/or (optionally hydrated) oxyhydroxides, in order to achieve a higher ionic conductivity.

As a result of the relatively high-temperature firing process 904 used in many embodiments, there is generally no hydrated water in the freshly prepared oxides. When these oxides are treated with water 906, there are four main possibilities for the electrolyte materials described herein:

The oxides adsorb water to form a hydrated oxide—water molecules are integrated into the lattice.
  e.g. Brownmillerite-structured $Sr_2Fe_2O_5$ can react to form $Sr_2Fe_2O_5 \cdot nH_2O$;
The oxides react with water to form an anhydrous oxyhydroxide.
  e.g. Brownmillerite-structured $Sr_2Fe_2O_{5\pm\delta}$ or a perovskite structure of similar composition with a relatively high concentration of oxygen vacancies, such as $SrFeO_{3-\delta}$ with a large value of $\delta$, can react to form anhydrous oxyhydroxides such as $SrFeO_x(OH)_y$.
The oxides react to form hydrated oxyhydroxides.
The oxides react to form a mixture of metal hydroxides and one or more of the above (especially in the case of less chemically stable oxides).

For a given oxide material, temperature, water concentration of the treatment 906, and treatment duration, may all affect the resultant product(s). In some embodiments, a mixed-phase product may be formed, for example containing both hydrated and anhydrous oxyhydroxides, and optionally one or more metal oxides or hydroxides mixed in with the desired oxyhydroxides and/or hydrated oxides. If no suitable hydrated oxides or oxyhydroxides are formed, or such compositions are only formed in unsuitably small amounts, the firing 904 or water treatment 906 conditions may be adjusted, and/or an additional step 904 for introducing oxygen vacancies may be performed—e.g. treatment with a reducing liquid.

For many oxide materials tested, treatment with water at around 25° C. produced hydrated oxyhydroxides. When the samples were heated, hydrating water was slowly lost to form anhydrous oxyhydroxides. Further heating caused further water loss, returning the material to the oxygen-deficient oxide initially produced—the process was therefore shown to be reversible. In rarer cases, the treatment 906 of the sintered ceramic material with water was found to form an anhydrous oxyhydroxide directly. When the heating is performed in humidified air, rather than ambient air, the loss of $H_2O$ generally occurs at a slightly higher temperature due to higher $pH_2O$.

When the temperature is over 100° C., most of the hydrated oxyhydroxides become anhydrous, i.e. n=0, for many of the materials tested. Despite the loss of water, the anhydrous oxyhydroxides tested were found to retain good ionic conduction properties; this is thought to be at least in part because the mobility of the ions is increased at higher temperature, so compensating for the lost water pathways. At low to intermediate temperature (e.g. between 10° C. and 200-300° C.), the hydrated oxyhydroxides and/or anhydrous oxyhydroxides of the material described herein may be good ionic conductors. Once the oxyhydroxide phase decomposes to an oxygen deficient oxide, the material is converted from an ionic conductor into an electronic conductor or a semiconductor, as observed for most oxides with first row transition elements at the B-sites.

The electrochemical devices 100 may be arranged to operate at relatively low temperatures, for example below 200° C., optionally below 100° C., and further optionally below 90° C. or 60° C.

The electrochemical devices 100 may be arranged to keep the electrolytes 104 humidified. For example, steam may be supplied to both the anode and the cathode side of a fuel cell, or gaseous fuels (e.g. $H_2$ or $NH_3$, or indeed CO or $CH_4$) and oxidants (air or $O_2$ or $H_2O_2$) may be passed through room temperature water as they approach the electrolyte 104 to provide water vapour. For an operating temperature below 100° C., provision of water at around the saturation vapour pressure at that temperature is generally sufficient to maintain the electrolyte 104 in the desired phase. For a temperature above 100° C., the vapour pressure for saturation at 100° C. is generally sufficient to maintain the electrolyte 104 in the desired phase. If an oxyhydroxide electrolyte that is mainly an $OH^-$ ion conductor is used as an electrolyte 104 in a hydrogen fuel cell 100, water will be generated at the anode and will wet the electrolyte membrane on that side. If the electrolyte is a proton conductor, water will be generated at the cathode. If the electrolyte is a hybrid $H^+/OH^-$ conductor, water/steam may be generated at both the anode and the cathode of a hydrogen fuel cell, so automatically wetting the electrolyte. By tailoring the composition, oxides with Brownmillerite, perovskite or $K_4CdCl_6$ structures treated with water may exhibit hybrid $H^+/OH^-$ conduction, which may be particularly beneficial for electrolytes 104 for hydrogen fuel cells.

For aqueous batteries, electrolysis cells, redox flow batteries and the likes, the electrolyte 104 often remains within liquid water so no humidification may be required in use. In a fuel cell 100 using liquid fuels, such as methanol, ethanol, ammonia solution, urea solution, hydrazine, or borohydride aqueous solution, water is often present in the fuel solution and may be sufficient to keep the whole electrolyte 104 humidified—for example wetting a ceramic membrane if the ceramic membrane is thin enough, or diffusing into a hydrophilic polymer of a ceramic-polymer composite membrane. Wetting a gas in the cathode chamber may be unnecessary in such embodiments, or a minimal requirement—e.g. passing the air/$O_2$ through room temperature water may be sufficient rather than needing any introduced steam. Using waste heat, or a separate heater, to heat water to a temperature closer to, or equal to, the cell operating temperature and passing the gas through that heated water may improve performance.

In some fuel cells, hydrogen peroxide ($H_2O_2$) aqueous solution is used as the oxidant at the cathode. This may be particularly useful in fuel cells based on hydrated oxide electrolytes as described herein, as the water in the aqueous $H_2O_2$ solution can maintain the high ionic conductivity of the electrolyte. Such an electrochemical device may have particular utility in niche applications, such as in a submarine or space shuttle, where air/$O_2$ may not be easily available because this type of fuel cell can generate electricity without $O_2$ or air. For example, ammonia, urea, hydrazine, methanol or ethanol aqueous solution may be provided at the anode, and an $H_2O_2$ aqueous solution may be provided at the cathode. When the fuel and oxidant is used up, it can be replaced, providing a faster alternative to re-charging a battery. Potentially an ammonia/$H_2O_2$, urea/$H_2O_2$, $N_2H_4$/$H_2O_2$, methanol/$H_2O_2$ or ethanol/$H_2O_2$ fuel cell can be used for portable applications or to power electric vehicles. The aqueous solution fuel at the anode is not limited to ammonia, urea, hydrazine, methanol, and/or ethanol, and similarly the aqueous solution oxidant is not limited to $H_2O_2$ aqueous solution—these are listed by way of example only.

For some electrochemical devices 100, such as water electrolysers, aqueous batteries, and some flow batteries, the electrolyte 104 is exposed to liquid water on both anode and cathode sides in use. In some embodiments, the liquid water may be provided as part of a liquid mixture or solution, for example also containing alcohol, ammonia, urea, hydrazine, or borohydride. This exposure to liquid water may be beneficial in developing and maintaining the ionic conduction properties of the materials described herein. The measured conductivity in water provided herein for various materials may reflect the conductivity in this working environment most accurately, as the conductivity may be slightly lower (whilst still sufficient for an electrolyte) in dryer operating conditions.

In various embodiments in which the solid oxide ionic conducting layers 104 are exposed to liquid water (as is often the case in use as an electrolyte in an electrolyser, for example) or a fuel containing liquid water (such as aqueous solutions of ammonia, urea, hydrazine, borohydride, methanol and/or ethanol) at the anode, or an oxidant containing liquid water (such as $H_2O_2$ aqueous solution) at the cathode, the water content may not necessarily be as high as 5%. For example, a direct ethanol fuel cell using the mixture of 98 vol. % ethanol/2 vol. % $H_2O$ may have a solid oxide ionic conducting layer as described herein as electrolyte, and the 2 vol. % liquid water may be sufficient even for ionic conducting materials for which at least 5 vol. % water is needed in a gas stream to ensure good ionic conductivity. As long as the oxides are in contact with a medium containing liquid water, the vol. % of water may be lower than that selected for a gas stream including steam (minimum of 5 vol. % preferred to maintain a high ionic conductivity). When the operating temperature is above 100° C., the electrochemical device may be pressurised, above ambient pressure, if the intention is to maintain exposure to liquid-phase water. A minimum of 5 vol. % $H_2O$ may also be selected when a humidified gas stream/atmosphere is used in place of a mixture of steam with the gas stream/atmosphere.

When a solid oxide ionic conducting layer as described herein is used in an environment with gases, such as in use as an electrolyte in a hydrogen fuel cell, both the hydrogen (or other fuel) at the anode and the $O_2$/air (or other oxidant) at the cathode may be humidified so as to contain at least 5 vol. % $H_2O$ in the $H_2$/$H_2O$ mixture at the anode and in the air/$H_2O$ mixture at the cathode so as to provide a high ionic conductivity for smooth operation of the electrochemical device.

When a solid oxide ionic conducting layer as described herein is used in a sealed environment, such as a battery or supercapacitor, no contact with a stream or supply of water or humidified gases may be necessary to achieve the desired level of hydration. Liquid water or steam (depending on temperature and pressure) is sealed inside the sealed battery/supercapacitor, and therefore provides hydration without needing replacement. For example, a pre-treated $SrZr_{0.8}Y_{0.2}O_{3-\delta}$ thin ceramic film or a $SrZr_{0.8}Y_{0.2}O_{3-\delta}$-polymer composite material or a $SrZr_{0.8}Y_{0.2}O_{3-\delta}$-ceramic composite material can be used as the electrolyte in a battery or supercapacitor using $OH^-$ or $H^+$ (or both) as the charge carriers. When various materials described herein are used in sealed electrochemical devices such as batteries or supercapacitors, it is required to keep the materials hydrated to retain high ionic conductivity (optionally high mixed ionic/electronic conduction if the material is used as an electrode or part of an electrode). The electrolyte and/or electrode are arranged to be in contact with liquid water or, a sealed environment with at least 5 vol. % steam in the equilibrium gas inside the sealed electrochemical device in use. Not all batteries are sealed systems. For example, in metal-air batteries such as Zn-air and Mg-air batteries, the cathode is exposed to air. A porous membrane may be used to allow $O_2$ from the surrounding air to reach the cathode of a Zn-air battery. This membrane may prevent loss of moisture from the Zn-air battery, so keeping the ionic conducting layer(s) of the Zn-air battery hydrated in order to retain high ionic conductivity.

In a special case for wastewater treatment, if a reducing wastewater is provided at the anode and an oxidising wastewater at the cathode of the fuel cell, electricity may beneficially be generated as a side-product at the same time as treating the wastewater.

If a ceramic or ceramic-polymer membrane as described herein is used as the electrolyte 104 in a fuel cell 100 arranged to remove ammonia from ammonia-containing wastewater, the membrane 104 may be more tolerant to impurities in wastewater than Nafion®, and thus may exhibit better durability than current fuel cells based on Nafion® or alkaline membrane electrolytes.

The electrochemical devices 100 of the embodiments being described are arranged to have maximum operating temperatures below the temperature at which the hydrated oxide or hydrated oxyhydroxide would start to lose lattice water, or at which the anhydrous oxyhydroxide would start to lose water to form the original starting oxide (as applicable). This temperature is dependent on the chemical composition, the structure of the hydrated oxide or hydrated or anhydrous oxyhydroxide, and the partial pressure of water ($pH_2O$) within the electrochemical device. The higher the $pH_2O$, the higher the maximum working temperature of the ionic conductor whilst still retaining sufficient ionic conductivity.

As described herein, three families of oxides which can be used to form oxyhydroxides and/or hydrated oxides with suitable properties for use as electrolytes 104 in electrochemical devices 100 have been identified. Various methods 900 of making these materials have also been described. It will be appreciated that the specific compositions mentioned herein are examples of the identified classes of oxides, and should not be taken as limiting the scope of the disclosure.

The invention claimed is:

1. An electrochemical device comprising a solid ionic conducting layer, the ionic conducting layer comprising an oxyhydroxide derived from of an oxide with a perovskite or Brownmillerite structure, the oxyhydroxide having the general formula:

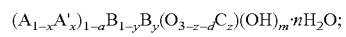

$(A_{1-x}A'_x)_{1-a}B_{1-y}B'_y(O_{3-z-d}C_z)(OH)_m \cdot nH_2O;$ wherein:
A and A' are selected from Ca, Sr, Ba, Ln, Y, Na, K, Rb, Cs, Pb, and Bi;

B and B' are selected from Ln, Y, Sc, Mg, Ca, Sr, Li, Na, Co, Fe, Mn, In, Ni, Cu, Zn, Sc, Ti, V, Cr, Ga, Ge, Al, Si, Sn, As, Sb, Zr, Hf, Nb, Mo, W, Cd, and Ta;

C is selected from N, Cl, F, Br, S, Te, and Se;

$0 \leq x \leq 1$;

$a \leq 0.15$;

$z \leq 0.2$;

$y \leq 1$;

$d \leq 2$;

$m \geq 0.01$;

$n \geq 0$, and wherein the electrochemical device is arranged such that, in use, the ionic conducting layer is exposed to liquid water or to gas with at least 5 vol. % water.

2. The electrochemical device of claim 1, wherein at least one of the following applies:
(i) m is in the range from 0.01 to 2, optionally in the range from 0.2 to 1.5, and further optionally in the range from 0.5 to 1; and/or
(ii) n is in the range from 0 to 12, optionally in the range from 0.1 to 2, and further optionally in the range from 0.2 to 1.5.

3. The electrochemical device of claim 1, wherein the oxide with a perovskite or Brownmillerite structure is one or more of:
(i) $Sr_2Co_2O_{5\pm\delta}$;
(ii) $Sr_2Co_2O_{5-x}N_x$;
(iii) $Ca_2Co_2O_{5\pm\delta}$;
(iv) $SrCoO_{3-\delta}$;
(v) $CaCoO_{3-\delta}$;
(vi) $SrCaFeCoO_{5\pm\delta}$
(vii) $SrCaCo_2O_{5\pm\delta}$; or
(viii) $SrCo_{0.5}Ti_{0.5}O_{3-\delta}$,
(ix) $Sr_2Fe_2O_{5\pm\delta}$;
(x) $Sr_2Fe_2O_{5-x}N_x$;
(xi) $Ca_2Fe_2O_{5\pm\delta}$;
(xii) $SrZr_{0.8}Y_{0.2}O_{3-\delta}$;
(xiii) $SrCe_{0.8}Y_{0.2}O_{3-\delta}$;
(xiv) $SrCeO_{3-\delta}$; or
(xv) $SrCaFe_2O_{5\pm\delta}$.

4. A solid ionic conducting layer for use in an electrochemical device, the solid ionic conducting layer comprising a hydrated oxide derived from of an oxide with a Brownmillerite structure, the hydrated oxide having the general formula:

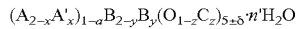

wherein:
A and A' are selected from Ca, Sr, Ba, Ln, Y, Na, K, Rb, Cs, Pb, and Bi;
B and B' are selected from Ln, Y, Sc, Mg, Ca, Sr, Li, Na, Co, Fe, Mn, In, Ni, Cu, Zn, Ti, V, Cr, Ga, Ge, Al, Si, Sn, Sb, Zr, Hf, Nb, Mo, W, Cd, As, and Ta;
C is selected from N, Cl, F, Br, S, Te, and Se;
$a \leq 0.15$;
$0 \leq x \leq 1$;
$0 \leq y \leq 1$;
$z \leq 0.04$; and
$n' \geq 0.01$.

5. The solid ionic conducting layer of claim 4, wherein the oxide with a Brownmillerite structure is one or more of:
(i) $Sr_2Fe_2O_5$;
(ii) $Sr_2FeCoO_5$;
(iii) $Sr_2Fe_2O_{5-x}N_x$; or
(iv) $Ba_2InCe_{0.5}La_{0.5}O_5$.

6. A solid ionic conducting layer for use in an electrochemical device, the solid ionic conducting layer comprising a hydrated oxide derived from an oxide with a perovskite structure, the hydrated oxide having the general formula:

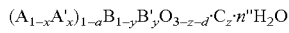

wherein:
A and A' are selected from Ca, Sr, Ba, Ln, Y, Na, K, Rb, Cs, Pb, and Bi;
B and B' are selected from Ln, Y, In, Sc, Sr, Ca, Mg, Li, Na, Co, Fe, Mn, Ni, Cu, Zn, Ti, V, Cr, Ga, Ge, Al, Si, Sn, Sb, Zr, Hf, Nb, Mo, W, Cd, As and Ta;
C is selected from N, Cl, F, Br, S, and Se;
$0 \leq x \leq 1$;
$a \leq 0.15$;
$z \leq 0.2$;
$d \leq 2$;
$n'' \geq 0.01$.

7. The solid ionic conducting layer of claim 6, wherein the oxide with a perovskite structure is one or more of:
(i) $SrCoO_{3-\delta}$;
(ii) $SrCo_{0.5}Ti_{0.5}O_{3-\delta}$;
(iii) $SrZr_{0.8}Y_{0.2}O_{3-\delta}$;
(iv) $SrCe_{0.8}Y_{0.2}O_{3-\delta}$ or
(v) $SrCeO_{3-\delta}$.

8. A solid ionic conducting layer for use in an electrochemical device, the solid ionic conducting layer comprising a hydrated oxide or a hydrated or non-hydrated oxyhydroxide derived from of an oxide with a $K_4CdCl_6$ structure, the oxide with the $K_4CdCl_6$ structure having the general formula:

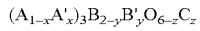

wherein:
A and A' are selected from Ca, Sr, Ba, Na, K, Rb, Cs, Ln, Y, Pb, In, Tl and Bi;
B and B' are selected from Co, Fe, Mn, Ni, Cu, Ti, V, Cr, Mg, Ca, Sr, Ba, Ln, Y, Zn, Cd, Li, Na, B, Ga, Ge, Al, Si, Sn, Sb, Zr, Hf, Nb, Mo, W, Ta, Pt, Rh, Ir and Ru,
C is selected from N, Cl, F, Br, I, S, Te, and Se;
y is in the range from 0 to 2;
z is in the range from 0 to 0.5; and
x is in the range from 0 to 1.

9. The solid ionic conducting layer of claim 8, wherein at least one of B and B' is selected from Ce, Zr, Ti, Y, Sc, Co, Fe, Mn, Ni, and Cu.

10. The solid ionic conducting layer of claim 8, wherein the oxide is $Ca_3Co_2O_6$.

11. The solid ionic conducting layer of claim 8, wherein the solid ionic conducting layer comprises:
(i) a hydrated oxide with the general formula $(A_{1-x}A'_x)_3B_{2-y}B'_yO_{6-z}C_z \cdot nH_2O$, where n is greater than or equal to 0.01, x is in the range from 0 to 1, y is in the range from 0 to 2, and z is in the range from 0 to 0.5; or
(ii) an oxyhydroxide with the general formula $(A_{1-x}A'_x)_3B_{2-y}B'O_{6-z}C_z(OH)_m \cdot nH_2O$, where x is in the range from 0 to 1, y is in the range from 0 to 2, z is in the range from 0 to 0.5, and m is in the range from 0.01 to 6.

12. The solid ionic conducting layer of claim 4, wherein the solid ionic conducting layer is a composite solid ionic conducting layer comprising at least one hydrated oxide or hydrated or non-hydrated oxyhydroxide as claimed in claim 5 mixed with a material which is at least one of (i) a polymer and (ii) a ceramic; (iii) a pure non-metal element such as graphite, or (iv) a salt.

13. The solid ionic conducting layer of claim 12, wherein the material is a polymer or graphite and the composite solid ionic conducting layer is in the form of a flexible membrane.

14. A method of manufacturing a solid ionic conducting layer for use in an electrochemical device, the method comprising:
   acquiring a ceramic oxide material, wherein the ceramic oxide material is an oxide with a perovskite, Brownmillerite or $K_4CdCl_6$ structure and comprises A-site ions of one or more elements selected from Ca, Sr, Ba, Ln, Y, Na, K, Rb, Cs, Pb, and Bi and B-site ions of one or more elements selected from Ln, Y, Sc, Mg, Ca, Sr, Ba, Li, Na, Cd, Co, Fe, Mn, In, Ni, Cu, Zn, Ti, V, Cr, Ga, Ge, Al, Si, Sn, Sb, Zr, Hf, Nb, Mo, W, Ta, Pt, Rh, Ir and Ru;
   introducing additional oxygen vacancies into the acquired ceramic oxide material by:
   (i) firing the ceramic oxide material in air;
   (ii) firing the ceramic oxide material in an atmosphere with a lower partial pressure of oxygen than air;
   (iii) soaking the ceramic oxide material in a reducing liquid, or
   (iv) electrochemically reducing the fired ceramic oxide material;
   and
   treating the ceramic oxide material with water, the treatment comprising soaking the fired ceramic oxide material in water, or exposing it to an atmosphere with at least 5 vol. % water, to form a hydrated oxide or a hydrated or non-hydrated oxyhydroxide.

15. The method of claim 14, wherein the atmosphere with a lower partial pressure of oxygen than air is either:
   (i) an inert atmosphere; or
   (ii) a reducing atmosphere.

16. The method of claim 14, wherein the acquired ceramic oxide material is at least one of:
   (i) an oxide with a perovskite structure, such as $SrZr_{0.8}Y_{0.2}O_{3-\delta}$, $SrCe_{0.8}Y_{0.2}O_{3-\delta}$ or $SrCo_{0.5}Ti_{0.5}O_{3-\delta}$;
   (ii) an oxide with a Brownmillerite structure, such as $Sr_2Fe_2O_{5\pm\delta}$; or
   (iii) an oxide with a $K_4CdCl_6$ structure, such as $Ca_3Co_2O_6$.

17. The method of claim 14, wherein the treatment with water is performed for a period of at least 1 hour before use of the solid ionic conducting layer.

18. The method of claim 14, wherein the solid ionic conducting layer is a pure ceramic solid ionic conducting layer, and either:
   (i) a single firing step is arranged to sinter the ceramic material so as to form a sintered material arranged to hold the desired shape for the solid ionic conducting layer and to introduce the additional oxygen vacancies; or
   (ii) the material is sintered in air in a first firing step, prior to firing the sintered material in an atmosphere with a lower partial pressure of oxygen than air to introduce the additional oxygen vacancies.

19. The electrochemical device of claim 1, wherein the electrochemical device is arranged to operate at an operating temperature less than or equal to 250° C., and optionally less than or equal to 120° C., and wherein optionally, when the operating temperature is above 100° C., pressurised steam or pressurised water is provided to maintain the exposure to liquid water or to gas with at least 5 vol. % water.

20. The electrochemical device of claim 19, wherein
   the solid ionic conducting layer is an electrolyte; and
   the electrochemical device is arranged to keep the solid ionic conducting layer hydrated in use.

* * * * *